US010162163B2

(12) United States Patent
Uchida et al.

(10) Patent No.: US 10,162,163 B2
(45) Date of Patent: Dec. 25, 2018

(54) IMAGE PICKUP APPARATUS AND IMAGE PICKUP SYSTEM

(71) Applicant: OLYMPUS CORPORATION, Tokyo (JP)

(72) Inventors: Yoshihiro Uchida, Tokyo (JP); Kenichiro Abe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 260 days.

(21) Appl. No.: 15/158,568

(22) Filed: May 18, 2016

(65) Prior Publication Data
US 2016/0266370 A1 Sep. 15, 2016

Related U.S. Application Data

(63) Continuation of application No. PCT/JP2014/076711, filed on Oct. 6, 2014.

(30) Foreign Application Priority Data

Nov. 18, 2013 (JP) .................................. 2013-237888

(51) Int. Cl.
G02B 13/18 (2006.01)
G02B 21/36 (2006.01)
(Continued)

(52) U.S. Cl.
CPC .......... G02B 21/361 (2013.01); G02B 13/02 (2013.01); G02B 13/22 (2013.01); G02B 21/02 (2013.01);
(Continued)

(58) Field of Classification Search
CPC ...... G02B 21/06; G02B 21/361; G02B 21/26; G02B 21/0032; G02B 21/02; G02B 7/021;
(Continued)

(56) References Cited

U.S. PATENT DOCUMENTS 6,775,071 B1 8/2004 Suzuki et al.
7,483,221 B2 1/2009 Kitahara
(Continued)

FOREIGN PATENT DOCUMENTS

JP 2003-195166 7/2003
JP 2004-264714 A 9/2004
(Continued)

OTHER PUBLICATIONS

International Preliminary Report on Patentability dated Jun. 2, 2016, issued in International Application No. PCT/JP2014/076711.
(Continued)

Primary Examiner — Evelyn A Lester
(74) Attorney, Agent, or Firm — Hunton Andrews Kurth LLP

(57) ABSTRACT

An image pickup apparatus includes an image pickup element and an optical system. The image pickup element includes a plurality of pixels, and the plurality of pixels is arranged in rows two-dimensionally. The optical system includes in order from an object side, a first lens unit which includes a plurality of lenses, a stop, and a second lens unit which includes a plurality of lenses. The first lens unit includes a first object-side lens which is disposed nearest to an object, and the second lens unit includes a second image-side lens which is disposed nearest to an image. The following conditional expressions (1), (2), (3), (4), and (5) are satisfied:

$3250 < 2Y/p$ (1), $-1.0 < \beta$ (2), $CRA_{obj} < 10$ deg (3), $2.0 < L_L / \sqrt{(Y \times Y_{obj})} < 15.0$ (4), and $0.5 < L_{TL}/D_{oi} < 0.95$ (5).

33 Claims, 27 Drawing Sheets

(51) Int. Cl.
*G02B 13/22* (2006.01)
*G02B 13/02* (2006.01)
*G02B 21/06* (2006.01)
*G02B 27/10* (2006.01)
*G02B 21/00* (2006.01)
*G02B 13/00* (2006.01)
*G02B 9/00* (2006.01)
*G02B 21/02* (2006.01)
*G02B 21/26* (2006.01)
*G02B 7/02* (2006.01)
*G02B 5/00* (2006.01)
*G02B 13/24* (2006.01)

(52) U.S. Cl.
CPC ............. *G02B 21/06* (2013.01); *G02B 27/10* (2013.01); *G02B 5/005* (2013.01); *G02B 7/021* (2013.01); *G02B 9/00* (2013.01); *G02B 13/0045* (2013.01); *G02B 13/18* (2013.01); *G02B 13/24* (2013.01); *G02B 21/0032* (2013.01); *G02B 21/025* (2013.01); *G02B 21/26* (2013.01); *G02B 21/36* (2013.01)

(58) Field of Classification Search
CPC .... G02B 13/0045; G02B 5/005; G02B 13/18; G02B 21/025; G02B 13/22; G02B 9/00; G02B 27/10; G02B 13/24; G02B 21/36
USPC ............... 359/372, 385, 389, 391, 419, 420, 359/656–66, 740, 793–795, 656–661
See application file for complete search history.

(56) References Cited

U.S. PATENT DOCUMENTS

| | | | |
|---|---|---|---|
| 9,329,369 B2* | 5/2016 | Uchida | ............ G02B 13/18 |
| 2004/0174612 A1 | 9/2004 | Suzuki et al. | |
| 2005/0041304 A1 | 2/2005 | Suzuki et al. | |
| 2008/0019014 A1 | 1/2008 | Kitahara | |
| 2015/0355445 A1* | 12/2015 | Uchida | ............ G02B 13/18 |
| | | | 359/656 |
| 2016/0202461 A1* | 7/2016 | Uchida | ............ G02B 13/18 |
| | | | 359/656 |
| 2016/0282592 A1* | 9/2016 | Abe | ............ G02B 13/18 |

FOREIGN PATENT DOCUMENTS

| | | |
|---|---|---|
| JP | 2004-271682 A | 9/2004 |
| JP | 2006-030496 | 2/2006 |
| JP | 2007-148433 | 6/2007 |
| JP | 2008-026593 A | 2/2008 |
| JP | 2009-251081 A | 10/2009 |
| JP | 2010-276892 A | 12/2010 |
| JP | 2013-037099 | 2/2013 |
| JP | 2013-041205 A | 2/2013 |

OTHER PUBLICATIONS

International Search Report, dated Jan. 6, 2015, issued in International Application No. PCT/JP2014/076711.
Japanese Office Action dated Jun. 7, 2017, issued in Japanese Patent Application No. 2015-547684 (with English-language translation).

* cited by examiner

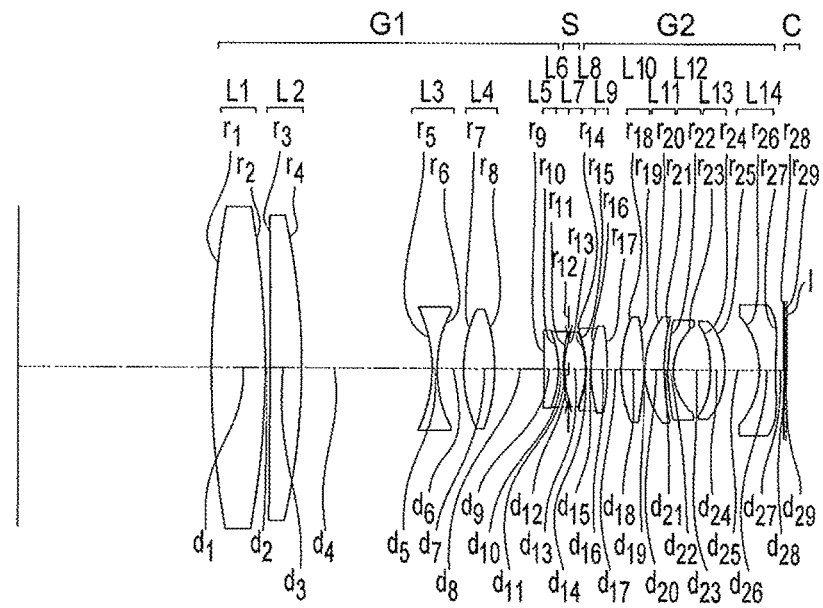
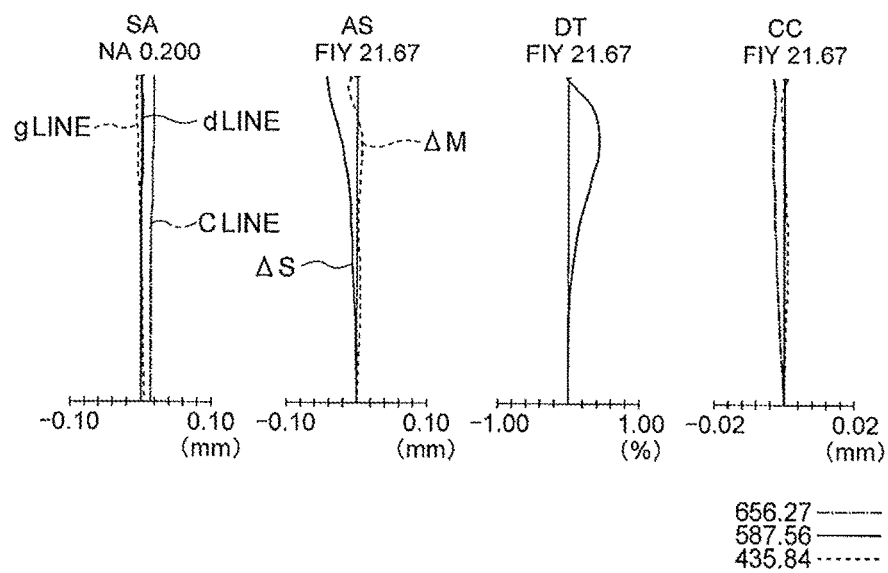

SA
NA 0.200

AS
FIY 21.68

DT
FIY 21.68

CC
FIY 21.68

SA
NA 0.200

AS
FIY 21.59

DT
FIY 21.59

CC
FIY 21.59

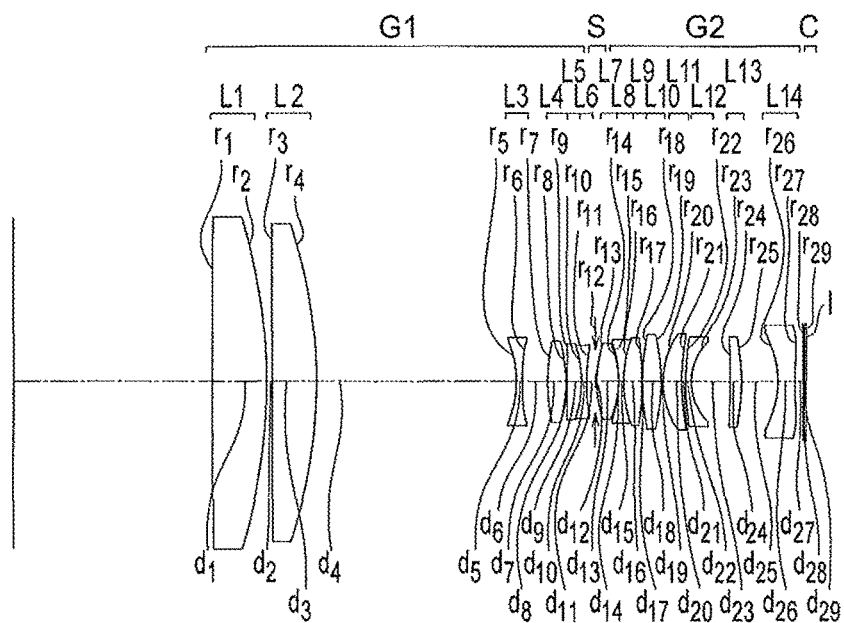

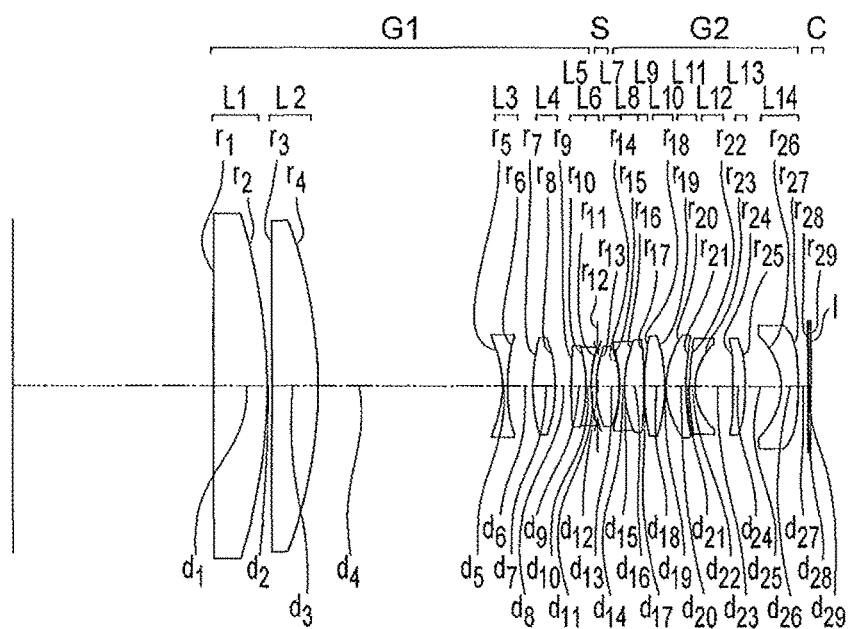
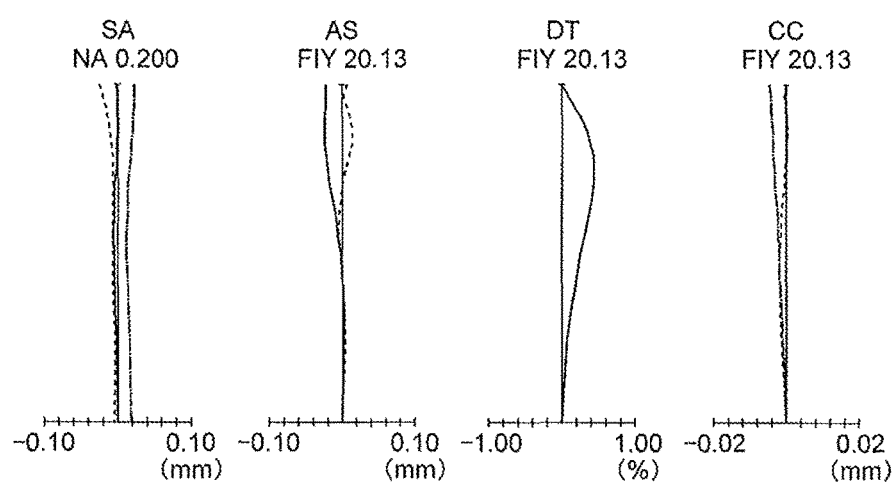

FIG. 6A
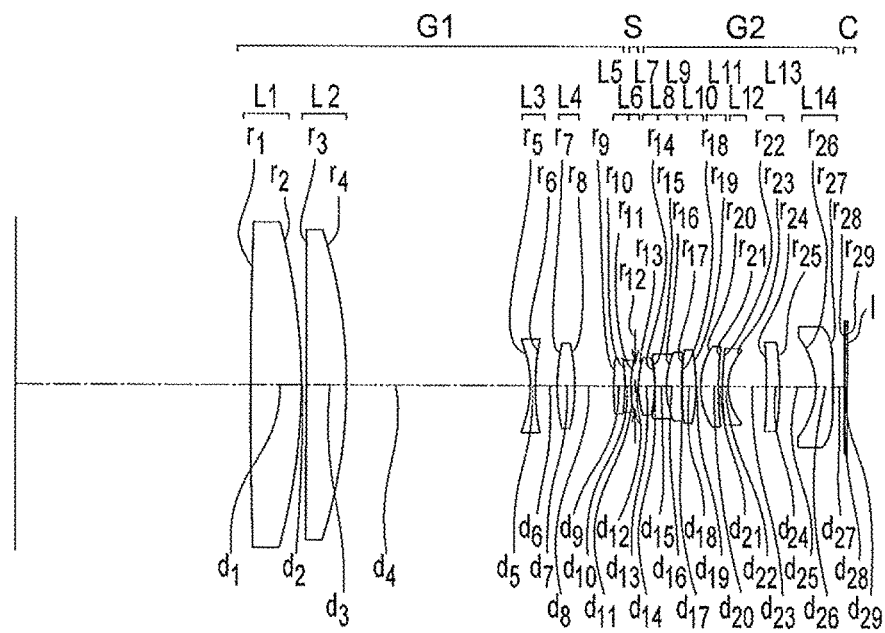
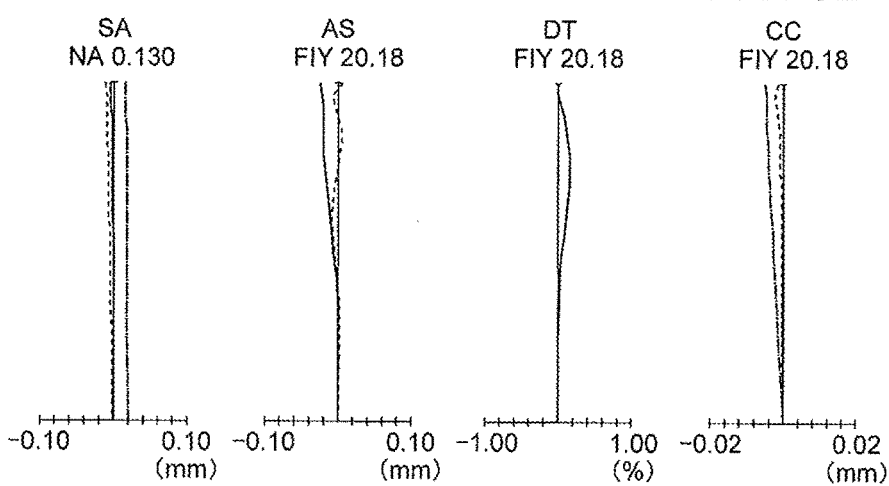
FIG. 6B
SA
NA 0.130
FIG. 6C
AS
FIY 20.18
FIG. 6D
DT
FIY 20.18
FIG. 6E
CC
FIY 20.18

FIG. 7A
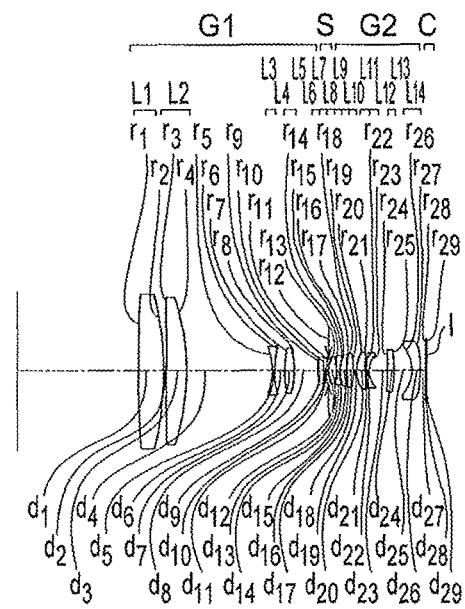
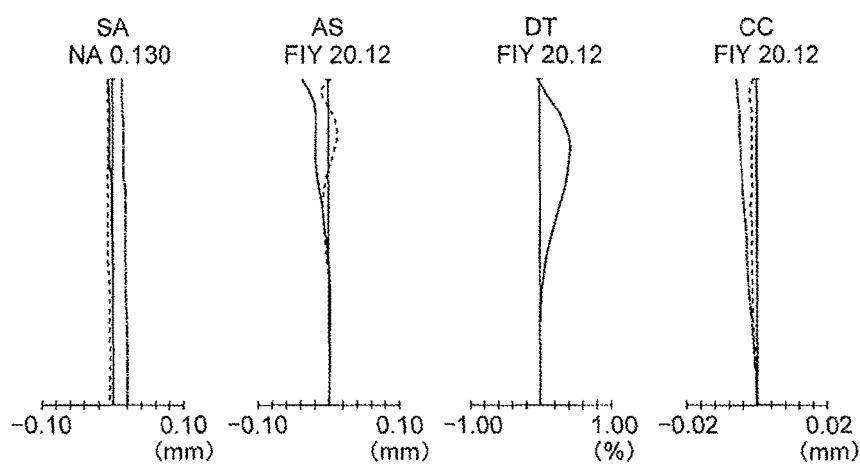
FIG. 7B  FIG. 7C  FIG. 7D  FIG. 7E

FIG. 8A
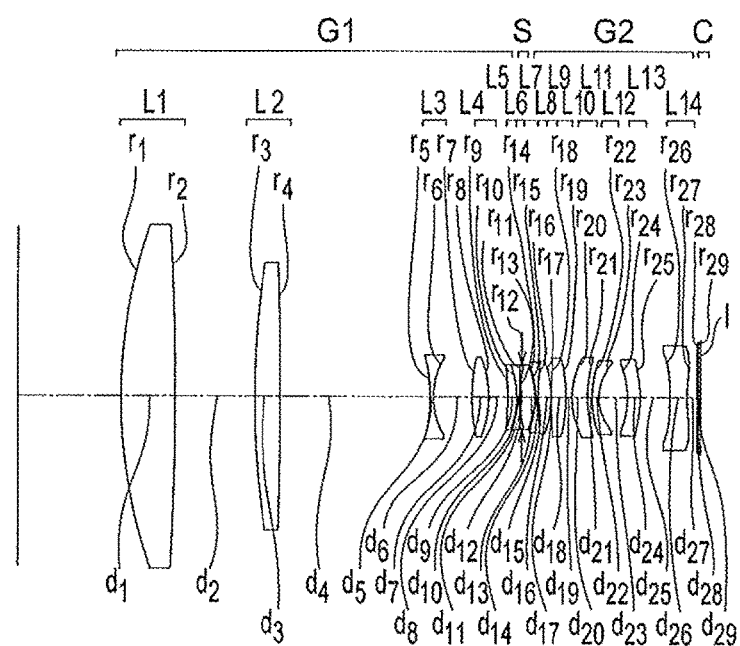
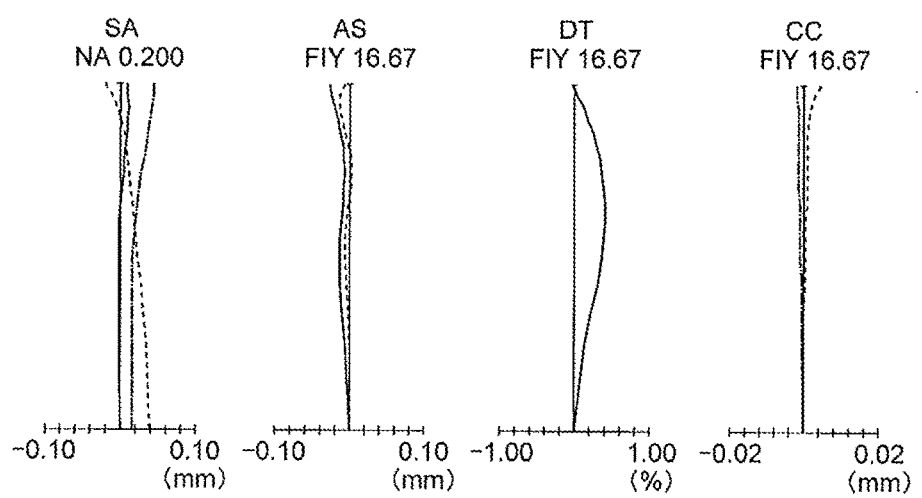
FIG. 8B
SA
NA 0.200
FIG. 8C
AS
FIY 16.67
FIG. 8D
DT
FIY 16.67
FIG. 8E
CC
FIY 16.67

FIG. 12A
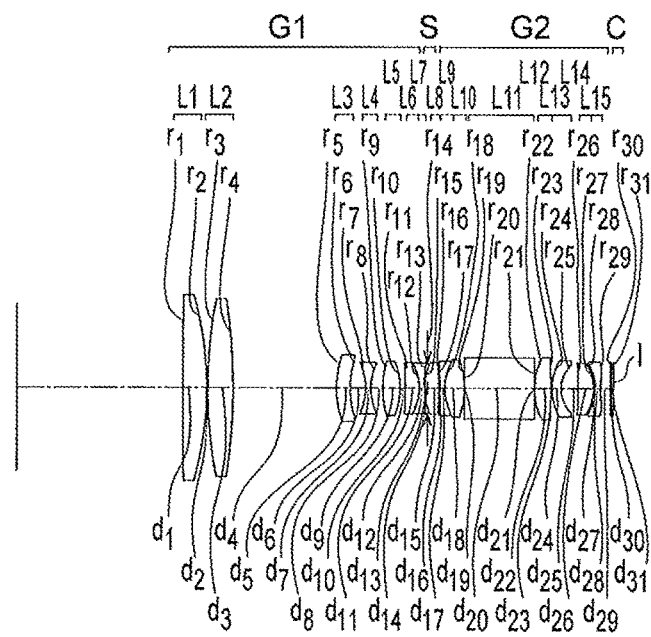
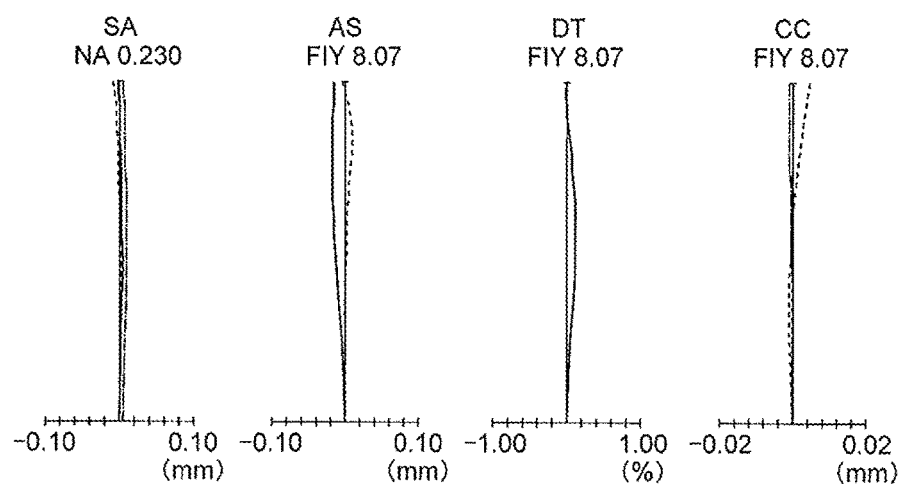
FIG. 12B  FIG. 12C  FIG. 12D  FIG. 12E

FIG. 13A
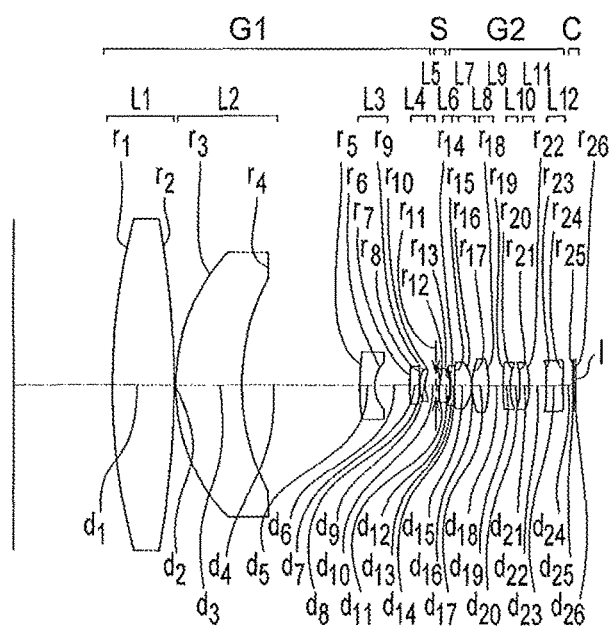
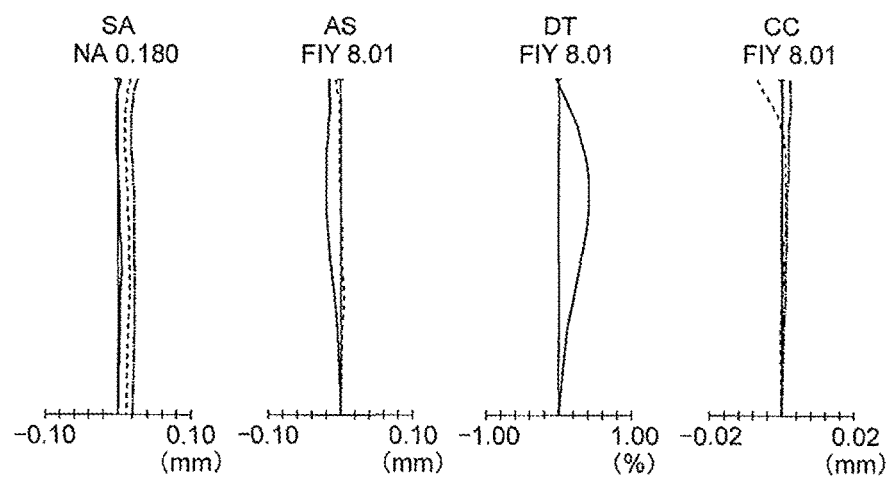
FIG. 13B  FIG. 13C  FIG. 13D  FIG. 13E

FIG. 14A
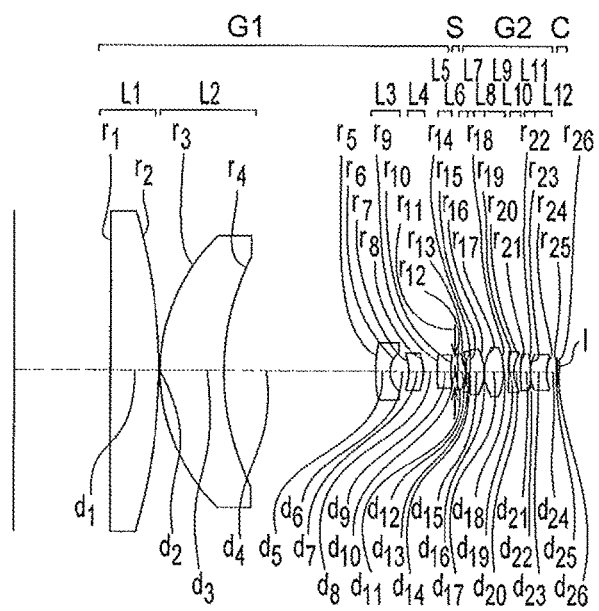
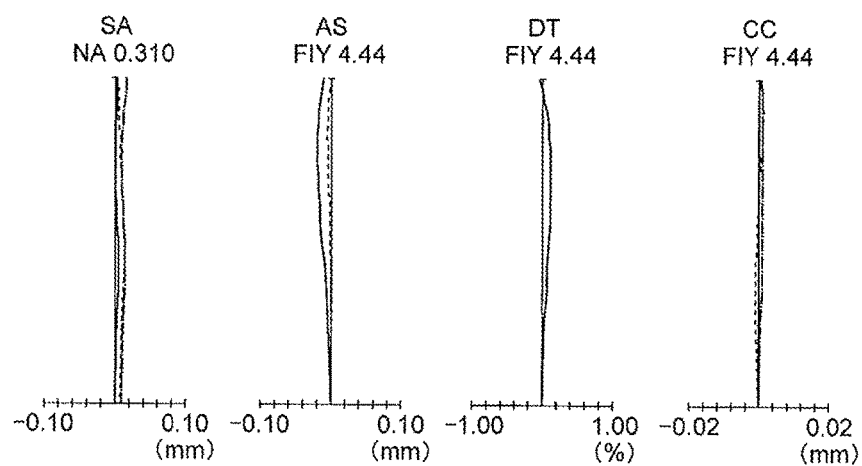
FIG. 14B    FIG. 14C    FIG. 14D    FIG. 14E
   SA          AS           DT           CC
NA 0.310    FIY 4.44    FIY 4.44    FIY 4.44

FIG. 16A
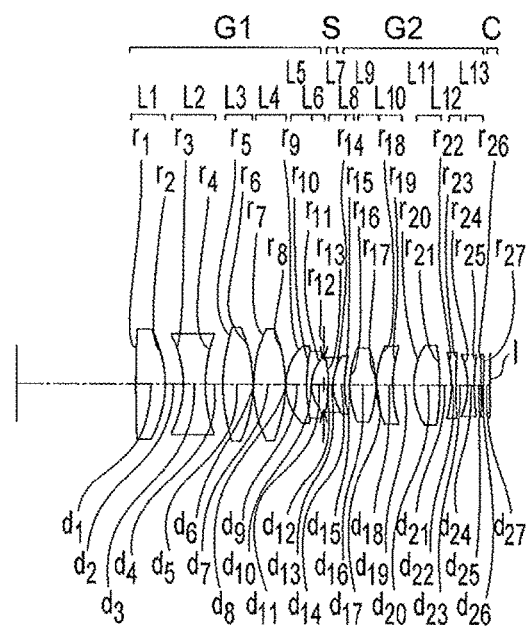
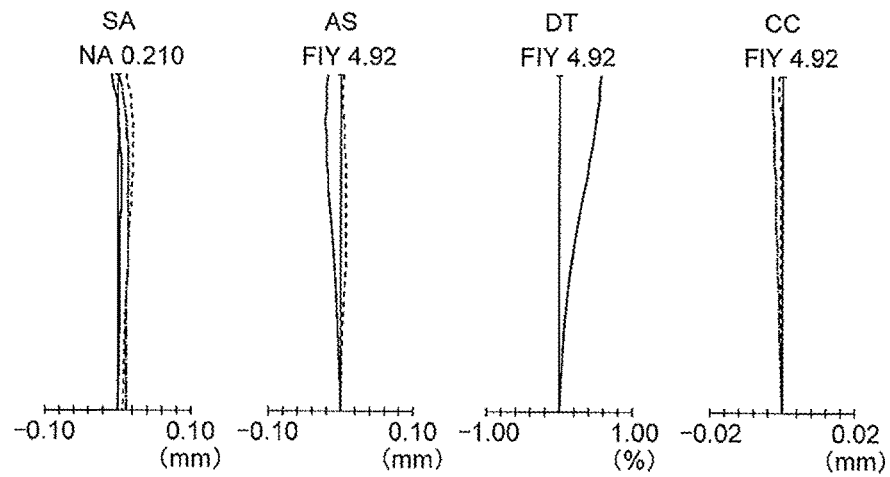
FIG. 16B  FIG. 16C  FIG. 16D  FIG. 16E

FIG. 19A
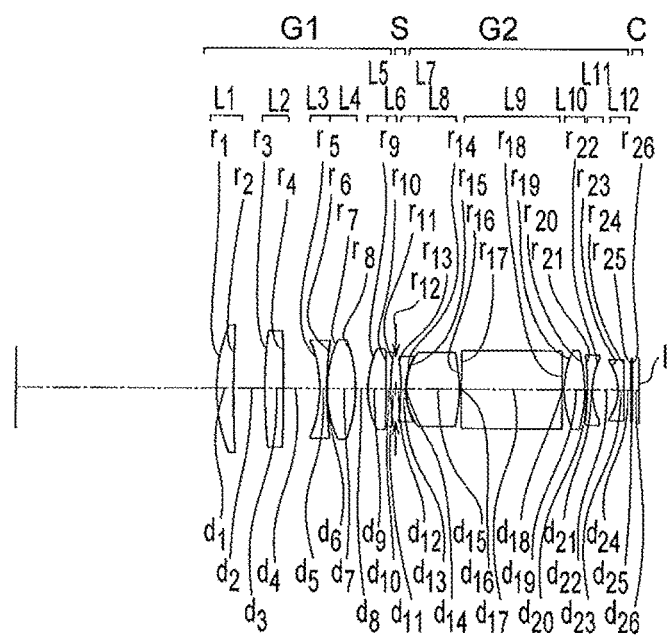
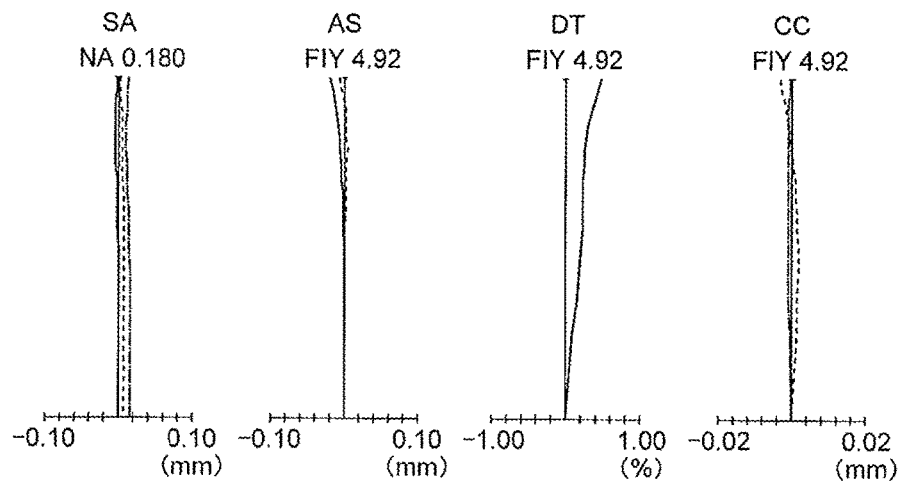

FIG. 20A
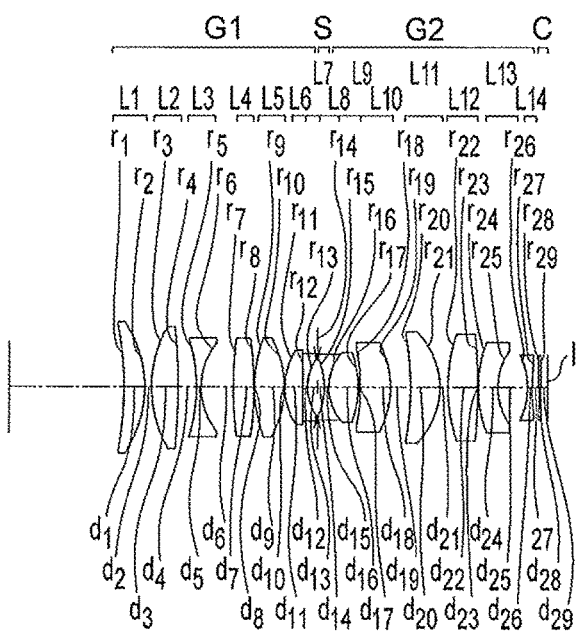
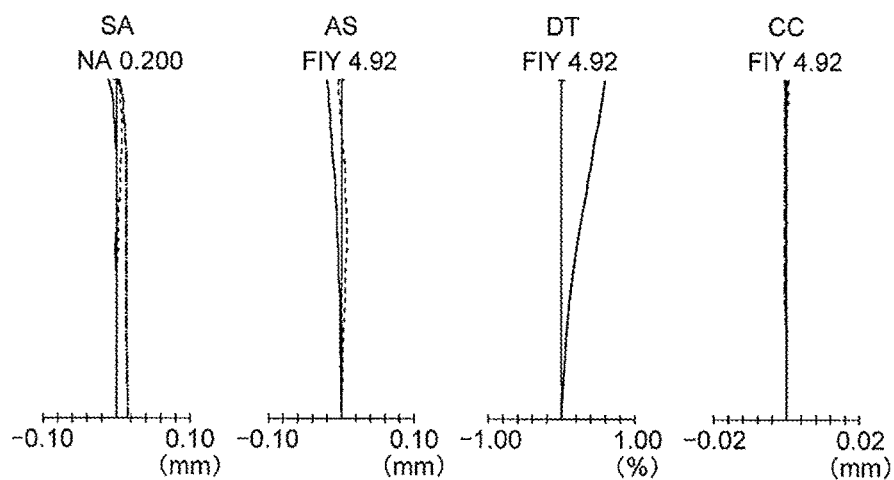

FIG. 21A
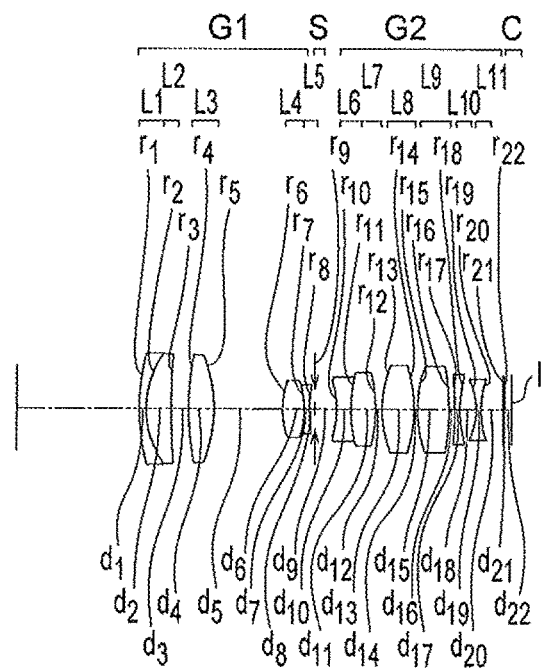
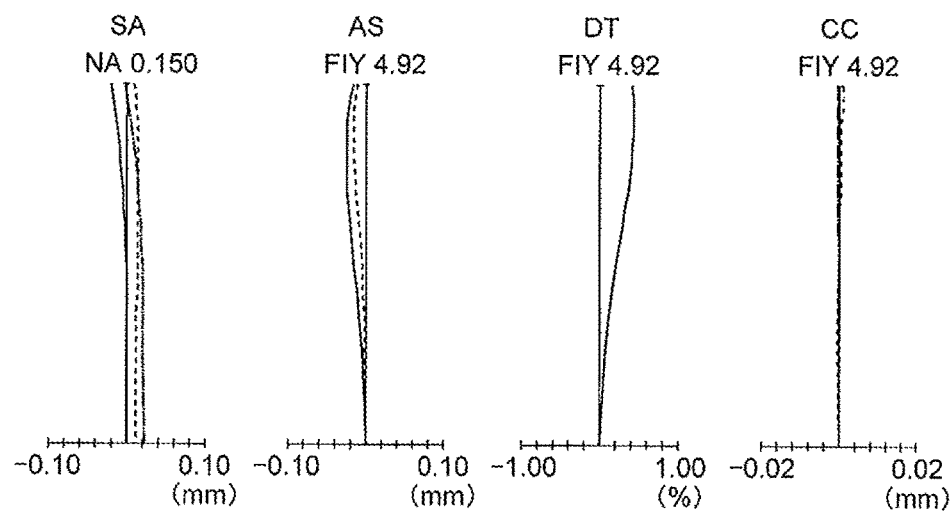
FIG. 21B   FIG. 21C   FIG. 21D   FIG. 21E

IMAGE PICKUP APPARATUS AND IMAGE PICKUP SYSTEM

CROSS-REFERENCE TO RELATED APPLICATION

The present application is a continuation application of PCT/JP2014/076711 filed on Oct. 6, 2014 which is based upon and claims the benefit of priority from Japanese Patent Application No. 2013-237888 filed on Nov. 18, 2013; the entire contents of which are incorporated herein by reference.

BACKGROUND OF THE INVENTION

Field of the Invention

The present invention relates to an image pickup apparatus and an image pickup system.

Description of the Related Art

In a case of observing a sample having a width (area) of certain degree, a method in which, upon observing the overall sample initially, a site to be observed in detail is identified, and thereafter, the site to be observed in detail is magnified and observed, has been adopted heretofore. When it is possible to photograph the overall sample, a part of an image captured can be magnified digitally, and the magnified image can be displayed. Digital magnification of an image is called as digital zooming.

As an optical system that is capable of capturing an object to be measured having a large area, a lens for photometry described in Japanese Patent Application Laid-open Publication No. 2003-195166 is available.

SUMMARY OF THE INVENTION

An image pickup apparatus according to an aspect of the present invention comprises an image pickup element and an optical system, and the image pickup element includes a plurality of pixels which converts light intensity to an electric signal, and the plurality of pixels is arranged in rows two-dimensionally, and an optical image is formed on the image pickup element by the optical system, and the optical system includes in order from an object side, a first lens unit which includes a plurality of lenses, a stop, and a second lens unit which includes a plurality of lenses, and the first lens unit includes a first object-side lens which is disposed nearest to an object, and the second lens unit includes a second image-side lens which is disposed nearest to an image, and the following conditional expressions (1), (2), (3), (4), and (5) are satisfied:

$$3250 < 2Y/p \quad (1),$$

$$-1.0 < \beta \quad (2),$$

$$CRA_{obj} < 10 \text{ deg} \quad (3),$$

$$2.0 < L_L/\sqrt{(Y \times Y_{obj})} < 15.0 \quad (4), \text{ and}$$

$$0.5 < L_{TL}/D_{oi} < 0.95 \quad (5),$$

where,

Y denotes a maximum image height in the overall optical system, p denotes a pixel pitch in the image pickup element, β denotes an imaging magnification of the optical system, $CRA_{obj}$ denotes a maximum angle from among angles made by a plurality of principal rays incident on the first object-side lens, with an optical axis, $L_L$ denotes a distance on the optical axis from an object-side surface of the first object-side lens up to an image-side surface of the second image-side lens, $Y_{obj}$ denotes a maximum object height, $L_{TL}$ denotes a distance on the optical axis from the object-side surface of the first object-side lens up to the image, and $D_{oi}$ denotes a distance on the optical axis from the object up to the image, and regarding the sign of the angle, the angle is let to be negative when measured in a clockwise direction from the optical axis, and the angle is let to be positive when measured in a counterclockwise direction from the optical axis.

An image pickup apparatus according to another aspect of the present invention comprises an image pickup element and an optical system, wherein the image pickup element includes a plurality of pixels which converts light intensity to an electric signal, and the plurality of pixels is arranged in rows two-dimensionally, and an optical image is formed on the image pickup element by the optical system, and the optical system includes in order from an object side, a first lens unit which includes a plurality of lenses, a stop, and a second lens unit which includes a plurality of lenses, and the first lens unit includes a first object-side lens which is disposed nearest to an object, and the second lens unit includes a second image-side lens which is disposed nearest to an image, and the first lens unit includes an object-side lens unit having a positive refractive power as a whole, which is disposed nearest to the object, and the object-side lens unit includes a lens which satisfies the following conditional expression (10), and the following conditional expressions (1), (2), (4), and (11) are satisfied:

$$3250 < 2Y/p \quad (1),$$

$$-1.0 < \beta \quad (2),$$

$$2.0 < L_L/\sqrt{(Y \times Y_{obj})} < 15.0 \quad (4),$$

$$0.6 < \phi_{G1o} \times |\beta|/Y \quad (10), \text{ and}$$

$$0.0 < \beta_{G1o} \quad (11),$$

where,

Y denotes a maximum image height in the overall optical system, p denotes a pixel pitch in the image pickup element, β denotes an imaging magnification of the optical system, $L_L$ denotes a distance on the optical axis from an object-side surface of the first object-side lens up to an image-side surface of the second image-side lens, $Y_{obj}$ denotes a maximum object height, $\phi_{G1o}$ denotes an effective aperture of all lenses in the object-side lens unit, and $\beta_{G1o}$ denotes an imaging magnification of the object-side lens unit.

Moreover, an image pickup system according to the present invention comprises the abovementioned image pickup apparatus,
a stage which holds an object, and
a illumination apparatus which illuminates the object.

BRIEF DESCRIPTION OF THE DRAWINGS

FIG. 1A is a cross-sectional view along an optical axis showing an optical arrangement of an optical system according to an example 1, and FIG. 1B, FIG. 1C, FIG. 1D, and FIG. 1E are aberration diagrams of the optical system according to the example 1;

FIG. 4A is a cross-sectional view along an optical axis showing an optical arrangement of an optical system according to an example 4, and FIG. 4B, FIG. 4C, FIG. 4D, and FIG. 4E are aberration diagrams of the optical system according to the example 4;

FIG. 5A is a cross-sectional view along an optical axis showing an optical arrangement of an optical system according to an example 5, and FIG. 5B, FIG. 5C, FIG. 5D, and FIG. 5E are aberration diagrams of the optical system according to the example 5;

FIG. 6A is a cross-sectional view along an optical axis showing an optical arrangement of an optical system according to an example 6, and FIG. 6B, FIG. 6C, FIG. 6D, and FIG. 6E are aberration diagrams of the optical system according to the example 6;

FIG. 7A is a cross-sectional view along an optical axis showing an optical arrangement of an optical system according to an example 7, and FIG. 7B, FIG. 7C, FIG. 7D, and FIG. 7E are aberration diagrams of the optical system according to the example 7;

FIG. 8A is a cross-sectional view along an optical axis showing an optical arrangement of an optical system according to an example 8, and FIG. 8B, FIG. 8C, FIG. 8D, and FIG. 8E are aberration diagrams of the optical system according to the example 8;

FIG. 12A is a cross-sectional view along an optical axis showing an optical arrangement of an optical system according to an example 12, and FIG. 12B, FIG. 12C, FIG. 12D, and FIG. 12E are aberration diagrams of the optical system according to the example 12;

FIG. 13A is a cross-sectional view along an optical axis showing an optical arrangement of an optical system according to an example 13, and FIG. 13B, FIG. 13C, FIG. 13D, and FIG. 13E are aberration diagrams of the optical system according to the example 13;

FIG. 14A is a cross-sectional view along an optical axis showing an optical arrangement of an optical system according to an example 14, and FIG. 14B, FIG. 14C, FIG. 14D, and FIG. 14E are aberration diagrams of the optical system according to the example 14;

FIG. 16A is a cross-sectional view along an optical axis showing an optical arrangement of an optical system according to an example 16, and FIG. 16B, FIG. 16C, FIG. 16D, and FIG. 16E are aberration diagrams of the optical system according to the example 16;

FIG. 19A is a cross-sectional view along an optical axis showing an optical arrangement of an optical system according to an example 19, and FIG. 19B, FIG. 19C, FIG. 19D, and FIG. 19E are aberration diagrams of the optical system according to the example 19;

FIG. 20A is a cross-sectional view along an optical axis showing an optical arrangement of an optical system according to an example 20, and FIG. 20B, FIG. 20C, FIG. 20D, and FIG. 20E are aberration diagrams of the optical system according to the example 20;

FIG. 21A is a cross-sectional view along an optical axis showing an optical arrangement of an optical system according to an example 21, and FIG. 21B, FIG. 21C, FIG. 21D, and FIG. 21E are aberration diagrams of the optical system according to the example 21;

DETAILED DESCRIPTION OF THE INVENTION

Figure 2A:
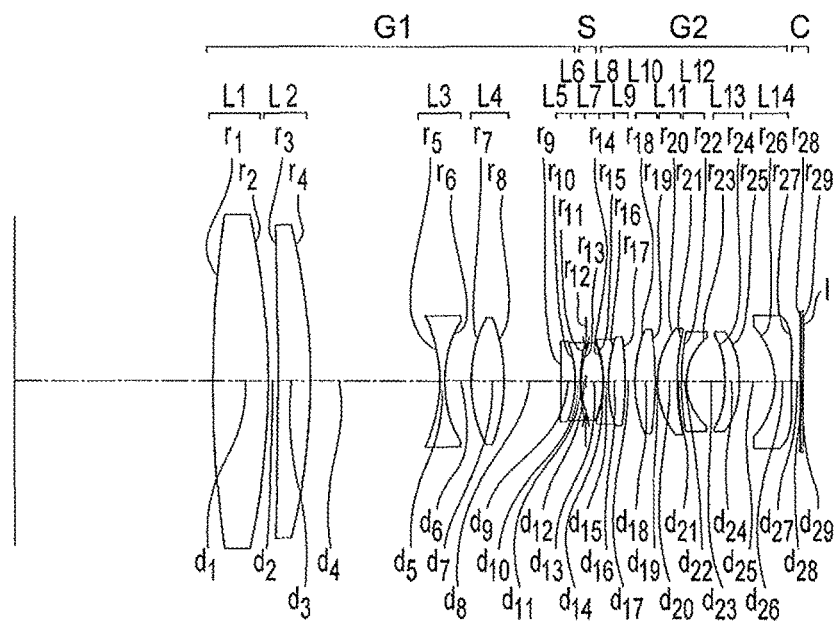
FIG. 2A is a cross-sectional view along an optical axis showing an optical arrangement of an optical system according to an example 2.
Figure 2B:
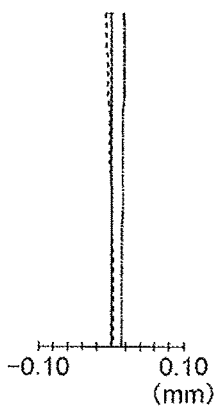
FIG. 2B, FIG. 2C, FIG. 2D, and FIG. 2E are aberration diagrams of the optical system according to the example 2.
Figure 2C:
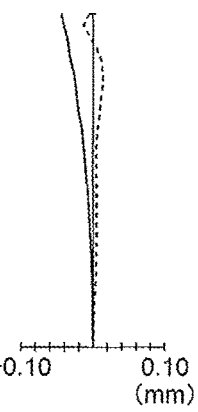
Figure 2D:
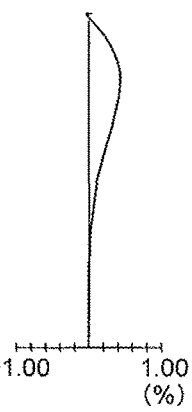
Figure 2E:
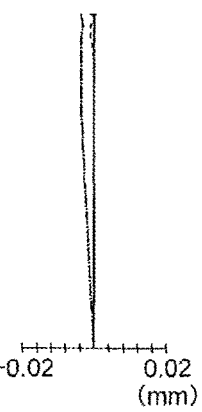

Prior to explaining examples, action and effect of embodiments according to certain aspects of the present invention will be described below. An action and effect of the present embodiment will be described specifically by describing concrete examples. However, similar to a case of the examples to be described later, the aspects exemplified thereof are some of the aspects included in the present invention, and there is a large number of variations in these aspects. Therefore, the present invention is not restricted to the aspects that are exemplified.

Moreover, in the following description, a 'sample' is appropriately let to be an 'object', and a 'sample image' is appropriately let to be an 'image'.

Also, in the following description, marginal ray is a ray which emerge from an object point on an optical axis and pass through a peripheral portion of an entrance pupil of an optical system. A marginal ray which emerges from an object point on the optical axis is let to be axial marginal light ray, and a marginal ray which emerges from an off-axis object point are let to be off-axis marginal light ray. Moreover, an optical system according to the present embodiment is an optical system in which, it is presumed that an object is at a finite distance from the optical system (finite correction optical system).

Moreover, in an image pickup apparatus using the optical system according to the present embodiment, enlarged display of an image that has been captured is possible by digital zooming. Therefore, optical systems of these embodiments have a high resolution as various aberrations have been corrected favorably, and also, are capable of forming an image over a wide area of observation. In the optical systems of these embodiments, particularly, since a longitudinal chromatic aberration and an off-axis chromatic aberration are corrected favorably, by combining image pickup elements with small pixel pitch, it is possible to achieve an enlarged image with high resolution even in a case in which, an image captured has been magnified by digital zooming.

An image pickup apparatus according to a first embodiment of the present invention comprises an image pickup element and an optical system. The image pickup element includes a plurality of pixels which convert light intensity to an electric signal, and the plurality of pixels is arranged in rows two-dimensionally. An optical image is formed on the image pickup element by the optical system, and the optical system includes in order from an object side, a first lens unit which includes a plurality of lenses, a stop, and a second lens unit which includes a plurality of lenses. The first lens unit includes a first object-side lens which is disposed nearest to an object, and the second lens unit includes a second image-side lens which is disposed nearest to an image. The following conditional expressions (1), (2), (3), (4), and (5) are satisfied:

$$3250 < 2Y/p \quad (1),$$

$$-1.0 < \beta \quad (2),$$

$$CRA_{obj} < 10 \text{ deg} \quad (3),$$

$$2.0 < L_L/\sqrt{(Y \times Y_{obj})} < 15.0 \quad (4), \text{ and}$$

$$0.5 < L_{TL}/D_{oi} < 0.95 \quad (5),$$

where,

Y denotes a maximum image height in the overall optical system, p denotes a pixel pitch in the image pickup element, β denotes an imaging magnification of the optical system, $CRA_{obj}$ denotes a maximum angle form among angles made by a plurality of principal rays incident on the first object-side lens, with an optical axis, $L_L$ denotes a distance on the optical axis from an object-side surface of the first object-side lens up to an image-side surface of the second image-side lens, $Y_{obj}$ denotes a maximum object height, $L_{TL}$ denotes a distance on the optical axis from the object-side surface of the first object-side lens up to the image, and $D_{oi}$ denotes a distance on the optical axis from the object up to the image, and regarding the sign of the angle, the angle is let to be negative when measured in a clockwise direction from the optical axis, and the angle is let to be positive when measured in a counterclockwise direction from the optical axis.

The image pickup apparatus according to the present embodiment includes the image pickup element and the optical system. Here, the image pickup element includes the plurality of pixels which convert light intensity to an electric signal, and the plurality of pixels is arranged in rows two-dimensionally. On the other hand, the optical system includes the plurality of lens units and the stop. An optical image is formed by the optical system. Moreover, the image pickup element is disposed such that a position of the optical image and a position of an image pickup surface of the image pickup element coincide. Accordingly, the optical image is formed on the image pickup element.

The optical system includes in order from the object side, the first lens unit which includes a plurality of lenses, the stop, and the second lens unit which includes the plurality of lenses. Here, it is preferable that lens units in the optical system include the first lens unit and the second lens unit. It is preferable that the stop is an aperture stop.

It is preferable that the first lens unit includes the first object-side lens which is disposed nearest to the object. Moreover, it is preferable that the first lens unit includes a first image-side lens which is disposed nearest to the image. It is preferable that the second lens unit includes a second object-side lens which is disposed nearest to the object. Furthermore, it is preferable that the second lens unit includes the second image-side lens which is disposed nearest to the image.

By the image pickup apparatus including the image pickup element which satisfies conditional expression (1) and the optical system which satisfies conditional expression (2), it is possible to secure a wide area of observation and high resolution, and to small-size the image pickup apparatus. By securing the wide area of observation or wide area of capturing, it is possible to observe the whole sample. Moreover, since it is possible to secure high resolution, it is possible to observe a detailed portion of the sample even when an image that has been captured is magnified.

By satisfying conditional expression (3), it is possible to secure appropriately a telecentricity on the object side. In other words, it is possible to make an off-axis principal light ray incident on the first lens unit from the object further parallel to the optical axis. Accordingly, it is possible to make the optical system to be used in the image pickup apparatus of the present embodiment to be an optical system which is more telecentric on the object side.

In the optical system which is telecentric on the object side, a fluctuation in magnification is small. In other words, even when a distance from the optical system up to the object changes to some extent, it is possible to suppress a fluctuation in a size of an optical image formed by the optical system. For such reason, in a case in which, an optical system to be used in the image pickup apparatus of the present embodiment is used for dimension measurement for example, even when an object position with respect to the optical system changes to some extent in an optical axial direction, and accordingly, the distance from the optical system up to the object changes to some extent, the fluctuation in the size of the optical image is small. Therefore, in the image pickup apparatus of the present embodiment, even when the distance from the optical system up to the object changes to some extent, it is possible to measure the size of the object accurately. The size of the object is a size in a plane perpendicular to the optical axis.

By satisfying conditional expression (4), it is possible to shorten the overall length of the optical system while securing a favorable optical performance.

By making so as not to fall below a lower limit value of conditional expression (4), since it is possible to suppress a refraction effect of the overall optical system from becoming excessively large, it is possible to secure the optical performance favorably. By making so as not to exceed an upper limit value of conditional expression (4), it is possible to shorten further the overall length of the optical system.

Moreover, by satisfying conditional expression (5), it is possible suppress the occurrence of off-axis aberration in particular.

By making so as not to fall below a lower limit value of conditional expression (5), it is possible to suppress the height of an off-axis light ray incident on the first lens unit from becoming excessively high. As a result, in the first lens unit, the correction of off-axis aberration, particularly, distortion and astigmatism, becomes easy.

By making so as not to exceed an upper limit value of conditional expression (5), it is possible to widen a distance at which, the focus can be adjusted. For instance, in a case in which, the object has a level difference (recess or projection), for even larger level difference, it is possible to make an arrangement such that a lower-side surface of the level difference is focused without the optical system making a contact with an upper-side surface of the level difference.

Here, it is preferable that the following conditional expression (3') is satisfied instead of conditional expression (3).

$$0.10 \text{ deg} < CRA_{obj} < 8.00 \text{ deg} \quad (3')$$

Moreover, it is more preferable that the following conditional expression (3") is satisfied instead of conditional expression (3).

$$0.30 \text{ deg} < CRA_{obj} < 7.00 \text{ deg} \quad (3'')$$

Furthermore, it is even more preferable that the following conditional expression (3''') is satisfied instead of conditional expression (3).

$$0.50 \text{ deg} < CRA_{obj} < 6.00 \text{ deg} \quad (3''')$$

Here, it is preferable that the following conditional expression (4') is satisfied instead of conditional expression (4).

$$3.0 < L_L/\sqrt{(Y \times Y_{obj})} < 14.0 \quad (4')$$

Moreover, it is more preferable that the following conditional expression (4") is satisfied instead of conditional expression (4).

$$4.0 < L_L/\sqrt{(Y \times Y_{obj})} < 13.0 \quad (4'')$$

Furthermore, it is even more preferable that the following conditional expression (4''') is satisfied instead of conditional expression (4).

$$5.0 < L_L/\sqrt{(Y \times Y_{obj})} < 12.0 \quad (4''')$$

Here, it is preferable that the following conditional expression (5') is satisfied instead of conditional expression (5).

$$0.55 < L_{TL}/D_{oi} < 0.93 \quad (5')$$

Moreover, it is more preferable that the following conditional expression (5") is satisfied instead of conditional expression (5).

$$0.60 < L_{TL}/D_{oi} < 0.90 \quad (5'')$$

Furthermore, it is even more preferable that the following conditional expression (5''') is satisfied instead of conditional expression (5).

$$0.65 < L_{TL}/D_{oi} < 0.88 \quad (5''')$$

By satisfying conditional expression (4), and further, by satisfying conditional expression (5), it is possible to suppress the occurrence of off-axis aberration.

Moreover, in the image pickup apparatus according to the present embodiment, it is preferable that the first lens unit includes a first image-side lens which is disposed nearest to the image, and the second lens unit includes a second object-side lens which is disposed nearest to the object, and the following conditional expression (6) is satisfied:

$$D_{G1G2}/\phi_s < 2.0 \quad (6),$$

where, $D_{G1G2}$ denotes a distance on the optical axis from an image-side surface of the first image-side lens up to an object-side surface of the second object-side lens, and $\phi_s$ denotes a diameter of the stop.

By satisfying conditional expression (6), it is possible to secure appropriately a balance of a refraction effect in the first lens unit and a refraction effect in the second lens unit, while shortening the overall length of the optical system. As a result, it is possible to correct favorably a chromatic aberration of magnification and a longitudinal chromatic aberration.

By making so as not to exceed an upper limit value of conditional expression (6), it is possible to not let an angle of incidence of an off-axis light beam from the first lens unit up to the second lens unit to be excessively small, and to suppress the refraction effect in the first lens unit from becoming excessively large. Therefore, it is possible to make small a diameter of the optical system while correcting favorably the chromatic aberration of magnification and the longitudinal chromatic aberration in particular.

By satisfying conditional expressions (4) and (5), and furthermore, by satisfying conditional expression (6), more favorable correction of the chromatic aberration of magnification and the longitudinal chromatic aberration, and further small-sizing of the diameter of the optical system are possible.

Here, it is preferable that the following conditional expression (6') is satisfied instead of conditional expression (6).

$$0.003 < D_{G1G2}/\phi_s < 1.500 \quad (6')$$

Moreover, it is more preferable that the following conditional expression (6") is satisfied instead of conditional expression (6).

$$0.005 < D_{G1G2}/\phi_s < 1.000 \quad (6'')$$

Furthermore, it is even more preferable that the following conditional expression (6''') is satisfied instead of conditional expression (6).

$$0.007 < D_{G1G2}/\phi_s < 0.800 \quad (6''')$$

In the image pickup apparatus according to the present embodiment, it is preferable that the following conditional expression (7) is satisfied:

$$0.03 < D_{max}/L_L < 0.5 \quad (7)$$

where, $D_{max}$ denotes a maximum distance form among distances on the optical axis between the adjacent lenses in the optical system, and $L_L$ denotes the distance on the optical axis from the object-side surface of the first object-side lens up to the image-side surface of the second image-side lens.

By making so as not to fall below a lower limit value of conditional expression (7), it is possible to reduce deterioration of aberration due to a manufacturing error. For example, decentering of a lens at the time of lens assembling is available as the manufacturing error.

By making so as not to exceed an upper limit value of conditional expression (7), even in a case in which, a numerical aperture on the object side is large, it is possible to suppress the height of an off-axis marginal ray with respect to the height of an axial marginal ray from changing substantially between the lenses. For example, let the adjacent lenses be a lens LA and a lens LB. The height of an off-axis marginal ray at the lens LA differs from the height of an off-axis marginal ray at the lens LB. However, by letting the distance between the lens LA and the lens LB to be appropriate, it is possible to make the difference between the heights at the lens LA and the lens LB small. As a result, since it is possible to make small the difference between the chromatic aberration in the off-axis light beam incident on the lens LA and the chromatic aberration in the off-axis light beam emerging from the lens LB, it is possible to suppress the occurrence of chromatic coma.

Here, it is preferable that the following conditional expression (7') is satisfied instead of conditional expression (7).

$$0.035 < D_{max}/L_L < 0.450 \quad (7')$$

Moreover, it is more preferable that the following conditional expression (7") is satisfied instead of conditional expression (7).

$$0.040 < D_{max}/L_L < 0.400 \quad (7'')$$

Furthermore, it is even more preferable that the following conditional expression (7''') is satisfied instead of conditional expression (7).

$$0.050 < D_{max}/L_L < 0.350 \quad (7''')$$

Optical elements having both sides flat, such as a parallel flat plate, a prism, and a beam splitter are not included in lenses. In a case in which, such an optical element is disposed between two lenses, $D_{max}$ is a total of the following (I), (II), and (III). (I) a distance on the optical axis between one lens of the two lenses and the optical element, (II) a distance between two flat surfaces of the optical element, and (III) a distance on the optical axis between the optical element and the remaining lens of the two lenses.

In the image pickup apparatus, it is preferable that the following conditional expression (8) is satisfied:

$$0.1 < D_{G2max}/Y < 1.5 \quad (8),$$

where, $D_{G2max}$ denotes a maximum distance form among distances on the optical axis between the adjacent lenses in the second lens unit, and Y denotes the maximum image height in the overall optical system.

By making so as not to fall below a lower limit value of conditional expression (8), it is possible to reduce deterioration of aberration due to a manufacturing error. For example, decentering of a lens at the time of lens assembling is available as the manufacturing error.

By making so as not to exceed an upper limit value of conditional expression (8), even in a case in which, the numerical aperture on the object side is large, it is possible to suppress the height of an off-axis marginal ray with respect to the height of an axial marginal ray from changing substantially between the lenses. For example, let the adjacent lenses be a lens LA and a lens LB. The height of an off-axis marginal ray at the lens LA differs from the height of an off-axis marginal ray at the lens LB. However, by letting the distance between the lens LA and the lens LB to be appropriate, it is possible to make the difference between the heights at the lens LA and the lens LB small. As a result, since it is possible to make small the difference between the chromatic aberration in the off-axis light beam incident on the lens LA and the chromatic aberration in the off-axis light beam emerging from the LB, it is possible the suppress the occurrence of chromatic coma.

Here, it is preferable that the following conditional expression (8') is satisfied instead of conditional expression (8).

$$0.20 < D_{G2max}/Y < 1.30 \quad (8')$$

Moreover, it is more preferable that the following conditional expression (8") is satisfied instead of conditional expression (8).

$$0.30 < D_{G2max}/Y < 1.10 \quad (8'')$$

Furthermore, it is even more preferable that the following conditional expression (8''') is satisfied instead of conditional expression (8).

$$0.35 < D_{G2max}/Y < 1.00 \quad (8''')$$

Optical elements having both sides flat, such as a parallel flat plate, a prism, and a beam splitter are not included in lenses. In a case in which, such an optical element is disposed between two lenses, $D_{G2max}$ is a total of the following (I), (II), and (III). (I) a distance on the optical axis between one lens of the two lenses and the optical element, (II) a distance between two flat surfaces of the optical element, and (III) a distance on the optical axis between the optical element and the remaining lens of the two lenses.

In the image pickup apparatus of the present embodiment, it is preferable that the following conditional expression (9) is satisfied:

$$-1.5 < f/f_{G2} < 10.0 \quad (9),$$

where, f denotes a focal length of the overall optical system, and $f_{G2}$ denotes a focal length of the second lens unit.

By satisfying conditional expression (9), it is possible to maintain the refraction effect of the second lens unit. Therefore, it is possible to achieve both namely, shortening the overall length of the optical system and more favorable correction of axial aberration in particular.

Here, it is preferable that the following conditional expression (9') is satisfied instead of conditional expression (9).

$$-1.30 \leq f/f_{G2} < 8.00 \quad (9')$$

Moreover, it is more preferable that the following conditional expression (9") is satisfied instead of conditional expression (9).

$$-1.10 \leq f/f_{G2} < 6.00 \quad (9'')$$

Furthermore, it is even more preferable that the following conditional expression (9''') is satisfied instead of conditional expression (9).

$$-0.90 < f/f_{G2} < 5.00 \quad (9''')$$

Also, it is even more preferable that the following conditional expressions (9-1) or (9-2) are satisfied instead of conditional expression (9).

$$-1.5 < f/f_{G2} \leq -0.40 \quad (9\text{-}1)$$

$$0.08 \leq f/f_{G2} < 10.0 \quad (9\text{-}2)$$

Moreover, in the image pickup apparatus of the present embodiment, it is preferable that at least one cemented lens is disposed on the object side of the stop or on the image side of the stop.

On the object side of the stop (aperture stop) or on the image side of the stop, the height of the axial marginal ray is high. Therefore, by disposing a cemented lens on the object side of the stop or on the image side of the stop, the cemented lens is disposed at a location of high axial marginal ray. As a result, it is possible to correct the longitudinal chromatic aberration favorably.

Moreover, in the image pickup apparatus of the present embodiment, it is preferable that the second lens unit includes a predetermined lens unit nearest to the image, and the predetermined lens unit has a negative refractive power as a whole, and includes a single lens having a negative refractive power or two lenses, and the two lenses include a lens having a negative refractive power and a lens having either a positive refractive power or a negative refractive power, in order from the object side.

By making such an arrangement, it is possible to suppress a rapid change in the height of a principal ray in the second lens unit, while shortening the overall length of the optical system. Therefore, it is possible to correct favorably the chromatic aberration of magnification in particular.

In the image pickup apparatus of the present invention, it is preferable that the first lens unit includes an object-side lens unit which is disposed nearest to the object, and the object-side lens unit has a positive refractive power as a whole, and includes a lens which satisfies the following conditional expression (10), and the following conditional expression (11) is satisfied:

$$0.6 < \phi_{G1o} \times |\beta|/Y \quad (10), \text{ and}$$

$$0.0 < \beta_{G1o} \quad (11),$$

where, $\phi_{G1o}$ denotes an effective aperture of all lenses in the object-side lens unit, β denotes the imaging magnification of the optical system, Y denotes the maximum image height in the overall optical system, and $\beta_{G1o}$ denotes an imaging magnification of the object-side lens unit.

The object-side lens unit has a positive refractive power, and is disposed nearest to the object in the first lens unit. In this case, since the object-side lens unit is positioned on the object side of the stop, it is possible to secure appropriately the telecentricity on the object side.

By including the lens which satisfies conditional expression (10), even in a case in which, a position at which, the off-axis principal ray is incident on the first lens unit is away from an optical axis of a lens surface, it is possible to make the off-axis principal ray incident on the first lens unit. Therefore, it is possible to secure appropriately the telecentricity on the object side.

It is preferable that $\phi_{G1o}$ is an effective aperture of an object-side lens surface of each lens. However, an effective aperture of an image-side surface of each lens may be let to be $\phi_{G1o}$. Moreover, in one lens, $\phi_{G1o}$ may be let to be the effective aperture of the object-side lens surface, and in another lens, $\phi_{G1o}$ may be let to be the effective aperture of the object-side lens surface.

Moreover, $\phi_{G1o}$ is a distance (hereinafter, appropriately referred to as a "predetermined distance") obtained by doubling a distance from a position at which, an outermost light ray passes through a lens surface, up to a center of the lens. The effective aperture may be equal to or more than the predetermined distance. For instance, in a case in which, an inner diameter of a holding frame which holds the lens is larger than the predetermined distance, the inner diameter of the holding frame may be deemed as the effective aperture. Moreover, in a case in which, the lens includes a curved surface, and a flat surface which is formed on an outer periphery of the curved surface, a portion of the curved surface may be deemed as the effective aperture.

In such manner, there are cases in which, the effective aperture is determined by the predetermined distance, and cases in which, the effective aperture is determined by a distance longer than the predetermined distance. In the case in which, the effective aperture is determined by the distance longer than the predetermined distance, a area through which light passes and a area in which, the shape of the lens surface is curved when the lens held by a holding member was viewed from the object side or the image side, may be let to be the effective aperture.

By satisfying conditional expression (11), it is possible to position a principal point of the first lens unit on the object side. Accordingly, it is possible to correct favorably an off-axis aberration such as the distortion, the astigmatism, and the coma.

By making so as not to fall below a lower limit value of conditional expression (11), it is possible to suppress the refraction effect of the object-side lens unit from becoming excessively large. Therefore, it is possible to suppress the occurrence of off-axis aberration such as distortion, astigmatism, and coma.

By satisfying conditional expressions (4) and (5), moreover, by including the lens satisfying conditional expression (10), and by satisfying conditional expression (11), it is possible to further shorten the overall length of the optical system, to suppress the occurrence of distortion, astigmatism and coma, and to correct favorably these aberrations.

Here, it is preferable that the following conditional expression (11') is satisfied instead of conditional expression (11).

$$0.1 < \beta_{G1o} < 1000 \quad (11')$$

Moreover, it is more preferable that the following conditional expression (11") is satisfied instead of conditional expression (11).

$$0.5 < \beta_{G1o} < 200 \quad (11'')$$

Furthermore, it is even more preferable that the following conditional expression (11''') is satisfied instead of conditional expression (11).

$$1.0 < \beta_{G1o} < 50.0 \quad (11''')$$

In the image pickup apparatus according to the present embodiment, it is preferable that the first lens unit includes in order from the object side, the object-side lens unit and the image-side lens unit.

By disposing the image-side lens unit on the image side of the object-side lens unit, it is possible to correct favorably the coma in the first lens unit, as well as to correct favorably the axial aberration such as the spherical aberration.

By satisfying conditional expressions (4), (5), and (11), by including the lens which satisfies conditional expression (10), and besides, by having such an arrangement, it is possible to carry out favorable correction of the spherical aberration and favorable correction of the coma in the first lens unit.

In the image pickup apparatus according to the present embodiment, it is preferable that the object-side lens unit includes at least two positive lenses, and at least one negative lens is disposed between the object-side lens unit and the stop.

At a position of the object-side lens unit, the height of an off-axis light ray incident on the object-side lens unit is high. Consequently, by sharing the positive refractive power of the object-side lens unit by at least two lenses, it is possible to correct favorably the distortion, the astigmatism, and the coma.

Moreover, by disposing at least one negative lens between the object-side lens unit and the stop, it is possible to correct favorably the coma aberration and the chromatic aberration of magnification.

By satisfying conditional expression (11), and by further including such an arrangement, it is possible to correct more favorably the distortion, the astigmatism, the coma and the chromatic aberration of magnification.

In the image pickup apparatus according to the present embodiment, it is preferable that the following conditional expression (12) is satisfied:

$$0.3 < f_{G1o}/f < 12.0 \quad (12),$$

where, $f_{G1o}$ denotes a focal length of the object-side lens unit, and f denotes the focal length of the overall optical system.

By making so as not to fall below a lower limit value of conditional expression (12), it is possible to suppress the positive refractive power of the object-side lens unit from becoming excessively large. Accordingly, it is possible to correct favorably the distortion, the astigmatism, and an off-axis aberration such as the coma.

By making so as not to exceed an upper limit value of conditional expression (12), it is possible to suppress the positive refractive power of the object-side lens unit from becoming excessively small. Accordingly, since it is possible to position a principal point of the optical system on the object side, it is possible to further shorten the overall length of the optical system.

Here, it is preferable that the following conditional expression (12') is satisfied instead of conditional expression (12).

$$0.50 < f_{G1o}/f < 10.00 \quad (12')$$

Moreover, it is more preferable that the following conditional expression (12") is satisfied instead of conditional expression (12).

$$0.70 < f_{G1o}/f < 7.00 \quad (12'')$$

Furthermore, it is even more preferable that the following conditional expression (12''') is satisfied instead of conditional expression (12).

$$0.80 < f_{G1o}/f < 5.00 \quad (12''')$$

In the image pickup apparatus according to the present embodiment, it is preferable that the first lens unit includes in order from the object side, an object-side lens unit and an image-side lens unit, and the image-side lens unit includes a lens which satisfies the following conditional expression (13):

$$\phi_{G1i} \times |\beta|/Y < 0.9 \quad (13),$$

where, $\phi_{G1i}$ denotes an effective aperture of all the lenses in the image-side lens unit, $\beta$ denotes the imaging magnification of the optical system, and Y denotes the maximum image height in the overall optical system.

In the image pickup apparatus according to the present embodiment, it is preferable that the following conditional expression (14) is satisfied:

$$-0.50 < (WD \times \tan(\sin^{-1} NA) - \phi_s/2)/L_{G1s} < 0.10 \quad (14),$$

where,

WD denotes a distance on the optical axis from the object up to the object-side surface of the first object-side lens, NA denotes a numerical aperture on the object side of the optical system, $\phi_s$ denotes the diameter of the stop, and $L_{G1s}$ denotes a distance on the optical axis from the object-side surface of the first object-side lens up to the stop.

In conditional expression (14), WD is the distance on the optical axis from the object up to the object-side surface of the first object-side lens, and will be referred to as working distance in the present specification.

By satisfying conditional expression (14), even when the distance from the optical system up to the object changes to some extent, it is possible to suppress a fluctuation in magnification, or in other words, a fluctuation in the size of an optical image formed by the optical system, while shortening the overall length of the optical system. Moreover, it is possible to correct favorably the axial aberration and the off-axis aberration.

By making so as not to fall below a lower limit value of conditional expression (14), it is possible to maintain appropriately a beam diameter of an axial light ray that has emerged from the first lens unit and is incident on the second lens unit, while securing the necessary working distance. Accordingly, since it is possible to balance refraction effect by the second lens unit and refraction effect by the first lens unit, it is possible to suppress the occurrence of axial aberration, and particularly, spherical aberration.

By making so as not to exceed an upper limit value of conditional expression (14), it is possible to suppress the refraction effect with respect to an axial marginal ray and an off-axis marginal ray in the first lens unit from becoming excessively large. Consequently, it is possible to suppress the occurrence of the axial aberration and the off-axis aberration. With regard to the off-axis aberration, it is possible to suppress the occurrence of astigmatism and coma in particular.

By satisfying conditional expressions (3), (4), and (5), and furthermore, by satisfying conditional expression (14), it is possible to further shorten the overall length of the optical system and to further suppress the occurrence of spherical aberration, astigmatism, and coma.

Moreover, in the image pickup apparatus according to the present embodiment, it is preferable that the first lens unit includes in order from the object side, a lens unit having a positive refractive power and a lens unit having either a positive refractive power or a negative refractive power, and the abovementioned conditional expression (14) is satisfied.

When the first lens unit includes the lens unit having a positive refractive power and the lens unit having a negative refractive power, it is possible to correct the chromatic aberration favorably. Moreover, when the first lens unit includes two lens units, each having a positive refractive power, since it is possible to share the positive refractive power of the first lens unit by two lens units, it is possible to correct favorably the distortion, the astigmatism and the coma.

By satisfying conditional expression (14), even when the distance from the optical system up to the object changes to some extent, it is possible to suppress the fluctuation in magnification, or in other words, the fluctuation in the size of an optical image formed by the optical system, while shortening the overall length of the optical system. Moreover, it is possible to correct favorably the l axial aberration and the off-axis aberration.

By making so as not to fall below the lower limit value of conditional expression (14), it is possible to suppress the refractive power of the lens unit having a positive refractive power from becoming excessively small, while securing the necessary working distance. Consequently, it is possible to maintain appropriately a beam diameter of an axial light ray that is incident on the second lens unit. Accordingly, since it is possible to balance the refraction effect by the second lens unit and the refraction effect by the first lens unit, it is possible to suppress the occurrence of axial aberration, and particularly spherical aberration.

By making so as not to exceed an upper limit value of conditional expression (14), it is possible to suppress the refractive power of the lens unit having a positive refractive power in particular, from becoming excessively large. Consequently, it is possible to suppress the occurrence of axial aberration and off-axis aberration. With regard to the off-axis aberration, it is possible to suppress the occurrence of astigmatism and coma.

Moreover, by securing appropriately the refractive power of the lens unit having a positive refractive power, it is possible to position a principal point on the object side. Therefore, securing the refractive power of the lens unit having a positive refractive power is quite preferable for shortening the overall length of the optical system.

By satisfying conditional expressions (3), (4), and (5), and furthermore, by satisfying conditional expression (14), it is possible to further shorten the overall length of the optical system and to further suppress the occurrence of spherical aberration, astigmatism, and coma.

Here, it is preferable that the following conditional expression (14') is satisfied instead of conditional expression (14).

$$-0.30<(WD\times\tan(\sin^{-1}NA)-\phi_s/2)/L_{G1s}<0.08 \qquad (14')$$

Moreover, it is more preferable that the following conditional expression (14") is satisfied instead of conditional expression (14).

$$-0.20<(WD\times\tan(\sin^{-1}NA)-\phi_s/2)/L_{G1s}<0.06 \qquad (14")$$

Furthermore, it is even more preferable that the following conditional expression (14''') is satisfied instead of conditional expression (14).

$$-0.10<(WD\times\tan(\sin^{-1}NA)-\phi_s/2)/L_{G1s}<0.04 \qquad (14''')$$

In the image pickup apparatus according to the present embodiment, it is preferable that the following conditional expression (15) is satisfied:

$$0.60<\phi_s/(2\times WD\times\tan(\sin^{-1}NA))<12.0 \qquad (15),$$

where, $\phi_s$ denotes the diameter of the stop,

WD denotes a distance on the optical axis from the object up to the object-side surface of the first object-side lens, and NA denotes a numerical aperture on the object side of the optical system.

By satisfying conditional expression (15), it is possible to secure the necessary working distance, as well as to correct the off-axis aberration favorably, while further shortening the overall length of the optical system.

By making so as not to fall below a lower limit value of conditional expression (15), it is possible to suppress from becoming excessively large the refraction effect of the positive lens unit disposed on the object side in particular, from among the lens units in the first lens unit, while securing the necessary working distance. Therefore, it is possible correct favorably an axial aberration such as the spherical aberration.

By making so as not to exceed an upper limit value of conditional expression (15), it is possible to suppress the beam diameter of light incident on the first lens unit from becoming excessively large. Consequently, it is possible to suppress the occurrence of off-axis aberration, and particularly, astigmatism and coma.

By satisfying conditional expressions (4) and (5), and furthermore, by satisfying conditional expression (15), it is possible to secure the necessary working distance, to further shorten the overall length of the optical system, to further suppress the occurrence of astigmatism and coma, and to correct the spherical aberration more favorably.

Here, it is preferable that the following conditional expression (15') is satisfied instead of conditional expression (15).

$$0.80<\phi_s/(2\times WD\times\tan(\sin^{-1}NA))<10.00 \qquad (15')$$

Moreover, it is more preferable that the following conditional expression (15") is satisfied instead of conditional expression (15).

$$1.20<\phi_s/(2\times WD\times\tan(\sin^{-1}NA))<8.00 \qquad (15")$$

Furthermore, it is even more preferable that the following conditional expression (15''') is satisfied instead of conditional expression (15).

$$1.50<\phi_s/(2\times WD\times\tan(\sin^{-1}NA))<6.00 \qquad (15''')$$

Moreover, in the image pickup apparatus according to the present embodiment, it is preferable that the first lens unit includes in order from the object side, a lens unit having a positive refractive power, and a lens unit having either a negative refractive power or a positive refractive power, and the following conditional expression (15-1) is satisfied:

$$0.6<\phi_s/(2\times WD\times\tan(\sin^{-1}NA))<12.0 \qquad (15-1),$$

where, $\phi_s$ denotes the diameter of the stop,

WD denotes the distance on the optical axis from the object up to the object-side surface of the first object-side lens, and NA denotes the numerical aperture on the object side of the optical system.

When the first lens unit includes the lens unit having a positive refractive power and the lens unit having a negative refractive power, it is possible to correct the chromatic aberration favorably. Moreover, when the first lens unit includes two lens units having a positive refractive power, since it is possible to share the positive refractive power of the first lens unit by two lens units, it is possible to correct favorably the distortion, the astigmatism, and the coma.

By satisfying conditional expression (15-1), even when the distance from the optical system up to the object changes to some extent, it is possible to suppress the fluctuation in magnification, or in other words, the fluctuation in the size of an optical image formed by the optical system, while shortening the overall length of the optical system. Accordingly, it is possible to correct favorably the axial aberration and the off-axis aberration.

By making so as not to fall below a lower limit value of conditional expression (15-1), it is possible to suppress the refractive power of the lens unit having a positive refractive power from becoming excessively small, while securing the necessary working distance. Consequently, it is possible to maintain appropriately the beam diameter of the axial light ray that is incident on the second lens unit. Accordingly, since it is possible to balance the refraction effect by the second lens unit and the refraction effect by the first lens unit, it is possible to suppress the occurrence of axial aberration, and particularly the spherical aberration.

By making so as not to exceed an upper limit value of conditional expression (15-1) is not exceeded, it is possible to suppress the refractive power of the lens unit having a positive refractive power in particular, from becoming excessively large. Consequently, it is possible to suppress the occurrence of axial aberration and off-axis aberration. With regard to the off-axis aberration, it is possible to suppress the occurrence of astigmatism and coma.

Moreover, by securing appropriately the refractive power of the lens unit having a positive refractive power, it is possible to position a principal point on the object side. Therefore, securing appropriately the refractive power of the lens unit having a positive refractive power is quite preferable for shortening the overall length of the optical system.

By satisfying conditional expressions (3), (4), and (5), and furthermore, by satisfying conditional expression (15-1), it is possible to further shorten the overall length of the optical system and to further suppress the occurrence of spherical aberration, astigmatism, and coma.

In the image pickup apparatus according to the present embodiment, it is preferable that the following conditional expression (16) is satisfied:

$$0.03 < (Y_{obj} - WD \times \tan CRA_{obj})/L_{G1s} < 1.0 \qquad (16),$$

where, $Y_{obj}$ denotes the maximum object height,

WD denotes the distance on the optical axis from the object up to the object-side surface of the first object-side lens, $CRA_{obj}$ denotes the maximum angle from among angles made by a plurality of principal rays incident on the first object-side lens, with an optical axis, $L_{G1s}$ denotes the distance on the optical axis from the object-side surface of the first object-side lens up to the stop, and regarding the sign of the angle, the angle is let to be negative when measured in the clockwise direction from the optical axis, and the angle is let to be positive when measured in the counterclockwise direction from the optical axis.

By satisfying conditional expression (16), it is possible to achieve both namely, shortening the overall length of the optical system and optimization of off-axis imaging performance, while securing the telecentricity on the object side. It is possible to realize the optimization of off-axis imaging performance by improvement of an off-axis aberration performance (reduction of the off-axis aberration).

By making so as not to fall below a lower limit value of conditional expression (16), it is possible to suppress the refraction effect of the first lens unit from becoming excessively small. Consequently, it is possible to shorten the overall length of the optical system while securing appropriately the telecentricity on the object side.

By making so as not to exceed an upper limit value of conditional expression (16), it is possible to suppress the refraction effect of the first lens unit from becoming excessively large. Consequently, it is possible to suppress the occurrence of off-axis aberration, and particularly, distortion, astigmatism, and coma.

By satisfying conditional expressions (4) and (5), and furthermore, by satisfying conditional expression (16), it is possible to secure appropriately the telecentricity on the object side, to further shorten the overall length of the optical system, and to further suppress the occurrence of distortion, astigmatism, and. Moreover, by suppression of the occurrence of these aberrations, it is possible to further optimize the off-axis imaging performance.

Here, it is preferable that the following conditional expression (16') is satisfied instead of conditional expression (16).

$$0.15 < (Y_{obj} - WD \times \tan CRA_{obj})/L_{G1s} < 0.80 \qquad (16')$$

Moreover, it is more preferable that the following conditional expression (16") is satisfied instead of conditional expression (16).

$$0.20 < (Y_{obj} - WD \times \tan CRA_{obj})/L_{G1s} < 0.70 \qquad (16'')$$

Furthermore, it is even more preferable that the following conditional expression (16''') is satisfied instead of conditional expression (16).

$$0.25 < (Y_{obj} - WD \times \tan CRA_{obj})/L_{G1s} < 0.60 \qquad (16''')$$

In the image pickup apparatus according to the present embodiment, it is preferable that the first lens unit includes in order from the object side, a lens unit having a positive refractive power, and a lens unit having either a negative refractive power or a positive refractive power, and the following conditional expression (16-1) is satisfied:

$$0.03 < (Y_{obj} - WD \times \tan CRA_{obj})/L_{G1s} < 1.0 \qquad (16-1),$$

where, $Y_{obj}$ denotes the maximum object height,

WD denotes the distance on the optical axis from the object up to the object-side surface of the first object-side lens, $CRA_{obj}$ denotes the maximum angle from among angles made by a plurality of principal rays incident on the first object-side lens, with an optical axis, $L_{G1s}$ denotes the distance on the optical axis from the object-side surface of the first object-side lens up to the stop, and regarding the sign of the angle, the angle is let to be negative when measured in the clockwise direction from the optical axis, and the angle is let to be positive when measured in the counterclockwise direction from the optical axis.

When the first lens unit includes the lens unit having a positive refractive power and the lens unit having a negative refractive power, it is possible to correct the chromatic aberration favorably. Moreover, when the first lens unit includes two lens units having a positive refractive power, since the positive refractive power of the first lens unit is shared by the two lens units, it is possible to correct favorably the distortion, the astigmatism, and the coma.

By satisfying conditional expression (16-1), it is possible to achieve both namely, shortening the overall length of the optical system and optimization of off-axis imaging performance, while securing the telecentricity on the object side. It is possible to realize the optimization of off-axis imaging performance by improvement of an off-axis aberration performance (reduction of the off-axis aberration).

By making so as not to fall below a lower limit value of conditional expression (16-1), it is possible to suppress the refraction effect of the lens unit having a positive refractive power from becoming excessively small. Consequently, it is possible to shorten the overall length of the optical system while securing the telecentricity on the object side.

By making so as not to exceed an upper limit value of conditional expression (16-1) is not exceeded, particularly, it is possible to suppress the refraction effect of the lens unit having a positive refractive power from becoming excessively large, from among the lens units in the first lens unit. Consequently, it is possible to suppress the occurrence of off-axis aberration, and particularly, distortion, astigmatism, and coma aberration.

By satisfying conditional expressions (4) and (5), and furthermore, by satisfying conditional expression (16-1), it is possible to secure appropriately the telecentricity on the object side, to further shorten the overall length of the optical system, and to further suppress the occurrence of distortion, astigmatism, and coma. Moreover, by suppression of the occurrence of aberrations, it is possible to further optimize the off-axis imaging performance.

In the image pickup apparatus according to the present embodiment, it is preferable that the first lens unit includes an object-side lens unit which is disposed nearest to the object, and the object-side lens unit has a positive refractive power as a whole, and the object-side lens unit includes at least two positive lenses.

At a position of the object-side lens unit, the height of an off-axis light ray incident on the lens unit having a positive refractive power is high. Consequently, by the object-side lens unit including two or more positive lenses, it is possible to share the refractive power of the object-side lens unit by two or more positive lenses. As a result, it is possible to correct favorably the distortion, the astigmatism, and the coma.

By satisfying conditional expression (16), and by further including such an arrangement, it is possible to correct more favorably the distortion, the astigmatism, and the coma.

In the image pickup apparatus according to the present embodiment, it is preferable that the first lens unit includes an image-side lens unit which is disposed nearest to the image, and, the image-side lens unit includes one or more than one positive lens and one or more than one negative lens.

By including one or more than one positive lens and one or more than one negative lens in the image-side lens unit, it is possible to correct more favorably an axial aberration, and particularly, the spherical aberration and the longitudinal chromatic aberration.

By satisfying conditional expression (16), and by further including such an arrangement, it is possible to correct more favorably the spherical aberration and the longitudinal chromatic aberration.

In the image pickup apparatus according to the present embodiment, it is preferable that the first lens unit includes an image-side lens unit which is disposed nearest to the image, and the following conditional expression (17) is satisfied:

$$-1.5<f_{G1pn}/f_{G1}<0.5 \qquad (17),$$

where, $f_{G1pn}$ denotes a focal length of the image-side lens unit, and $f_{G1}$ denotes a focal length of the first lens unit.

By satisfying conditional expression (17), it is possible to achieve both namely, shortening the overall length of the optical system and securing the necessary working distance.

By satisfying conditional expression (16), and furthermore, by satisfying conditional expression (17), it is possible to shorten the overall length of the optical system and to secure the necessary working distance.

Here, it is preferable that the following conditional expression (17') is satisfied instead of conditional expression (17).

$$-1.3<f_{G1pn}/f_{G1}<0.3 \qquad (17')$$

Moreover, it is more preferable that the following conditional expression (17") is satisfied instead of conditional expression (17).

$$-1.0<f_{G1pn}/f_{G1}<0.2 \qquad (17")$$

Furthermore, it is even more preferable that the following conditional expression (17''') is satisfied instead of conditional expression (17).

$$-0.8<f_{G1pn}/f_{G1}<0.1 \qquad (17''')$$

Also, it is preferable that the following conditional expressions (17-1) or (17-2) are satisfied instead of conditional expression (17).

$$-1.5<f_{G1pn}/f_{G1}\le 0.02 \qquad (17-1)$$

$$0.03\le f_{G1pn}/f_{G1}<0.5 \qquad (17-2)$$

In the image pickup apparatus according to the present embodiment, it is preferable that a positive lens is included on the image side of the stop.

By including the positive lens on the image side of the stop, it is possible to position a principal point of the second lens unit on the object side. Therefore, making such an arrangement is desirable for shortening the overall length of the optical system. Moreover, by making such an arrangement, it is possible to correct the spherical aberration favorably.

In the image pickup apparatus according to the present embodiment, it is preferable that a lens having a negative refractive power is disposed nearest to the image in the second lens unit.

By making such an arrangement, it is possible to secure the necessary back focus while shortening the overall length of the optical system.

In the image pickup apparatus according to the present embodiment, it is preferable that the following conditional expression (18) is satisfied:

$$0.40<D_{os}/D_{oi}<0.90 \qquad (18),$$

where, $D_{os}$ denotes a distance on the optical axis from the object up to the stop, and $D_{oi}$ denotes the distance on the optical axis from the object up to the image.

By making so as not to fall below a lower limit value of conditional expression (18), it is possible to secure appropriately the positive refractive power of the first lens unit, while securing an appropriate thickness of lenses in the first lens unit. As a result, it is possible to correct favorably the chromatic aberration while correcting favorably a monochromatic aberration such as a curvature of field. Moreover, as it is possible to correct favorably the longitudinal chromatic aberration in the first lens unit, an excessive correction of the longitudinal chromatic aberration in the second lens unit becomes unnecessary. Accordingly, since it is possible to correct favorably the chromatic aberration of magnification in the second lens unit, it is possible to correct favorably the chromatic aberration of magnification in the overall optical system.

By making so as not to exceed an upper limit value of conditional expression (18), it is possible to change the height of a principal ray which reaches peripheral of an image comparatively slowly between the stop and the image. Accordingly, it is possible to prevent a radius of curvature of a lens in the second lens unit from becoming excessively small. Therefore, it is possible to correct favorably also the chromatic aberration while correcting favorably the monochromatic aberration such as the curvature of field in the second lens unit.

Here, it is more preferable that the following conditional expression (18') is satisfied instead of conditional expression (18).

$$0.45 < D_{os}/D_{oi} < 0.88 \tag{18'}$$

Moreover, it is more preferable that the following conditional expression (18") is satisfied instead of conditional expression (18).

$$0.50 < D_{os}/D_{oi} < 0.86 \tag{18"}$$

Furthermore, it is even more preferable that the following conditional expression (18''') is satisfied instead of conditional expression (18).

$$0.55 < D_{os}/D_{oi} < 0.84 \tag{18'''}$$

In the image pickup apparatus according to the present embodiment, it is preferable that the following conditional expression (19) is satisfied:

$$0.005 < BF/L_L < 0.4 \tag{19}$$

where,

BF denotes a distance on the optical axis from the image-side surface of the second image-side lens up to the image, and $L_L$ denotes the distance on the optical axis from the object-side surface of the first object-side lens up to the image-side surface of the second image-side lens.

In conditional expression (19), BF is the distance on the optical axis from the image-side surface of the second image-side lens up to the image, and will be referred to as 'back focus' in the present specification.

By making so as not to fall below a lower limit value of conditional expression (19), it is possible to make a distance between the second image-side lens and the image pickup element large. Accordingly, even when a ghost image is generated due to multiple reflections between the second image-side lens and the image pickup element, it is possible to prevent the ghost image from being incident on an image pickup element surface with a high density.

By making so as not to exceed an upper limit value of conditional expression (19), it is possible to prevent an occupation rate of the back focus with respect to the overall length of the optical system from becoming excessively large. Accordingly, since the degree of freedom of positions at the time of disposing the lenses increases, it is possible to correct various aberrations favorably. For instance, by disposing a lens having a function of correcting chromatic aberration between the first lens unit and the second lens unit, and adjusting a positional relationship of these lenses, it is possible to achieve both namely, a favorable correction of the longitudinal chromatic aberration and a favorable correction of the chromatic aberration of magnification.

Here, it is preferable that the following conditional expression (19') is satisfied instead of conditional expression (19).

$$0.007 < BF/L_L < 0.350 \tag{19'}$$

Moreover, it is more preferable that the following conditional expression (19") is satisfied instead of conditional expression (19).

$$0.010 < BF/L_L < 0.300 \tag{19"}$$

Furthermore, it is even more preferable that the following conditional expression (19''') is satisfied instead of conditional expression (19).

$$0.015 < BF/L_L < 0.200 \tag{19'''}$$

In the image pickup apparatus according to the present embodiment, it is preferable that the following conditional expression (20) is satisfied:

$$0.5 < D_{os}/L_{G1} < 4.0 \tag{20},$$

where, $D_{os}$ denotes the distance on the optical axis from the object up to the stop, and $L_{G1}$ denotes a distance on the optical axis from the object-side surface of the first object-side lens up to the image-side surface of the first image-side lens.

By making so as not to fall below a lower limit value of conditional expression (20), it is possible to secure sufficiently a space for disposing the second lens unit. Accordingly, it is possible to increase the degree of freedom of selection of a curvature by securing an appropriate thickness of lenses in the second lens unit, and to dispose a large number of lenses having different peculiarities. Consequently, it is possible to correct the chromatic aberration favorably while correcting favorably the monochromatic aberration in the second lens unit. Moreover, as it is possible to correct favorably the longitudinal chromatic aberration in the second lens unit, excessive correction of the longitudinal chromatic aberration in the first lens unit becomes unnecessary. Accordingly, since it is possible to carry out favorably the correction of chromatic aberration of magnification in the first lens unit, it is possible to correct favorably the chromatic aberration of magnification in the overall optical system.

By making so as not to exceed an upper limit value of conditional expression (20), it is possible to secure appropriately a space for disposing the first lens unit. Accordingly, it is possible to increase the degree of freedom of selection of a curvature by securing an appropriate thickness of lenses in the first lens unit, and to dispose a large number of lenses having different peculiarities. Consequently, it is possible to correct the chromatic aberration favorably while correcting favorably the monochromatic aberration in the first lens unit. Moreover, as it is possible to correct favorably the longitudinal chromatic aberration in the first lens unit, excessive correction of the longitudinal chromatic aberration in the second lens unit becomes unnecessary. Accordingly, since it is possible to carry out favorably the correction of chromatic aberration of magnification in the second lens unit, it is possible to correct favorably the chromatic aberration of magnification in the overall optical system.

Here, it is preferable that the following conditional expression (20') is satisfied instead of conditional expression (20).

$$0.70 < D_{os}/L_{G1} < 3.50 \qquad (20')$$

Moreover, it is more preferable that the following conditional expression (20") is satisfied instead of conditional expression (20).

$$0.90 < D_{os}/L_{G1} < 3.00 \qquad (20'')$$

Furthermore, it is even more preferable that the following conditional expression (20''') is satisfied instead of conditional expression (20).

$$1.10 < D_{os}/L_{G1} < 2.50 \qquad (20''')$$

In the image pickup apparatus according to the present embodiment, it is preferable that the first lens unit includes a lens having a positive refractive power and a lens having a negative refractive power, and the lens having a positive refractive power is disposed nearest to the object, and the lens having a negative refractive power is disposed at a position adjacent to the lens having a positive refractive power.

By making such an arrangement, it is possible to position a principal point on the object side. As a result, it is possible to correct favorably the chromatic aberration of magnification further, while shortening the overall length of the optical system.

By satisfying conditional expression (20), and further by having such an arrangement, it is possible to further shorten the overall length of the optical system and to correct the chromatic aberration of magnification more favorably.

An image pickup apparatus according to a second embodiment comprises an image pickup element and an optical system. The image pickup element includes a plurality of pixels which converts light intensity to an electric signal, and the plurality of pixels is arranged in rows two-dimensionally. An optical image is formed on the image pickup element by the optical system. The optical system includes in order from an object side, a first lens unit which includes a plurality of lenses, a stop, and a second lens unit which includes a plurality of lenses. The first lens unit includes a first object-side lens which is disposed nearest to an object, and the second lens unit includes a second image-side lens which is disposed nearest to an image. The first lens unit includes an object-side lens unit having a positive refractive power as a whole, which is disposed nearest to the object, and the object-side lens unit includes a lens which satisfies the following conditional expression (10). The following conditional expressions (1), (2), (4), and (11) are satisfied:

$$3250 < 2Y/p \qquad (1),$$

$$-1.0 < \beta \qquad (2),$$

$$2.0 < L_L/\sqrt{(Y \times Y_{obj})} < 15.0 \qquad (4),$$

$$0.6 < \phi_{G1o} \times |\beta|/Y \qquad (10), \text{ and}$$

$$0.0 < \beta_{G1o} \qquad (11)$$

where,
Y denotes a maximum image height in the overall optical system,
p denotes a pixel pitch in the image pickup element,
β denotes an imaging magnification of the optical system, $L_L$ denotes a distance on the optical axis from an object-side surface of the first object-side lens up to an image-side surface of the second image-side lens,
$Y_{obj}$ denotes a maximum object height,
$\phi_{G1o}$ denotes an effective aperture of all lenses in the object-side lens unit, and
$\beta_{G1o}$ denotes an imaging magnification of the object-side lens unit.

Since the technical significance of the arrangement of the optical system has already been described, the description thereof is omitted. Moreover, since the technical significance of conditional expressions (1), (2), (4), (10), and (11) has already been described, the description thereof is omitted.

In the image pickup apparatus according to the present embodiment, it is preferable that the first lens unit includes in order from an object side an object-side lens unit and an image-side lens unit.

By disposing the image-side lens unit on the image side of the object-side lens unit, it is possible to correct favorably the coma in the first lens unit, as well as to correct favorably the axial aberration such as the spherical aberration.

By satisfying conditional expression (4), and by including the lens which satisfies conditional expressions (10) and (11), and by further including such an arrangement, it is possible to correct favorably the spherical aberration, and to correct favorably the coma in the first lens unit.

In the image pickup apparatus according to the present embodiment, it is preferable that the following conditional expression (21) is satisfied:

$$0.015 < 1/vd_{min} - 1/vd_{max} \qquad (21),$$

where,
$vd_{min}$ denotes a minimum Abbe number form among Abbe numbers for lenses in the optical system, and
$vd_{max}$ denotes a maximum Abbe number form among Abbe numbers for lenses in the optical system.

By making so as not to fall below a lower limit value of conditional expression (21), it is possible to correct favorably the longitudinal chromatic aberration and the chromatic aberration of magnification.

Here, it is preferable that the following conditional expression (21') is satisfied instead of conditional expression (21).

$$0.016 < 1/vd_{min} - 1/vd_{max} < 0.100 \qquad (21')$$

Moreover, it is more preferable that the following conditional expression (21") is satisfied instead of conditional expression (21).

$$0.017 < 1/vd_{min} - 1/vd_{max} < 0.070 \qquad (21'')$$

Furthermore, it is even more preferable that the following conditional expression (21''') is satisfied instead of conditional expression (21).

$$0.018 < 1/vd_{min} - 1/vd_{max} < 0.050 \qquad (21''')$$

In the image pickup apparatus according to the present embodiment, it is preferable that the following conditional expression (22) is satisfied:

$$3.0 < CRA_{img}/CRA_{obj} < 50.0 \qquad (22),$$

$CRA_{img}$ denotes the maximum angle from among angles made by a plurality of principal rays incident on an image plane, with an optical axis, and
$CRA_{obj}$ denotes the maximum angle from among angles made by a plurality of principal rays incident on the first object-side lens, with the optical axis, and regarding the sign of the angle, the angle is let to be negative when measured in a clockwise direction from the optical axis, and the angle is let to be positive when measured in a counterclockwise direction from the optical axis.

By making so as not to fall below a lower limit value of conditional expression (22), it is possible to not let an angle of incidence of an off-axis light beam on an image pickup surface to be excessively large. Accordingly, it is possible to prevent degradation of an amount of light at periphery more efficiently.

By making so as not to exceed an upper limit value of conditional expression (22), it is possible to impart a divergence effect in an area near the image side of the optical system, and to make a telephoto type arrangement of the optical system. As a result, it is possible to shorten the overall length of the optical system.

Here, it is preferable that the following conditional expression (22') is satisfied instead of conditional expression (22).

$$3.30 < CRA_{img}/CRA_{obj} < 30.00 \qquad (22')$$

Moreover, it is more preferable that the following conditional expression (22") is satisfied instead of conditional expression (22).

$$3.50 < CRA_{img}/CRA_{obj} < 20.00 \qquad (22")$$

Furthermore, it is even more preferable that the following conditional expression (22''') is satisfied instead of conditional expression (22).

$$3.70 < CRA_{img}/CRA_{obj} < 15.00 \qquad (22''')$$

In the image pickup apparatus according to the present embodiment, it is preferable that the first lens unit includes a first image-side lens which is disposed nearest to the image, and the second lens unit includes a second object-side lens which is disposed nearest to the object, and the following conditional expression (23) is satisfied:

$$0.65 < L_{G1}/L_{G2} < 5.00 \qquad (23),$$

where, $L_{G1}$ denotes a distance on the optical axis from the object-side surface of the first object-side lens up to an image-side surface of the first image-side lens, and $L_{G2}$ denotes a distance on the optical axis from an object-side surface of the second object-side lens up to an image-side surface of the second image-side lens.

By making so as not fall below a lower limit value of conditional expression (23), it is possible to secure appropriately the positive refractive power of the first lens unit while securing an appropriate thickness of lenses in the first lens unit. Consequently, it is possible to position a principal point on the object side and to shorten the overall length of the optical system, while correcting favorably the longitudinal chromatic aberration.

By making so as not to exceed an upper limit value of conditional expression (23), in a case of securing an appropriate working distance, since it is possible to change the height of a principal ray traveling from the stop and reaching peripheral of the image comparatively slowly in the second lens unit, it is possible to prevent the radius of curvature of a lens in the second lens unit from becoming excessively small. Therefore, it is possible to correct the chromatic aberration of magnification more favorably.

Here, it is preferable that the following conditional expression (23') is satisfied instead of conditional expression (23).

$$0.85 < L_{G1}/L_{G2} < 4.50 \qquad (23')$$

Moreover, it is more preferable that the following conditional expression (23") is satisfied instead of conditional expression (23).

$$1.05 < L_{G1}/L_{G2} < 4.30 \qquad (23")$$

Furthermore, it is even more preferable that the following conditional expression (23''') is satisfied instead of conditional expression (23)

$$1.25 < L_{G1}/L_{G2} < 4.00 \qquad (23''')$$

In the image pickup apparatus according to the present embodiment, it is preferable that an optical path splitting element is disposed in an optical path of the optical system, and a first optical path and a second optical path are formed by the optical path splitting element, and a part of the optical system is disposed in the first optical path, and a connecting portion is disposed on a side of the second optical path that has been split, and an illumination optical system that illuminates the object is connected to the connecting portion.

By making such arrangement, it is possible to make illumination light be incident from the second optical path by connecting the illumination optical system to the connecting portion, and further connecting a light source to the illumination optical system. Accordingly, it is possible to irradiate illumination light on the object (sample).

It is preferable to arrange the illumination optical system such that the method of illumination becomes Koehler illumination. By making such arrangement, it is possible to illuminate from a center up to a periphery of the object with illumination light having uniform brightness. As a result, it is possible to acquire a favorable image of the object with lesser shadow or unevenness in brightness from a center portion up to a peripheral portion.

Examples of the optical path splitting element are a polarization beam splitter and a half mirror. In a case of using the polarization beam splitter, it is desirable to dispose a ¼ wavelength plate in an optical path on the object side of the optical path splitting element, or in other words, in an optical path between the optical path splitting element and the object.

In the image pickup apparatus according to the present embodiment, it is preferable that an optical path splitting element is disposed in an optical path in the optical system, and the optical path splitting element is disposed in the second lens unit.

At a position of the second lens unit, a diameter of light beam becomes small. Therefore, by disposing the optical path splitting element in the second lens unit, it is possible to small-size the optical path splitting element. As a result, it is possible to shorten the overall length of the optical system.

In the image pickup apparatus according to the present embodiment, it is preferable that the following conditional expression (24) is satisfied:

$$0.1 < D_{sBS}/D_{BSi} < 0.95 \qquad (24),$$

where, $D_{sBS}$ denotes a distance on the optical axis from the stop up to the optical path splitting element, and $D_{BSi}$ denotes a distance on the optical axis from the optical path splitting element up to an image pickup surface of the image pickup element.

By satisfying conditional expression (24), for both of an axial light beam and an off-axis light beam, it is possible to suppress an angle of incidence on the optical path splitting element from becoming excessively large. Furthermore, it is possible to suppress the height of the off-axis light ray from becoming too high. Consequently, thinning of a diameter of the optical system becomes possible, and moreover, it is possible suppress the occurrence of spherical aberration and coma.

Here, it is preferable that the following conditional expression (24') is satisfied instead of conditional expression (24).

$$0.20 < D_{sBS}/D_{BSi} < 0.93 \qquad (24')$$

Moreover, it is more preferable that the following conditional expression (24") is satisfied instead of conditional expression (24).

$$0.25 < D_{sBS}/D_{BSi} < 0.90 \qquad (24'')$$

Furthermore, it is even more preferable that the following conditional expression (24''') is satisfied instead of conditional expression (24).

$$0.30 < D_{sBS}/D_{BSi} < 0.88 \qquad (24''')$$

In the image pickup apparatus according to the present embodiment, it is preferable that at least one positive lens is disposed between the stop and the optical path splitting element.

By making such arrangement, both for the axial light beam and for the off-axis light beam, it is possible to suppress the angle of incidence on the optical path splitting element from becoming excessively large. Furthermore, it is possible to suppress the height of the off-axis light ray from becoming excessively high. Consequently, small-sizing of the diameter of the optical system is possible, and it is possible to suppress the occurrence of spherical aberration and coma.

In the image pickup apparatus according to the present embodiment it is preferable that at least one of the positive lenses disposed between the stop and the optical path splitting element is cemented to a negative lens.

By making such arrangement, it is possible to correct favorably the axial aberration, and particularly, the spherical aberration and the longitudinal chromatic aberration.

In the image pickup apparatus according to the present embodiment, it is preferable that a positive lens is disposed on the image side of the optical path splitting element, and at least one negative lens is disposed on the image side of the positive lens.

By making such arrangement, it is possible to make effectively converge the light emerged from the optical path splitting element, and achieve both namely, suppressing the occurrence of spherical aberration and shortening the overall length of the optical system.

In the image pickup apparatus according to the present embodiment, it is preferable that the following conditional expression (3) is satisfied:

$$CRA_{obj} < 10 \text{ deg} \qquad (3),$$

where, $CRA_{obj}$ denotes the maximum angle from among angles made by a plurality of principal rays incident on the first object-side lens, with an optical axis, and regarding the sign of the angle, the angle is let to be negative when measured in a clockwise direction from the optical axis, and the angle is let to be positive when measured in a counterclockwise direction from the optical axis.

Since technical significance of conditional expression (3) has already been described, the description thereof is omitted.

In the image pickup apparatus according to the present embodiment, it is preferable that the first lens unit includes in order from the object side, one or two lenses having a positive refractive power, one or two lenses having a negative refractive power, one to three lenses having a positive refractive power, and a first image-side lens having a negative refractive power.

In the image pickup apparatus according to the present embodiment, it is preferable that the first lens unit includes six lenses, and the six lenses are arranged in order from the object side, a first object-side lens having a positive refractive power, one lens having a positive refractive power, one lens having a negative refractive power, two lenses having a positive refractive power, and a first image-side lens having a negative refractive power.

Further, in the image pickup apparatus according to the present embodiment, it is preferable that the first lens unit includes five lenses, and the five lenses are arranged in order from the object side, a first object-side lens having a positive refractive power, one lens having a positive refractive power, one lens having a negative refractive power, one lens having a positive refractive power, and a first image-side lens having a negative refractive power.

Further, in the image pickup apparatus according to the present embodiment, it is preferable that the first lens unit includes seven lenses, and the seven lenses are arranged in order from the object side, a first object-side lens having a positive refractive power, one lens having a positive refractive power, two lenses having a negative refractive power, two lenses having a positive refractive power, and a first image-side lens having a negative refractive power.

Moreover, in the image pickup apparatus according to the present embodiment, it is preferable that an object-side surface of the first object-side lens is a convex surface directed toward the object side. Moreover, it is preferable that the first object-side lens is a biconvex positive lens.

In the image pickup apparatus according to the present embodiment, it is preferable that an image-side surface of the first image-side lens is a concave surface directed toward the image side. Moreover, it is preferable that the first image-side lens is a biconcave negative lens.

In the image pickup apparatus according to the present embodiment, it is preferable that the second lens unit includes in order from the object side, a second object-side lens having a positive refractive power, one lens having a negative refractive power, two or three lenses having a positive refractive power, one lens having a negative refractive power, one or two lenses having a positive refractive power, and a second image-side lens having a negative refractive power. In this case, it is preferable that an image-side surface of the second object-side lens is a convex surface directed toward the image side. For example, it is preferable that the second object-side lens is a biconvex positive lens. Moreover, it is preferable that an image-side surface of the second image-side lens is a concave surface directed toward the image side. Furthermore, it is preferable that an object-side surface of the second image-side lens is a concave surface directed toward the object side.

Further, in the image pickup apparatus according to the present embodiment, it is preferable that the second lens unit includes eight lenses, and the eight lenses are arranged in order from the object side, a second object-side lens having a positive refractive power, one lens having a negative refractive power, three lenses having a positive refractive power, one lens having a negative refractive power, one lens having a positive refractive power, and a second image-side lens having a negative refractive power.

In the image pickup apparatus according to the present embodiment, it is preferable that the second lens unit includes seven lenses, and the seven lenses are arranged in order from the object side, a second object-side lens having a positive refractive power, one lens having a negative refractive power, two lenses having a positive refractive power, one lens having a negative refractive power, one lens having a positive refractive power, and a second image-side lens having a negative refractive power.

In the image pickup apparatus according to the present embodiment, it is preferable that the second lens unit includes in order from the object side, a second object-side lens having a positive refractive power, one lens having a negative refractive power, three lenses having a positive refractive power, and two or three lenses having a negative refractive power.

In the image pickup apparatus according to the present embodiment, it is preferable that the second lens unit includes in order from the object side, a second object-side lens having a negative refractive power, two to four lenses having a positive refractive power, and one or two lenses having a negative refractive power. In this case, it is preferable that the second object-side lens is a biconcave negative lens. Moreover, it is preferable that a lens positioned on the image side of the second object-side lens is a biconvex positive lens. Furthermore, it is preferable that the second image-side lens is a biconcave negative lens. Also, it is preferable that a lens positioned on the object side of the second image-side lens is a biconcave negative lens.

In the image pickup apparatus according to the present embodiment, it is preferable that the second lens unit includes five lenses, and the five lenses are arranged in order from the object side, a second object-side lens having a negative refractive power, two lenses having a positive refractive power, and two lenses having a negative refractive power.

Moreover, an image pickup system according to the present embodiment includes any one of the abovementioned image pickup apparatuses, a stage which holds an object, and a illumination apparatus which illuminates the object.

By making such arrangement, it is possible to illuminate the object by the illumination apparatus. Accordingly, since it is possible to reduce noise at the time of capturing, it is possible to achieve an image of an object with high resolution.

In the image pickup apparatus according to the present embodiment, it is preferable that the image pickup apparatus and the stage are integrated.

The optical system used in the image pickup apparatus has a large numerical aperture on the object side. Consequently, the optical system has a high resolution, but the depth of field becomes shallow. Therefore, in the image pickup system using the image pickup apparatus according to the present embodiment, it is preferable that the image pickup apparatus, and the stage which holds an object are integrated. By making such arrangement, since it is possible to maintain relative positions of the image pickup apparatus and the object and relative distance between the image pickup apparatus and the object to be constant, it is possible to achieve an image with a high resolution.

An optical system used in the image pickup apparatus according to the present embodiment is an optical system to be used in an image pickup apparatus including an image pickup element which satisfies the following conditional expression (1), and comprises in order from an object side, a first lens unit which includes a plurality of lenses, a stop, and a second lens unit which includes a plurality of lenses. The first lens unit includes a first object-side lens which is disposed nearest to an object, the second lens unit includes a second image-side lens which is disposed nearest to an image, and the following conditional expressions (2), (3), (4), and (5) are satisfied:

$$3250 < 2Y/p \qquad (1),$$

$$-1.0 < \beta \qquad (2),$$

$$CRA_{obj} < 10 \text{ deg} \qquad (3),$$

$$2.0 < L_L/\sqrt{(Y \times Y_{obj})} < 15.0 \qquad (4), \text{ and}$$

$$0.5 < L_{TL}/D_{oi} < 0.95 \qquad (5),$$

where,

Y denotes the maximum image height in the overall optical system, p denotes a pixel pitch in the image pickup element, $\beta$ denotes an imaging magnification of the optical system, $CRA_{obj}$ denotes a maximum angle made by a plurality of principal ray incident on the first object-side lens, with an optical axis, $L_L$ denotes a distance on the optical axis from an object-side surface of the first object-side lens up to an image-side surface of the second image-side lens, $Y_{obj}$ denotes a maximum object height, $L_{TL}$ denotes a distance on the optical axis from the object-side surface of the first object-side lens up to the image, and $D_{oi}$ denotes a distance on the optical axis from the object up to the image.

Another optical system used in the image pickup apparatus according to the present embodiment is an optical system to be used in an image pickup apparatus including an image pickup element which satisfies the following conditional expression (1), and comprises in order from an object side, a first lens unit which includes a plurality of lenses, a stop, and a second lens unit which includes a plurality of lenses. The first lens unit includes a first object-side lens which is disposed nearest to an object, and the second lens unit includes a second image-side lens which is disposed nearest to an image. The first lens unit includes an object-side lens unit having a positive refractive power as a whole, which is disposed nearest to the object. The object-side lens unit includes a lens which satisfies the following conditional expression (10), and the following conditional expressions (2), (4), and (11) are satisfied:

$$3250 < 2Y/p \qquad (1),$$

$$-1.0 < \beta \qquad (2),$$

$$2.0 < L_L/\sqrt{(Y \times Y_{obj})} < 15.0 \qquad (4),$$

$$0.6 < \phi_{G1o} \times |\beta|/Y \qquad (10), \text{ and}$$

$$0.0 < \beta_{G1o} \qquad (11)$$

where,

Y denotes a maximum image height in the overall optical system, p denotes a pixel pitch in the image pickup element, $\beta$ denotes an imaging magnification of the optical system, $L_L$ denotes a distance on the optical axis from an object-side surface of the first object-side lens up to an image-side surface of the second image-side lens, $Y_{obj}$ denotes a maximum object height, $\phi_{G1o}$ denotes an effective aperture of all lenses in the object-side lens unit, and $\beta_{G1o}$ denotes an imaging magnification of the object-side lens unit.

The optical system used in the image pickup apparatus according to the present embodiment may have the above-mentioned arrangement in the image pickup apparatus, and may satisfy the conditional expressions.

For each conditional expression, it is preferable to restrict one of or both of a lower limit value and an upper limit value, as this enables to have that function in more assured manner. Moreover, for each conditional expression, only an upper limit value or a lower limit value of a numerical range of a further restricted conditional expression may be restricted. While restricting the numerical range of a conditional expression, an upper limit value or a limit value of each conditional expression may be let to be an upper limit value or a lower limit value of another conditional expression.

Examples of the optical system used in an image pickup apparatus according to a certain aspect of the present embodiment will be described below in detail by referring to the accompanying diagrams. However, the present invention should not be construed as being limited by these examples.

In the following examples, for an optical system exemplified, an image pickup element of what type of pixel pitch is to be used has not been specified clearly. This is because image pickup elements of various pixel pitches can be used appropriately provided that they satisfy the abovementioned conditional expression (1).

For example, since the image height of an optical system according to an example 1 is 21.671 mm, in a case in which, an image pickup element having a pixel pitch of 6.0 µm is used in the optical system according to an example 1, 2Y/P is 7223 (2Y/P=7223), it satisfies conditional expression (1) of the present example. In such manner, since the pixel pitch of an image pickup element can be selected appropriately within a range which satisfies conditional expression (1), as a matter of course, the pixel pitch of the image pickup element to be used together with the optical system according to an example 1 is not restricted to 6.0 µm. Moreover, even in optical systems according to other examples, even without specifying a specific pixel pitch of the image pickup element, it is possible to combine with an image pickup element having an appropriate pixel pitch.

The optical system according to the example 1 will be described below. FIG. 1A is a cross-sectional view along an optical axis showing an optical arrangement of the optical system according to the example 1. Moreover, FIG. 1B, FIG. 1C, FIG. 1D, and FIG. 1E are aberration diagrams of the optical system according to the example 1.

In the aberrations diagrams shown in FIG. 1B, FIG. 1C, FIG. 1D, and FIG. 1E, "FIY" denotes the image height. Symbols used in the aberration diagrams are same even for examples to be described later. Moreover, in aberration diagrams of examples from the example 1 to example 22, four aberration diagrams in order from left show a spherical aberration (SA), an astigmatism (AS), a distortion (DT), and a chromatic aberration of magnification (CC) respectively.

The optical system according to the example 1, as shown in FIG. 1A, includes in order from an object side, a first lens unit G1 having a positive refractive power, an aperture stop S, and a second lens unit G2 having a positive refractive power. In the examples from the example 1 to example 22, in lens cross-sectional views, S denotes a stop, C denotes a cover glass, and I denotes an image pickup surface of an image pickup element.

The first lens unit G1 includes a biconvex positive lens L1, a positive meniscus lens L2 having a convex surface directed toward an image side, a biconcave negative lens L3, a biconvex positive lens L4, a positive meniscus lens L5 having a convex surface directed toward the image side, and a biconcave negative lens L6. Here, the positive meniscus lens L5 and the biconcave negative lens L6 are cemented.

The second lens unit G2 includes a biconvex positive lens L7, a biconcave negative lens L8, a biconvex positive lens L9, a biconvex positive lens L10, a positive meniscus lens L11 having a convex surface directed toward the object side, a negative meniscus lens L12 having a convex surface directed toward the object side, a positive meniscus lens L13 having a convex surface directed toward the image side, and a biconcave negative lens L14. Here, the biconcave negative lens L8 and the biconvex positive lens L9 are cemented.

In the first lens unit G1, an object-side lens unit includes the biconvex positive lens L1 and the positive meniscus lens L2. Moreover, an image-side lens unit includes the biconcave negative lens L3, the biconvex positive lens L4, the positive meniscus lens L5, and the biconcave negative lens L6. Here, all the lenses in the object-side lens unit are lenses that satisfy conditional expression (10). All the lenses in the image-side lens unit are lenses that satisfy conditional expression (13).

In the second lens unit G2, the biconcave negative lens L14 is a predetermined lens unit.

An aspheric surface is used for 10 surfaces namely, both surfaces of the biconcave negative lens L3, both surfaces of the biconvex positive lens L7, both surfaces of the biconvex positive lens L10, both surfaces of the positive meniscus lens L13, and both surfaces of the biconcave negative lens L14.

Next, an optical system according to an example 2 will be described below. FIG. 2A is a cross-sectional view along an optical axis showing an optical arrangement of the optical system according to the example 2. Moreover, FIG. 2B, FIG. 2C, FIG. 2D, and FIG. 2E are aberration diagrams of the optical system according to the example 2.

The optical system according to the example 2, as shown in FIG. 2A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward an image side, a biconcave negative lens L3, a biconvex positive lens L4, a positive meniscus lens L5 having a convex surface directed toward the image side, and a biconcave negative lens L6. Here, the positive meniscus lens L5 and the biconcave negative lens L6 are cemented.

The second lens unit G2 includes a biconvex positive lens L7, a biconcave negative lens L8, a biconvex positive lens L9, a biconvex positive lens L10, a positive meniscus lens L11 having a convex surface directed toward the object side, a negative meniscus lens L12 having a convex surface directed toward the object side, a positive meniscus lens L13 having a convex surface directed toward the image side, and a biconcave negative lens L14. Here, the biconcave negative lens L8 and the biconvex positive lens L9 are cemented.

In the first lens unit G1, an object-side lens unit includes the biconvex positive lens L1 and the positive meniscus lens L2. Moreover, an image-side lens unit includes the biconcave negative lens L3, the biconvex positive lens L4, the positive meniscus lens L5, and the biconcave negative lens L6. Here, all the lenses in the object-side lens unit are lenses that satisfy conditional expression (10). All the lenses in the image-side lens unit are lenses that satisfy conditional expression (13).

In the second lens unit G2, the biconcave negative lens L14 is a predetermined lens unit.

An aspheric surface is used for 10 surfaces namely, both surfaces of the biconcave negative lens L3, both surfaces of the biconvex positive lens L7, both surfaces of the biconvex positive lens L10, both surfaces of the positive meniscus lens L13, and both surfaces of the biconcave negative lens L14.

Figure 3A:
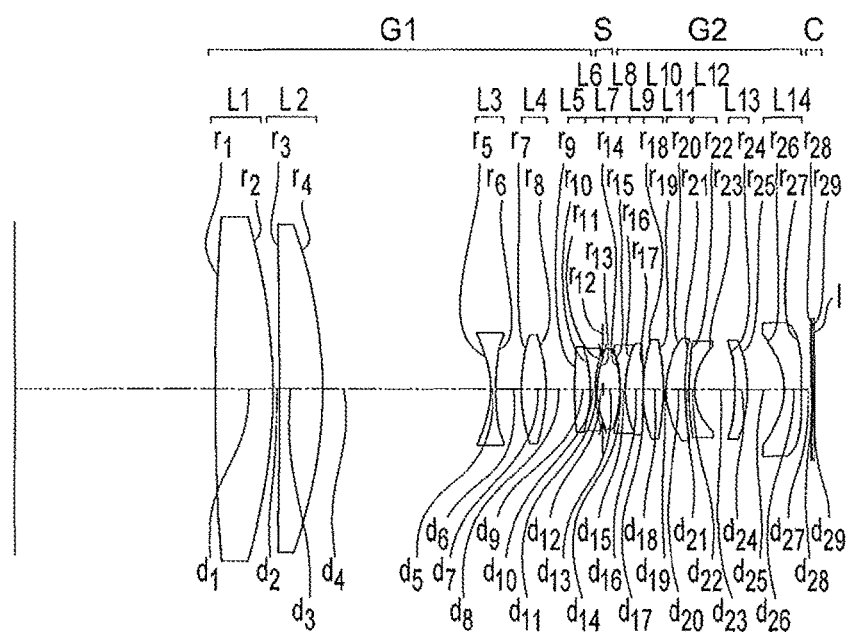
FIG. 3A is a cross-sectional view along an optical axis showing an optical arrangement of an optical system according to an example 3.
Figure 3B:
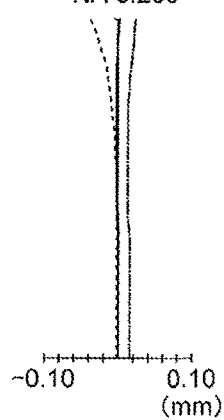
FIG. 3B, FIG. 3C, FIG. 3D, and FIG. 3E are aberration diagrams of the optical system according to the example 3.
Figure 3C:
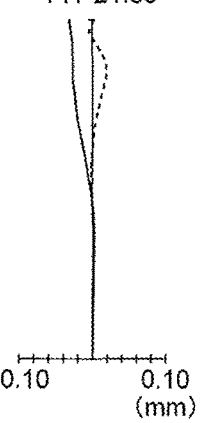
Figure 3D:
Figure 3E:
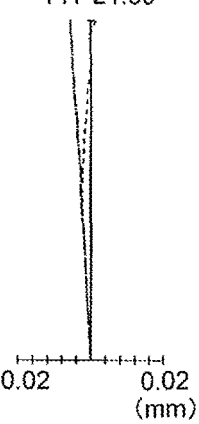

Next, an optical system according to an example 3 invention will be described below. FIG. 3A is a cross-sectional view along an optical axis showing an optical arrangement of the optical system according to the example 3. Moreover, FIG. 3B, FIG. 3C, FIG. 3D, and FIG. 3E are aberration diagrams of the optical system according to the example 3.

The optical system according to the example 3, as shown in FIG. 3A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward an image side, a biconcave negative lens L3, a biconvex positive lens L4, a biconvex positive lens L5, and a biconcave negative lens L6. Here, the biconvex positive lens L5 and the biconcave negative lens L6 are cemented.

The second lens unit G2 includes a biconvex positive lens L7, a biconcave negative lens L8, a biconvex positive lens L9, a biconvex positive lens L10, a positive meniscus lens L11 having a convex surface directed toward the object side, a negative meniscus lens L12 having a convex surface directed toward the object side, a positive meniscus lens L13 having a convex surface directed toward the image side, and a biconcave negative lens L14. Here, the biconcave negative lens L8 and the biconvex positive lens L9 are cemented.

In the first lens unit G1, an object-side lens unit includes the biconvex positive lens L1 and the positive meniscus lens L2. Moreover, an image-side lens unit includes the biconcave negative lens L3, the biconvex positive lens L4, the biconvex positive lens L5, and the biconcave negative lens L6. Here, all the lenses in the object-side lens unit are lenses that satisfy conditional expression (10). All the lenses in the image-side lens unit are lenses that satisfy conditional expression (13).

In the second lens unit G2, the biconcave negative lens L14 is a predetermined lens unit.

An aspheric surface is used for 10 surfaces namely, both surfaces of the biconcave negative lens L3, both surfaces of the biconvex positive lens L7, both surfaces of the biconvex positive lens L10, both surfaces of the positive meniscus lens L13, and both surfaces of the biconcave negative lens L14.

Next, an optical system according to an example 4 will be described below. FIG. 4A is a cross-sectional view along an optical axis showing an optical arrangement of the optical system according to the example 4. Moreover, FIG. 4B, FIG. 4C, FIG. 4D, and FIG. 4E are aberration diagrams of the optical system according to the example 4.

The optical system according to the example 4, as shown in FIG. 4A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward an image side, a biconcave negative lens L3, a biconvex positive lens L4, a positive meniscus lens L5 having a convex surface directed toward the image side, and a biconcave negative lens L6. Here, the positive meniscus lens L5 and the biconcave negative lens L6 are cemented.

The second lens unit G2 includes a biconvex positive lens L7, a biconcave negative lens L8, a biconvex positive lens L9, a biconvex positive lens L10, a positive meniscus lens L11 having a convex surface directed toward the object side, a negative meniscus lens L12 having a convex surface directed toward the object side, a positive meniscus lens L13 having a convex surface directed toward the image side, and a biconcave negative lens L14. Here, the biconcave negative lens L8 and the biconvex positive lens L9 are cemented.

In the first lens unit G1, an object-side lens unit includes the biconvex positive lens L1 and the positive meniscus lens L2. Moreover, an image-side lens unit includes the biconcave negative lens L3, the biconvex positive lens L4, the positive meniscus lens L5, and the biconcave negative lens L6. Here, all the lenses in the object-side lens unit are lenses that satisfy conditional expression (10). All the lenses in the image-side lens unit are lenses that satisfy conditional expression (13).

In the second lens unit G2, the biconcave negative lens L14 is a predetermined lens unit.

An aspheric surface is used for 10 surfaces namely, both surfaces of the biconcave negative lens L3, both surfaces of the biconvex positive lens L7, both surfaces of the biconvex positive lens L10, both surfaces of the positive meniscus lens L13, and both surfaces of the biconcave negative lens L14.

Next, an optical system according to an example 5 will be described below. FIG. 5A is a cross-sectional view along an optical axis showing an optical arrangement of the optical system according to the example 5. Moreover, FIG. 5B, FIG. 5C, FIG. 5D, and FIG. 5E are aberration diagrams of the optical system according to the example 5.

The optical system according to the example 5, as shown in FIG. 5A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward an image side, a biconcave negative lens L3, a biconvex positive lens L4, a biconvex positive lens L5, and a biconcave negative lens L6. Here, the biconvex positive lens L5 and the biconcave negative lens L6 are cemented.

The second lens unit G2 includes a biconvex positive lens L7, a biconcave negative lens L8, a biconvex positive lens L9, a biconvex positive lens L10, a positive meniscus lens L11 having a convex surface directed toward the object side, a negative meniscus lens L12 having a convex surface directed toward the object side, a positive meniscus lens L13 having a convex surface directed toward the image side, and a negative meniscus lens L14 having a convex surface directed toward the image side. Here, the biconcave negative lens L8 and the biconvex positive lens L9 are cemented.

In the first lens unit G1, an object-side lens unit includes the biconvex positive lens L1 and the positive meniscus lens L2. Moreover, an image-side lens unit includes the biconcave negative lens L3, the biconvex positive lens L4, the biconvex positive lens L5, and the biconcave negative lens L6. Here, all the lenses in the object-side lens unit are lenses that satisfy conditional expression (10). Moreover, all the lenses in the image-side lens unit are lenses that satisfy conditional expression (13).

In the second lens unit G2, the negative meniscus lens L14 is a predetermined lens unit.

An aspheric surface is used for 10 surfaces namely, both surfaces of the biconcave negative lens L3, both surfaces of the biconvex positive lens L7, both surfaces of the biconvex positive lens L10, both surfaces of the positive meniscus lens L13, and both surfaces of the negative meniscus lens L14.

Next, an optical system according to an example 6 of will be described below. FIG. 6A is a cross-sectional view along an optical axis showing an optical arrangement of the optical system according to the example 6. Moreover, FIG. 6B, FIG. 6C, FIG. 6D, and FIG. 6E are aberration diagrams of the optical system according to the example 6.

The optical system according to the example 6, as shown in FIG. 6A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward an image side, a biconcave negative lens L3, a biconvex positive lens L4, a biconvex positive lens L5, and a biconcave negative lens L6. Here, the biconvex positive lens L5 and the biconcave negative lens L6 are cemented.

The second lens unit G2 includes a biconvex positive lens L7, a biconcave negative lens L8, a positive meniscus lens L9 having a convex surface directed toward the object side, a biconvex positive lens L10, a positive meniscus lens L11 having a convex surface directed toward the object side, a negative meniscus lens L12 having a convex surface directed toward the object side, a positive meniscus lens L13 having a convex surface directed toward the image side, and a negative meniscus lens L14 having a convex surface directed toward the image side. Here, the biconcave negative lens L8 and the positive meniscus lens L9 are cemented.

In the first lens unit, an object-side lens unit includes the biconvex positive lens L1 and the positive meniscus lens L2. Moreover, an image-side lens unit includes the biconcave negative lens L3, the biconvex positive lens L4, the biconvex positive lens L5, and the biconcave negative lens L6. Here, all the lenses in the object-side lens unit are lenses that satisfy conditional expression (10). Moreover, all the lenses in the image-side lens unit are lenses that satisfy conditional expression (13).

In the second lens unit G2, the negative meniscus lens L14 is a predetermined lens unit.

An aspheric surface is used for 10 surfaces namely, both surfaces of the biconcave negative lens L3, both surfaces of the biconvex positive lens L7, both surfaces of the biconvex positive lens L10, both surfaces of the positive meniscus lens L13, and both surfaces of the negative meniscus lens L14.

Next, an optical system according to an example 7 will be described below. FIG. 7A is a cross-sectional view along an optical axis showing an optical arrangement of the optical system according to the example 7. Moreover, FIG. 7B, FIG. 7C, FIG. 7D, and FIG. 7E are aberration diagrams of the optical system according to the example 7.

The optical system according to the example 7, as shown in FIG. 7A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward an image side, a biconcave negative lens L3, a biconvex positive lens L4, a biconvex positive lens L5, and a biconcave negative lens L6. Here, the biconvex positive lens L5 and the biconcave negative lens L6 are cemented.

The second lens unit G2 includes a biconvex positive lens L7, a biconcave negative lens L8, a positive meniscus lens L9 having a convex surface directed toward the object side, a biconvex positive lens L10, a positive meniscus lens L11 having a convex surface directed toward the object side, a negative meniscus lens L12 having a convex surface directed toward the object side, a positive meniscus lens L13 having a convex surface directed toward the image side, and a negative meniscus lens L14 having a convex surface directed toward the image side. Here, the biconcave negative lens L8 and the positive meniscus lens L9 are cemented.

In the first lens unit G1, an object-side lens unit includes the biconvex positive lens L1 and the positive meniscus lens L2. Moreover, an image-side lens unit includes the biconcave negative lens L3, the biconvex positive lens L4, the biconvex positive lens L5, and the biconcave negative lens L6. Here, all the lenses in the object-side lens unit are lenses that satisfy conditional expression (10). Moreover, all the lenses in the image-side lens unit are lenses that satisfy conditional expression (13).

In the second lens unit G2, the negative meniscus lens L14 is a predetermined lens unit.

An aspheric surface is used for 10 surfaces namely, both surfaces of the biconcave negative lens L3, both surfaces of the biconvex positive lens L7, both surfaces of the biconvex positive lens L10, both surfaces of the positive meniscus lens L13, and both surfaces of the negative meniscus lens L14.

Next, an optical system according to an example 8 will be described below. FIG. 8A is a cross-sectional view along an optical axis showing an optical arrangement of the optical system according to the example 8. Moreover, FIG. 8B, FIG. 8C, FIG. 8D, and FIG. 8E are aberration diagrams of the optical system according to the example 8.

The optical system according to the example 8, as shown in FIG. 8A, includes in order from an object side, a first lens unit G1 having a positive refractive power, an aperture stop S, and a second lens unit G2 having a positive refractive power.

The first lens unit G1 includes a biconvex positive lens L1, a biconvex positive lens L2, a biconcave negative lens L3, a biconvex positive lens L4, a positive meniscus lens L5 having a convex surface directed toward an image side, and a biconcave negative lens L6. Here, the positive meniscus lens L5 and the biconcave negative lens L6 are cemented.

The second lens unit G2 includes a biconvex positive lens L7, a biconcave negative lens L8, a biconvex positive lens L9, a biconvex positive lens L10, a positive meniscus lens L11 having a convex surface directed toward the object side, a negative meniscus lens L12 having a convex surface directed toward the object side, a negative meniscus lens L13 having a convex surface directed toward the image side, and a biconcave negative lens L14. Here, the biconcave negative lens L8 and the biconvex positive lens L9 are cemented.

In the first lens unit G1, an object-side lens unit includes the biconvex positive lens L1 and the biconvex positive lens L2. Moreover, an image-side lens unit includes the biconcave negative lens L3, the biconvex positive lens L4, the positive meniscus lens L5 and the biconcave negative lens L6. Here, all the lenses in the object-side lens unit are lenses that satisfy conditional expression (10). Moreover, all the lenses in the image-side lens unit are lenses that satisfy conditional expression (13).

In the second lens unit G2, the negative meniscus lens L13 and the biconcave negative lens L14 are a predetermined lens unit.

An aspheric surface is used for 10 surfaces namely, both surfaces of the biconcave negative lens L3, both surfaces of the biconvex positive lens L7, both surfaces of the biconvex positive lens L10, both surfaces of the negative meniscus lens L13, and both surfaces of the biconcave negative lens L14.

Figure 9A:
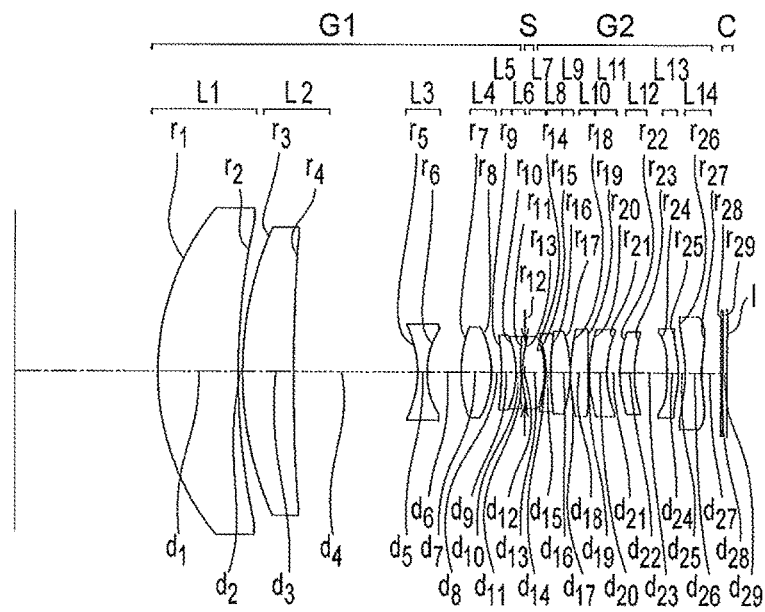
FIG. 9A is a cross-sectional view along an optical axis showing an optical arrangement of an optical system according to an example 9.
Figures 9B, 9C, 9D, 9E:
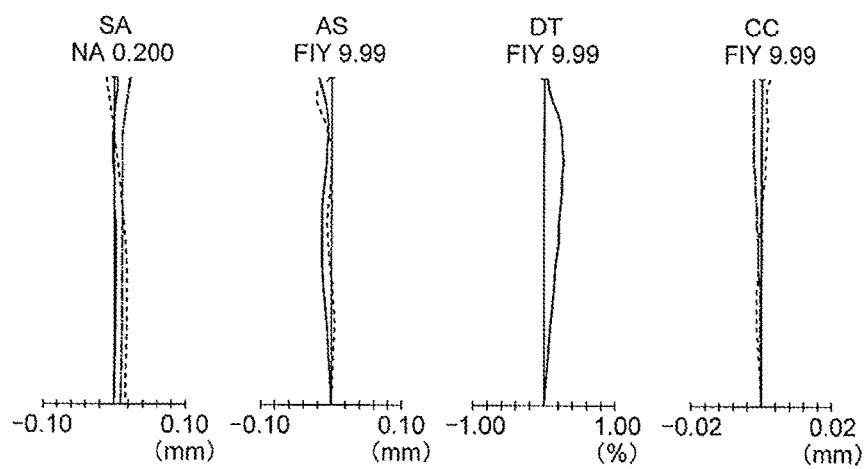
FIG. 9B, FIG. 9C, FIG. 9D, and FIG. 9E are aberration diagrams of the optical system according to the example 9.

Next, an optical system according to an example 9 will be described below. FIG. 9A is a cross-sectional view along an optical axis showing an optical arrangement of the optical system according to the example 9. Moreover, FIG. 9B, FIG. 9C, FIG. 9D, and FIG. 9E are aberration diagrams of the optical system according to the example 9.

The optical system according to the example 9, as shown in FIG. 9A, includes in order from an object side, a first lens unit G1 having a positive refractive power, an aperture stop S, and a second lens unit G2 having a positive refractive power.

The first lens unit G1 includes a positive meniscus lens L1 having a convex surface directed toward the object side, a positive meniscus lens L2 having a convex surface directed toward the object side, a biconcave negative lens L3, a biconvex positive lens L4, a positive meniscus lens L5 having a convex surface directed toward an image side, and a biconcave negative lens L6. Here, the positive meniscus lens L5 and the biconcave negative lens L6 are cemented.

The second lens unit G2 includes a biconvex positive lens L7, a biconcave negative lens L8, a biconvex positive lens L9, a positive meniscus lens L10 having a convex surface directed toward the object side, a negative meniscus lens L11 having a convex surface directed toward the object side, a positive meniscus lens L12 having a convex surface directed toward the object side, a positive meniscus lens L13 having a convex surface directed toward the image side, and a biconcave negative lens L14. Here, the biconcave negative lens L8 and the biconvex positive lens L9 are cemented.

In the first lens unit G1, an object-side lens unit includes the positive meniscus lens L1 and the positive meniscus lens L2. Moreover, an image-side lens unit includes the biconcave negative lens L3, the biconvex positive lens L4, the positive meniscus lens L5, and the biconcave negative lens L6. Here, all the lenses in the object-side lens unit are lenses that satisfy conditional expression (10). Moreover, all the lenses in the image-side lens unit are lenses that satisfy conditional expression (13).

In the second lens unit G2, the biconcave negative lens L14 is a predetermined lens unit.

An aspheric surface is used for 10 surfaces namely, both surfaces of the biconcave negative lens L3, both surfaces of the biconvex positive lens L7, both surfaces of the positive meniscus lens L10, both surfaces of the positive meniscus lens L13, and both surfaces of the biconcave negative lens L14.

Figure 10A:
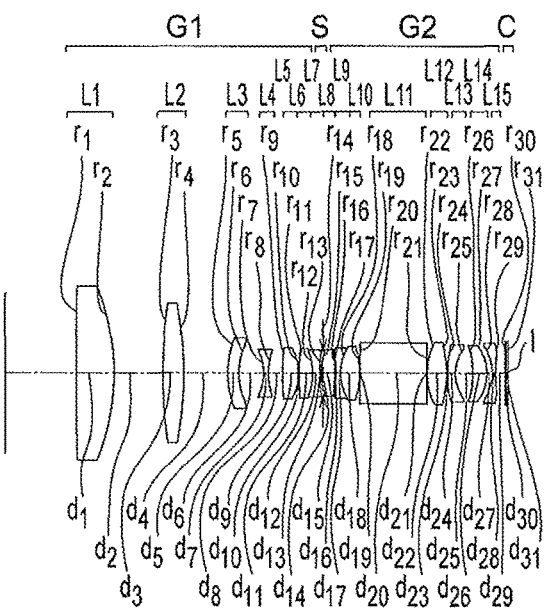
FIG. 10A is a cross-sectional view along an optical axis showing an optical arrangement of an optical system according to an example 10.
Figures 10B, 10C, 10D, 10E:
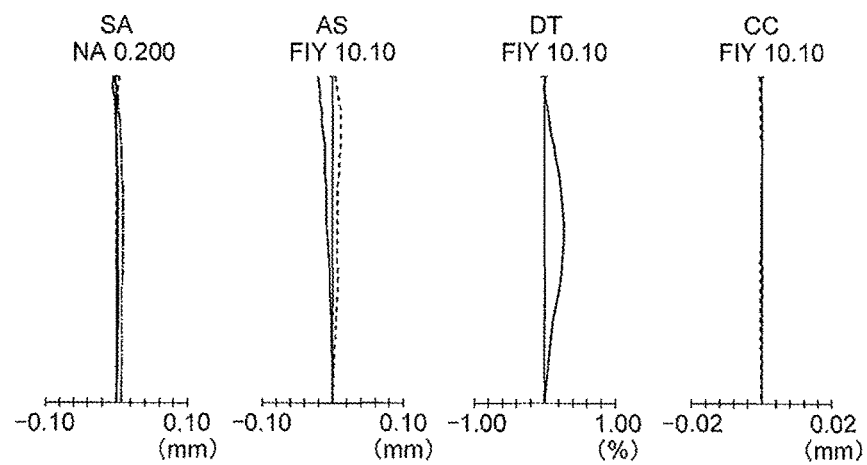
FIG. 10B, FIG. 10C, FIG. 10D, and FIG. 10E are aberration diagrams of the optical system according to the example 10.

Next, an optical system according to an example 10 will be described below. FIG. 10A is a cross-sectional view along an optical axis showing an optical arrangement of the optical system according to the example 10. Moreover, FIG. 10B, FIG. 10C, FIG. 10D, and FIG. 10E are aberration diagrams of the optical system according to the example 10.

The optical system according to the example 10, as shown in FIG. 10A, includes in order from an object side, a first lens unit G1 having a positive refractive power, an aperture stop S, and a second lens unit G2 having a positive refractive power.

The first lens unit G1 includes a biconvex positive lens L1, a biconvex positive lens L2, a negative meniscus lens L3 having a convex surface directed toward the object side, a biconcave negative lens 4, a biconvex positive lens L5, a biconvex positive lens L6, and a biconcave negative lens L7. Here, the biconvex positive lens L6 and the biconcave negative lens L7 are cemented.

The second lens unit G2 includes a biconvex positive lens L8, a biconcave negative lens L9, a biconvex positive lens L10, a prism L11, a biconvex positive lens L12, a negative meniscus lens L13 having a convex surface directed toward the object side, a positive meniscus lens L14 having a convex surface directed toward an image side, and a biconcave negative lens L15. Here, the biconcave negative lens L9 and the biconvex positive lens L10 are cemented.

In the first lens unit G1, an object-side lens unit includes the biconvex positive lens L1 and the biconvex positive lens L2. Moreover, an image-side lens unit includes the negative meniscus lens L3, the biconcave negative lens L4, the biconvex positive lens L5, the biconvex positive lens L6, and the biconcave negative lens L7. Here, all the lenses in the object-side lens unit are lenses that satisfy conditional expression (10). Moreover, all the lenses in the image-side lens unit are lenses that satisfy conditional expression (13).

In the second lens unit G2, the biconcave negative lens L15 is a predetermined lens unit.

An aspheric surface is used for 10 surfaces namely, both surfaces of the biconcave negative lens L4, both surfaces of the biconvex positive lens L8, both surfaces of the biconvex positive lens L12, both surfaces of the positive meniscus lens L14, and both surfaces of the biconcave negative lens L15.

Figure 11A:
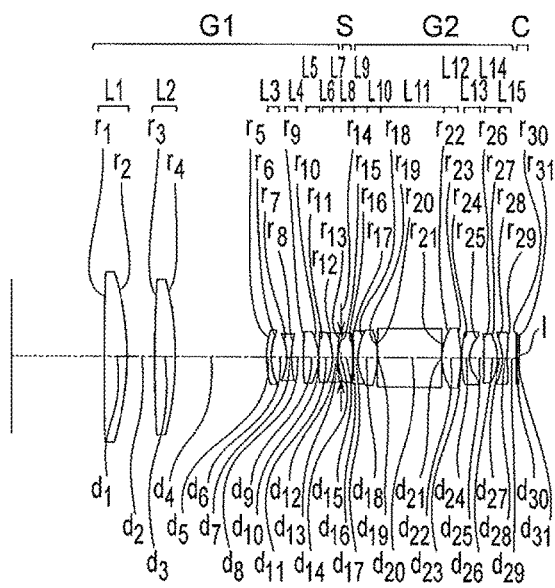
FIG. 11A is a cross-sectional view along an optical axis showing an optical arrangement of an optical system according to an example 11.
Figures 11B, 11C, 11D, 11E:
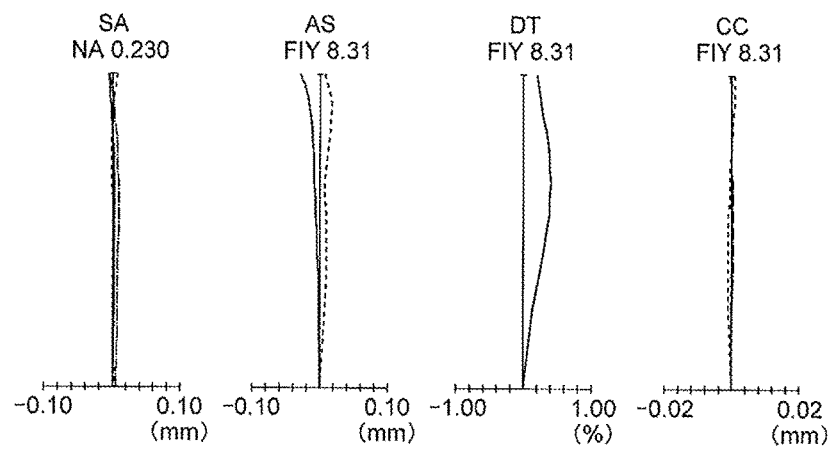
FIG. 11B, FIG. 11C, FIG. 11D, and FIG. 11E are aberration diagrams of the optical system according to the example 11.

Next, an optical system according to an example 11 will be described below. FIG. 11A is a cross-sectional view along an optical axis showing an optical arrangement of the optical system according to the example 11. Moreover, FIG. 11B, FIG. 11C, FIG. 11D, and FIG. 11E are aberration diagrams of the optical system according to the example 11.

The optical system according to the example 11, as shown in FIG. 11A, includes in order from an object side, a first lens unit G1 having a positive refractive power, an aperture stop S, and a second lens unit G2 having a positive refractive power.

The first lens unit G1 includes a biconvex positive lens L1, a biconvex positive lens L2, a negative meniscus lens L3 having a convex surface directed toward the object side, a biconcave negative lens L4, a biconvex positive lens L5, a biconvex positive lens L6, and a biconcave negative lens L7. Here, the biconvex positive lens L6 and the biconcave negative lens L7 are cemented.

The second lens unit G2 includes a biconvex positive lens L8, a biconcave negative lens L9, a biconvex positive lens L10, a prism L11, a biconvex positive lens L12, a negative meniscus lens L13 having a convex surface directed toward the object side, a biconvex positive lens L14, and a biconcave negative lens L15. Here, the biconcave negative lens L9 and the biconvex positive lens L10 are cemented.

In the first lens unit G1, an object-side lens unit includes the biconvex positive lens L1 and the biconvex positive lens L2. Moreover, an image-side lens unit includes the negative meniscus lens L3, the biconcave negative lens L4, the biconvex positive lens L5, the biconvex positive lens L6, and the biconcave negative lens L7. Here, all the lenses in the object-side lens unit are lenses that satisfy conditional expression (10). Moreover, all the lenses in the image-side lens unit are lenses that satisfy conditional expression (13).

In the second lens unit G2, the biconcave negative lens L15 is a predetermined lens unit.

An aspheric surface is used for 10 surfaces namely, both surfaces of the biconcave negative lens L4, both surfaces of the biconvex positive lens L8, both surfaces of the biconvex positive lens L12, both surfaces of the biconvex positive lens L14, and both surfaces of the biconcave negative lens L15.

Next, an optical system according to an example 12 invention will be described below. FIG. 12A is a cross-sectional view along an optical axis showing an optical arrangement of the optical system according to the example 12. Moreover, FIG. 12B, FIG. 12C, FIG. 12D, and FIG. 12E are aberration diagrams of the optical system according to the example 12.

The optical system according to the example 12, as shown in FIG. 12A, includes in order from an object side, a first lens unit G1 having a positive refractive power, an aperture stop S, and a second lens unit G2 having a positive refractive power.

The first lens unit G1 includes a biconvex positive lens L1, a biconvex positive lens L2, a negative meniscus lens L3 having a convex surface directed toward the object side, a biconcave negative lens L4, a biconvex positive lens L5, a positive meniscus lens L6 having a convex surface directed toward an image side, and a biconcave negative lens L7. Here, the positive meniscus lens L6 and the biconcave negative lens L7 are cemented.

The second lens unit G2 includes a biconvex positive lens L8, a biconcave negative lens L9, a biconvex positive lens L10, a prism 11, a biconvex positive lens L12, a negative meniscus lens L13 having a convex surface directed toward the object side, a biconvex positive lens L14, and a biconcave negative lens L15. Here, the biconcave negative lens L9 and the biconvex positive lens L10 are cemented.

In the first lens unit G1, an object-side lens unit includes the biconvex positive lens L1 and the biconvex positive lens L2. Moreover, an image-side lens unit includes the negative meniscus lens L3, the biconcave negative lens L4, the biconvex positive lens L5, the positive meniscus lens L6, and the biconcave negative lens L7. Here, all the lenses in the object-side lens unit are lenses that satisfy conditional expression (10). Moreover, all the lenses in the image-side lens unit are lenses that satisfy conditional expression (13).

In the second lens unit G2, the biconcave negative lens L15 is a predetermined lens unit.

An aspheric surface is used for 10 surfaces namely, both surfaces of the biconcave negative lens L4, both surfaces of the biconvex positive lens L8, both surfaces of the biconvex positive lens L12, both surfaces of the biconvex positive lens L14, and both surfaces of the biconcave negative lens L15.

Next, an optical system according to an example 13 will be described below. FIG. 13A is a cross-sectional view along an optical axis showing an optical arrangement of the optical system according to the example 13. Moreover, FIG. 13B, FIG. 13C, FIG. 13D, and FIG. 13E are aberration diagrams of the optical system according to the example 13.

The optical system according to the example 13, as shown in FIG. 13A, includes in order from an object side, a first lens unit G1 having a positive refractive power, an aperture stop S, and a second lens unit G2 having a positive refractive power.

The first lens unit G1 includes a biconvex positive lens L1, a positive meniscus lens L2 having a convex surface directed toward the object side, a negative meniscus lens L3 having a convex surface directed toward the object side, a biconvex positive lens L4, and a negative meniscus lens L5 having a convex surface directed toward the object side.

The second lens unit G2 includes a positive meniscus lens L6 having a convex surface directed toward an image side, a biconcave negative lens L7, a biconvex positive lens L8, a biconvex positive lens L9, a negative meniscus lens L10 having a convex surface directed toward the object side, a positive meniscus lens L11 having a convex surface directed toward the image side, and a negative meniscus lens L12 having a convex surface directed toward the object side. Here, the biconcave negative lens L7 and the biconvex positive lens L8 are cemented.

In the first lens unit G1, an object-side lens unit includes the biconvex positive lens L1 and the positive meniscus lens L2. Moreover, an image-side lens unit includes the negative meniscus lens L3, the biconvex positive lens L4, and the negative meniscus lens L5. Here, all the lenses in the object-side lens unit are lenses that satisfy conditional expression (10). Moreover, all the lenses in the image-side lens unit are lenses that satisfy conditional expression (13).

In the second lens unit G2, the negative meniscus lens L12 is a predetermined lens unit.

An aspheric surface is used for 10 surfaces namely, both surfaces of the biconvex positive lens L4, both surfaces of the positive meniscus lens L6, both surfaces of the biconvex positive lens L9, both surfaces of the positive meniscus lens L11, and both surfaces of the negative meniscus lens L12.

Next, an optical system according to an example 14 will be described below. FIG. 14A is a cross-sectional view along an optical axis showing an optical arrangement of the optical system according to the example 14. Moreover, FIG. 14B, FIG. 14C, FIG. 14D, and FIG. 14E are aberration diagrams of the optical system according to the example 14.

The optical system according to the example 14, as shown in FIG. 14A, includes in order from an object side, a first lens unit G1 having a negative refractive power, an aperture stop S, and a second lens unit G2 having a positive refractive power.

The first lens unit G1 includes a planoconvex positive lens L1, a positive meniscus lens L2 having a convex surface directed toward the object side, a negative meniscus lens L3 having a convex surface directed toward the object side, a positive meniscus lens L4 having a convex surface directed toward an image side, and a negative meniscus lens L5 having a convex surface directed toward the object side.

The second lens unit G2 includes a positive meniscus lens L6 having a convex surface directed toward the image side, a biconcave negative lens L7, a biconvex positive lens L8, a biconvex positive lens L9, a negative meniscus lens L10 having a convex surface directed toward the object side, a biconvex positive lens L11, and a positive meniscus lens L12 having a convex surface directed toward the object side. Here, the biconcave negative lens L7 and the biconvex positive lens L8 are cemented.

In the first lens unit G1, an object-side lens unit includes the planoconvex positive lens L1 and the positive meniscus lens L2. Moreover, an image-side lens unit includes the negative meniscus lens L3, the positive meniscus lens L4, and the negative meniscus lens L5. Here, all the lenses in the object-side lens unit are lenses that satisfy conditional expression (10). Moreover, all the lenses in the image-side lens unit are lenses that satisfy conditional expression (13).

An aspheric surface is used for 10 surfaces namely, both surfaces of the positive meniscus lens L4, both surfaces of the positive meniscus lens L6, both surfaces of the biconvex positive lens L9, both surfaces of the biconvex positive lens L11, and both surfaces of the negative meniscus lens L12.

Figure 15A:
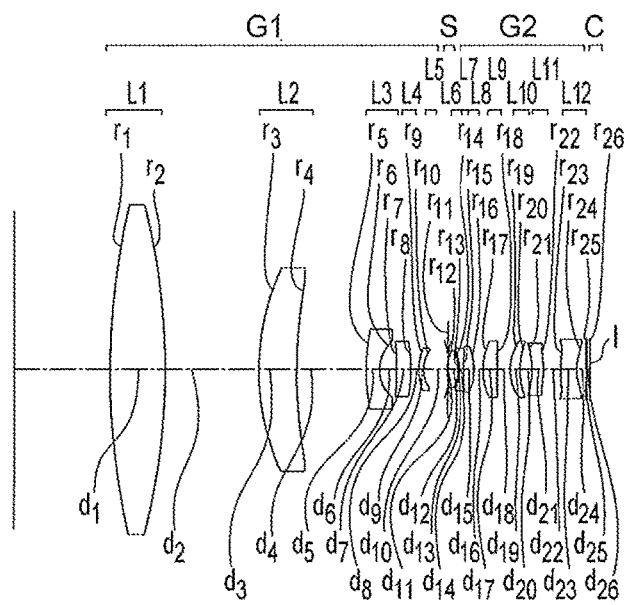
FIG. 15A is a cross-sectional view along an optical axis showing an optical arrangement of an optical system according to an example 15.
Figures 15B, 15C, 15D, 15E:
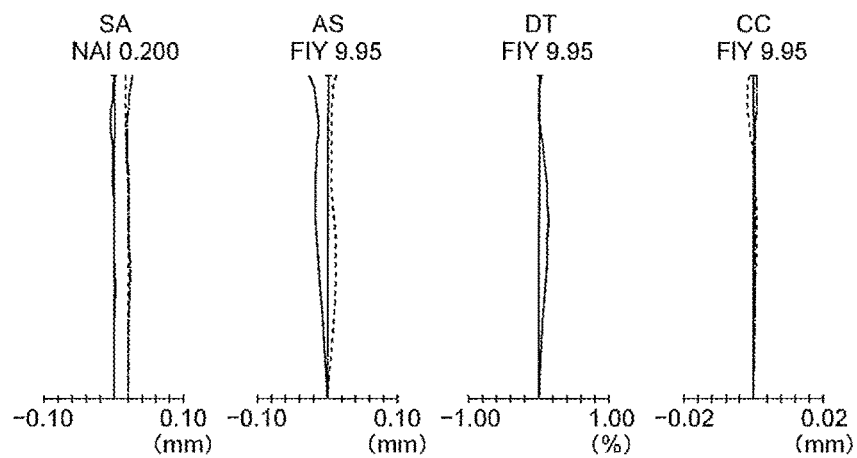
FIG. 15B, FIG. 15C, FIG. 15D, and FIG. 15E are aberration diagrams of the optical system according to the example 15.

Next, an optical system according to an example 15 will be described below. FIG. 15A is a cross-sectional view along an optical axis showing an optical arrangement of the optical system according to the example 15. Moreover, FIG. 15B, FIG. 15C, FIG. 15D, and FIG. 15E are aberration diagrams of the optical system according to the example 15.

The optical system according to the example 15, as shown in FIG. 15A, includes in order from an object side, a first lens unit G1 having a negative refractive power, an aperture stop S, and a second lens unit G2 having a positive refractive power.

The first lens unit G1 includes a biconvex positive lens L1, a positive meniscus lens L2 having a convex surface directed toward the object side, a negative meniscus lens L3 having a convex surface directed toward the object side, a positive meniscus lens L4 having a convex surface directed toward an image side, and a negative meniscus lens L5 having a convex surface directed toward the object side.

The second lens unit G2 includes a biconvex positive lens L6, a biconcave negative lens L7, a biconvex positive lens L8, a positive meniscus lens L9 having a convex surface directed toward the object side, a positive meniscus lens L10 having a convex surface directed toward the object side, a negative meniscus lens L11 having a convex surface directed toward the image side, and a negative meniscus lens L12 having a convex surface directed toward the object side. Here, the biconcave negative lens L7 and the biconvex positive lens L8 are cemented.

In the first lens unit G1, an object-side lens unit includes the biconvex positive lens L1 and the positive meniscus lens L2. Moreover, an image-side lens unit includes the negative meniscus lens L3, the positive meniscus lens L4, and the negative meniscus lens L5. Here, all the lenses in the object-side lens unit are lenses that satisfy conditional expression (10). Moreover, all the lenses in the image-side lens unit are lenses that satisfy conditional expression (13).

In the second lens unit G2, the negative meniscus lens L11 and the negative meniscus lens L12 are a predetermined lens unit.

An aspheric surface is used for 11 surfaces namely, an object-side surface of the negative meniscus lens L3, both surfaces of the positive meniscus lens L4, both surfaces of the biconvex positive lens L6, both surfaces of the positive meniscus lens L9, both surfaces of the negative meniscus lens L11, an both surfaces of the negative meniscus lens L12.

Next, an optical system according to an example 16 will be described below. FIG. 16A is a cross-sectional view along an optical axis showing an optical arrangement of the optical system according to the example 16. Moreover, FIG. 16B, FIG. 16C, FIG. 16D, and FIG. 16E are aberration diagrams of the optical system according to the example 16.

The optical system according to the example 16, as shown in FIG. 16A, includes in order from an object side, a first lens unit G1 having a positive refractive power, an aperture stop S, and a second lens unit G2 having a positive refractive power.

The first lens unit G1 includes a biconvex positive lens L1, a biconcave negative lens L2, a biconvex positive lens L3, a biconvex positive lens L4, a positive meniscus lens L5 having a convex surface directed toward the object side, and a negative meniscus lens L6 having a convex surface directed toward the object side. Here, the positive meniscus lens L5 and the negative meniscus lens L6 are cemented.

The second lens unit G2 includes a biconcave negative lens L7, a positive meniscus lens L8 having a convex surface directed toward the object side, a biconvex positive lens L9, a positive meniscus lens L10 having a convex surface directed toward the object side, a biconvex positive lens L11, a biconcave negative lens L12, and a biconcave negative lens L13. Here, the biconcave negative lens L7 and the positive meniscus lens L8 are cemented.

In the second lens unit G2, the biconcave negative lens L12 and the biconcave negative lens L13 are a predetermined lens unit.

An aspheric surface is used for 15 surfaces namely, an image-side surface of the biconvex positive lens L1, both surfaces of the biconcave negative lens L2, an object-side surface of the biconvex positive lens L3, an image-side surface of the biconvex positive lens L4, both surfaces of the biconvex positive lens L9, both surfaces of the positive meniscus lens L10, both surfaces of the biconvex positive lens L11, both surfaces of the biconcave negative lens L12, and both surfaces of the biconcave negative lens L13.

Figure 17A:
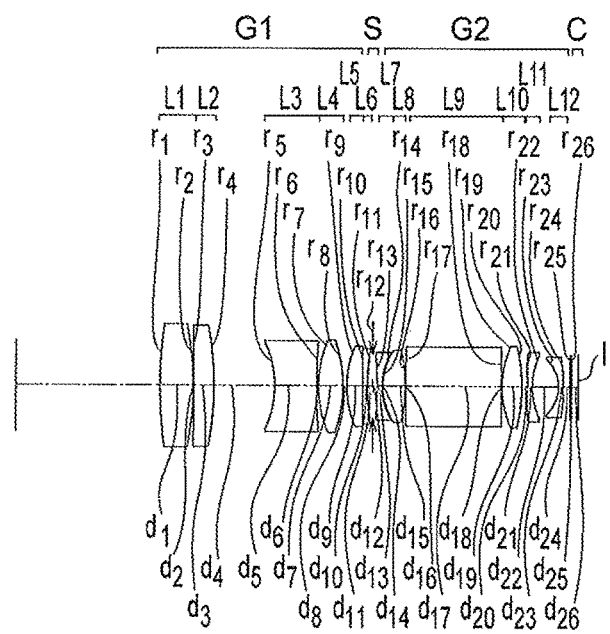
FIG. 17A is a cross-sectional view along an optical axis showing an optical arrangement of an optical system according to an example 17.
Figures 17B, 17C, 17D, 17E:
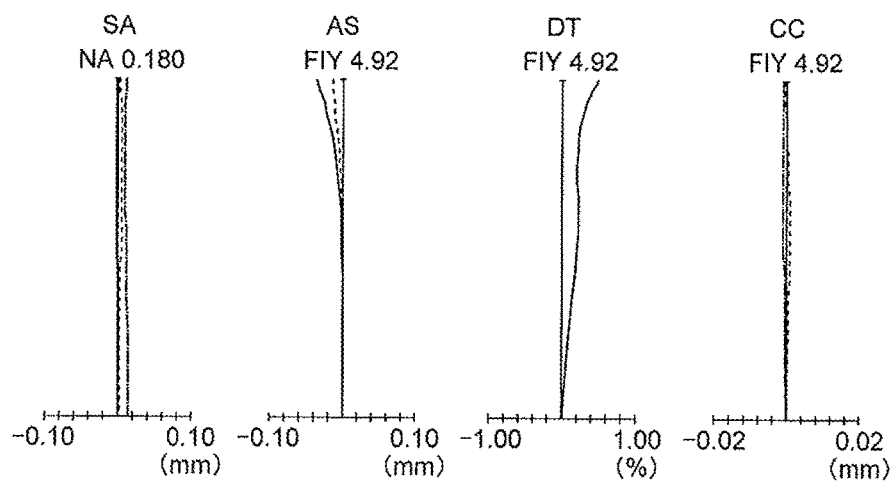
FIG. 17B, FIG. 17C, FIG. 17D, and FIG. 17E are aberration diagrams of the optical system according to the example 17.

Next, an optical system according to an example 17 will be described below. FIG. 17A is a cross-sectional view along an optical axis showing an optical arrangement of the optical system according to the example 17. Moreover, FIG. 17B, FIG. 17C, FIG. 17D, and FIG. 17E are aberration diagrams of the optical system according to the example 17.

The optical system according to the example 17, as shown in FIG. 17A, includes in order from an object side, a first lens unit G1 having a positive refractive power, an aperture stop S, and a second lens unit G2 having a negative refractive power.

The first lens unit G1 includes a biconvex positive lens L1, a positive meniscus lens L2 having a convex surface directed toward an image side, a biconcave negative lens L3, a biconvex positive lens L4, a biconvex positive lens L5, and a biconcave negative lens L6. Here, the biconvex positive lens L5 and the biconcave negative lens L6 are cemented.

The second lens unit G2 includes a biconcave negative lens L7, a biconvex positive lens L8, a prism L9, a biconvex positive lens L10, a biconcave negative lens L11, and a biconcave negative lens L12.

In the second lens unit G2, the biconcave negative lens L11 and the biconcave negative lens L12 are a predetermined lens unit.

An aspheric surface is used for 10 surfaces namely, an image-side surface of the biconvex positive lens L4, an image-side surface of the biconcave negative lens L7, both surfaces of the biconvex positive lens L8, both surfaces of the biconvex positive lens L10, both surfaces of the biconcave negative lens L11, and both surfaces of the biconcave negative lens L12.

Figure 18A:
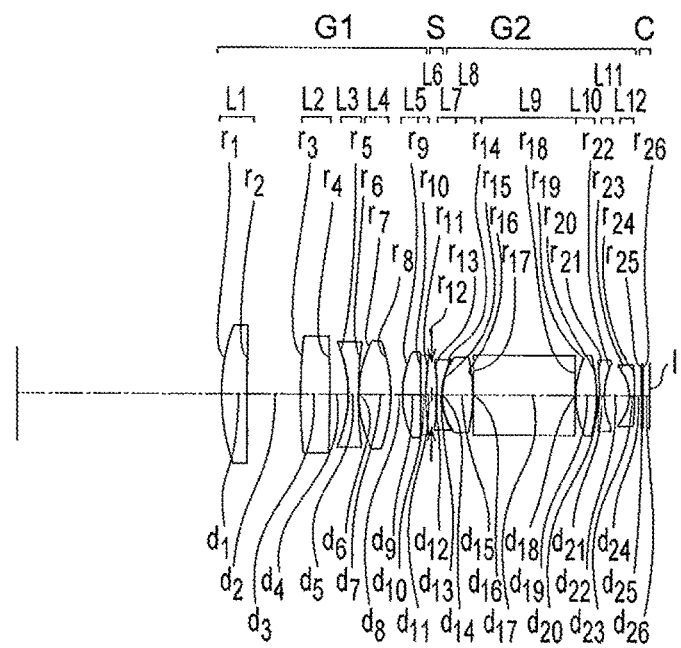
FIG. 18A is a cross-sectional view along an optical axis showing an optical arrangement of an optical system according to an example 18.
Figures 18B, 18C, 18D, 18E:
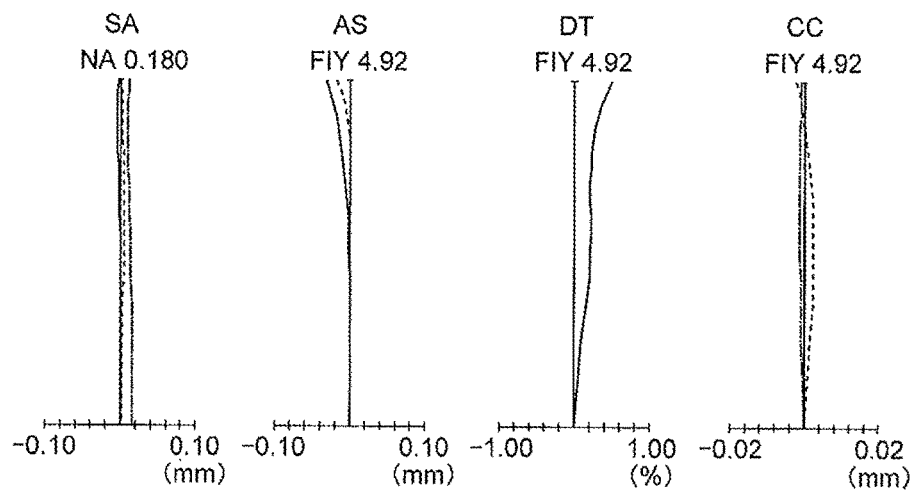
FIG. 18B, FIG. 18C, FIG. 18D, and FIG. 18E are aberration diagrams of the optical system according to the example 18.

Next, an optical system according to an example 18 will be described below. FIG. 18A is a cross-sectional view along an optical axis showing an optical arrangement of the optical system according to the example 18. Moreover, FIG. 18B, FIG. 18C, FIG. 18D, and FIG. 18E are aberration diagrams of the optical system according to the example 18.

The optical system according to the example 18, as shown in FIG. 18A, includes in order from an object side, a first lens unit G1 having a positive refractive power, an aperture stop S, and a second lens unit G2 having a negative refractive power.

The first lens unit G1 includes a positive meniscus lens L1 having a convex surface directed toward the object side, a biconvex positive lens L2, a biconcave negative lens L3, a biconvex positive lens L4, a biconvex positive lens L5, and a biconcave negative lens L6. Here, the biconvex positive lens L5 and the biconcave negative lens L6 are cemented.

The second lens unit G2 includes a biconcave negative lens L7, a biconvex positive lens L8, a prism L9, a biconvex positive lens L10, a biconcave negative lens L11, and a biconcave negative lens L12.

In the second lens unit G2, the biconcave negative lens L11 and the biconcave negative lens L12 are a predetermined lens unit.

An aspheric surface is used for 10 surfaces namely, an image-side surface of the biconvex positive lens L4, an image-side surface of the biconcave negative lens L7, both surfaces of the biconvex positive lens L8, both surfaces of the biconvex positive lens L10, both surfaces of the biconcave negative lens L11, and both surfaces of the biconcave negative lens L12.

Next, an optical system according to an example 19 will be described below. FIG. 19A is a cross-sectional view along an optical axis showing an optical arrangement of the optical system according to the example 19. Moreover, FIG. 19B, FIG. 19C, FIG. 19D, and FIG. 19E are aberration diagrams of the optical system according to the example 19.

The optical system according to the example 19, as shown in FIG. 19A, includes in order from an object side, a first lens unit G1 having a positive refractive power, an aperture stop S, and a second lens unit G2 having a negative refractive power.

The first lens unit G1 includes a positive meniscus lens L1 having a convex surface directed toward the object side, a biconvex positive lens L2, a biconcave negative lens L3, a biconvex positive lens L4, a biconvex positive lens L5, and a biconcave negative lens L6. Here, the biconvex positive lens L5 and the biconcave negative lens L6 are cemented.

The second lens unit G2 includes a biconcave negative lens L7, a biconvex positive lens L8, a prism L9, a biconvex positive lens L10, a biconcave negative lens L11, and a biconcave negative lens L12.

In the second lens unit G2, the biconcave negative lens L11 and the biconcave negative lens L12 are a predetermined lens unit.

An aspheric surface is used for 10 surfaces namely, an image-side surface of the biconvex positive lens L4, an image-side surface of the biconcave negative lens L7, both surfaces of the biconvex positive lens L8, both surfaces of the biconvex positive lens L10, both surfaces of the biconcave negative lens L11, and both surfaces of the biconcave negative lens L12.

Next, an optical system according to an example 20 will be described below. FIG. 20A is a cross-sectional view along an optical axis showing an optical arrangement of the optical system according to the example 20. Moreover, FIG. 20B, FIG. 20C, FIG. 20D, and FIG. 20E are aberration diagrams of the optical system according to the example 20.

The optical system according to the example 20, as shown in FIG. 20A, includes in order from an object side, a first lens unit G1 having a positive refractive power, an aperture stop S, and a second lens unit G2 having a positive refractive power.

The first lens unit G1 includes a positive meniscus lens L1 having a convex surface directed toward an image side, a biconvex positive lens L2, a biconcave negative lens L3, a biconvex positive lens L4, a biconvex positive lens L5, a biconvex positive lens L6, and a biconcave negative lens L7. Here, the biconvex positive lens L6 and the biconcave negative lens L7 are cemented.

The second lens unit G2 includes a biconcave negative lens L8, a biconvex positive lens L9, a positive meniscus lens L10 having a convex surface directed toward the image side, a positive meniscus lens L11 having a convex surface directed toward the image side, a biconvex positive lens L12, a negative meniscus lens L13 having a convex surface directed toward the object side, and a biconcave negative lens L14. Here, the biconcave negative lens L8 and the biconvex positive lens L9.

In the second lens unit G2, the negative meniscus lens L13 and the biconcave negative lens L14 are a predetermined lens unit.

An aspheric surface is used for 12 surfaces namely, an object-side surface of the biconvex positive lens L4, an image-side surface of the biconcave negative lens L15, both surfaces of the positive meniscus lens L10, both surfaces of the positive meniscus lens L11, both surfaces of the biconvex positive lens L12, both surfaces of the negative meniscus lens L13, and both surfaces of the biconcave negative lens L14.

Next, an optical system according to an example 21 will be described below. FIG. 21A is a cross-sectional view along an optical axis showing an optical arrangement of the optical system according to the example 21. Moreover, FIG. 21B, FIG. 21C, FIG. 21D, and FIG. 21E are aberration diagrams of the optical system according to the example 21.

The optical system according to the example 21, as shown in FIG. 21A, includes in order from an object side, a first lens unit G1 having a positive refractive power, an aperture stop S, and a second lens unit G2 having a positive refractive power.

The first lens unit G1 includes a negative meniscus lens L1 having a convex surface directed toward the object side, a positive meniscus lens L2 having a convex surface directed toward the object side, a biconvex positive lens L3, a biconvex positive lens L4, and a biconcave negative lens L5. Here, the negative meniscus lens L1 and the positive meniscus lens L2 are cemented. Moreover, the biconvex positive lens L4 and the biconcave negative lens L5 are cemented.

The second lens unit G2 includes a biconcave negative lens L6, a biconvex positive lens L7, a biconvex positive lens L8, a biconvex positive lens L9, a biconcave negative lens L10, and a biconcave negative lens L11. Here, the biconcave negative lens L6 and the biconvex positive lens L7 are cemented.

In the second lens unit G2, the biconcave negative lens L10 and the biconcave negative lens L11 are a predetermined lens unit.

An aspheric surface is used for five surfaces namely, an image-side surface of the biconvex positive lens L3, both surfaces of the biconvex positive lens L8, and both surfaces of the biconcave negative lens L11.

Figure 22A:
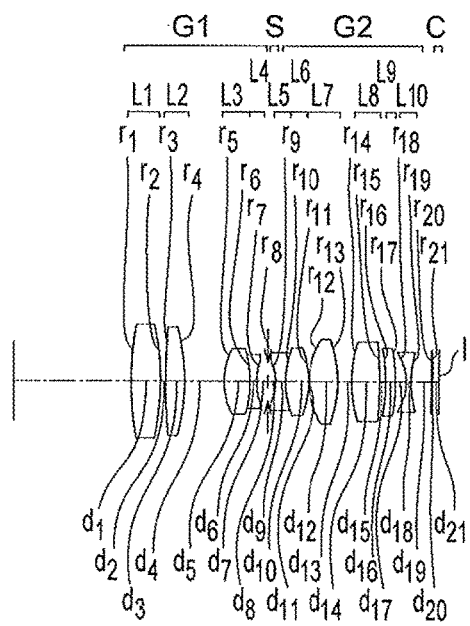
FIG. 22A is a cross-sectional view along an optical axis showing an optical arrangement of an optical system according to an example 22.
Figures 22B, 22C, 22D, 22E:
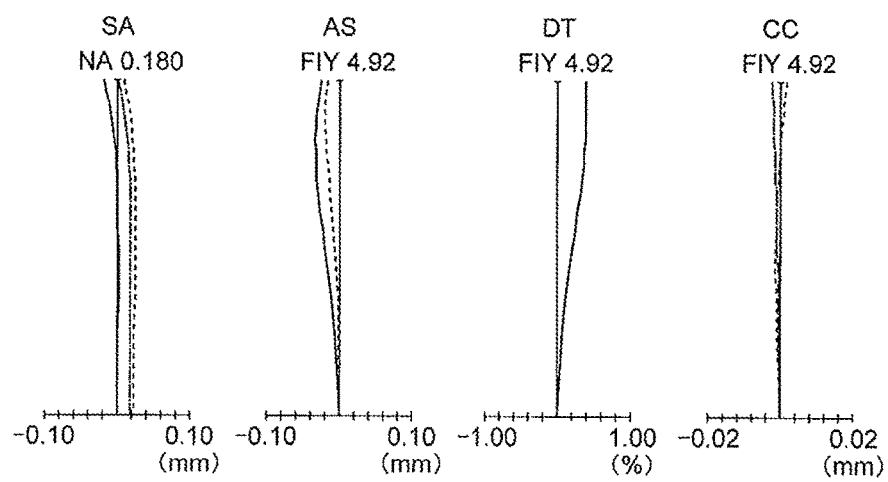
FIG. 22B, FIG. 22C, FIG. 22D, and FIG. 22E are aberration diagrams of the optical system according to the example 22.

Next, an optical system according to an example 22 will be described below. FIG. 22A is a cross-sectional view along an optical axis showing an optical arrangement of the optical system according to the example 22. Moreover, FIG. 22B, FIG. 22C, FIG. 22D, and FIG. 22E are aberration diagrams of the optical system according to the example 22.

The optical system according to the example 22, as shown in FIG. 22A, includes in order from an object side, a first lens unit G1 having a positive refractive power, an aperture stop S, and a second lens unit G2 having a positive refractive power.

The first lens unit G1 includes a biconvex positive lens L1, a biconvex positive lens L2, a biconvex positive lens L3, and a biconcave negative lens L4. Here, the biconvex positive lens L3 and the biconcave negative lens L4 are cemented.

The second lens unit G2 includes a biconcave negative lens L5, a biconvex positive lens L6, a biconvex positive lens L7, a biconvex positive lens L8, a positive meniscus lens L9 having a convex surface directed toward an image side, and a biconcave negative lens L10. Here, the biconcave negative lens L5 and the biconvex positive lens L6 are cemented.

In the second lens unit G2, the biconcave negative lens L10 is a predetermined lens unit.

An aspheric surface is used for six surfaces namely, an image-side surface of the biconvex positive lens L2, both surfaces of the biconvex positive lens L7, an image-side surface of the biconcave negative lens L9, and both surfaces of the biconcave negative lens L10.

Next, numerical data of optical components comprising the optical system of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, v1, vd2, . . . denotes an Abbe number of each lens, φ denotes an effective aperture (diameter), * denotes an aspheric surface, NA denotes a numerical aperture on the object side, β denotes a magnification, f denotes a focal length of a total optical system, IH denotes an image height, fb denotes a back focus. Lens total length is the distance from the frontmost lens surface to the rearmost lens surface plus back focus. The back focus is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12, A14, $$Z=(y^2/r)/[1+\{1-(1+k)(y/r)^2\}^{1/2}]+A4y^4+A6y^6+A8y^8+A10y^{10}+A12y^{12}+A14y^{14}$$

Further, E or e denotes exponent of ten. These symbols are commonly used in the following numerical data for each example.

EXAMPLE 1

| Unit mm | | | | |
|---|---|---|---|---|
| Surface data | | | | |
| Surface no. | r | d | nd | vd | φ |
| 1 | 290.230 | 16.85 | 1.91082 | 35.25 | 101.49 |
| 2 | −286.471 | 1.50 | | | 100.17 |
| 3 | −4871.735 | 9.90 | 1.91082 | 35.25 | 96.21 |
| 4 | −219.148 | 41.06 | | | 94.52 |
| 5* | −41.687 | 1.50 | 1.58360 | 30.33 | 38.74 |
| 6* | 46.368 | 8.17 | | | 35.85 |
| 7 | 44.400 | 9.66 | 1.49700 | 81.61 | 37.43 |
| 8 | −55.892 | 15.38 | | | 37.00 |
| 9 | −323.128 | 4.44 | 1.84666 | 23.78 | 24.42 |
| 10 | −32.362 | 1.50 | 1.72047 | 34.71 | 23.64 |
| 11 | 53.552 | 1.68 | | | 21.65 |
| 12(Stop) | ∞ | −1.32 | | | 21.42 |
| 13* | 30.518 | 6.58 | 1.53366 | 55.96 | 22.47 |
| 14* | −27.831 | 0.18 | | | 23.38 |
| 15 | −33.267 | 1.50 | 1.72047 | 34.71 | 23.47 |
| 16 | 46.956 | 5.22 | 1.61800 | 63.33 | 25.94 |
| 17 | −83.952 | 4.32 | | | 27.14 |
| 18* | 47.816 | 6.84 | 1.49700 | 81.61 | 32.72 |
| 19* | −87.060 | 0.62 | | | 32.97 |
| 20 | 27.830 | 5.99 | 1.72000 | 43.69 | 33.20 |
| 21 | 70.475 | 1.26 | | | 31.87 |
| 22 | 78.102 | 1.67 | 1.58313 | 59.38 | 31.22 |
| 23 | 18.075 | 11.55 | | | 27.59 |
| 24* | −49.380 | 4.50 | 1.53366 | 55.96 | 28.28 |
| 25* | −32.783 | 10.93 | | | 30.64 |
| 26* | −26.910 | 5.00 | 1.53366 | 55.96 | 34.05 |
| 27* | 104.671 | 2.50 | | | 41.03 |
| 28 | ∞ | 0.30 | 1.51633 | 64.14 | 42.98 |
| 29 | ∞ | 0.70 | | | |
| Image plane | ∞ | | | | |

Aspherical surface data

5th surface k = −1.000
A4 = 2.57780e−06, A6 = −3.39251e−09

6th surface k = −5.402
A4 = 1.40958e−05, A6 = −5.92552e−09

13th surface k = 0.000
A4 = −5.14399e−06, A6 = 7.68320e−09

14th surface k = 0.357
A4 = 1.27446e−05, A6 = 8.18251e−09

18th surface k = −1.248
A4 = 3.36805e−06, A6 = 3.20443e−09

19th surface k = −7.306
A4 = −5.23660e−06, A6 = 1.75914e−08

24th surface k = −1.685
A4 = −4.14372e−05

25th surface k = 0.000
A4 = −2.49691e−05

26th surface k = 0.345
A4 = 5.54883e−07, A6 = 2.92551e−09

27th surface k = 0.000
A4 = −2.24294e−05, A6 = 6.07817e−09, A8 = −3.27821e−11

Various data

| NA | 0.09 |
|---|---|
| β | −0.43 |
| f | 44.83 |
| IH(mm) | 21.67 |
| fb(mm) (in air) | 3.41 |
| Lens total length(mm) (in air) | 179.90 |

EXAMPLE 2

| Unit mm | | | | | |
|---|---|---|---|---|---|
| Surface data | | | | | |
| Surface no. | r | d | nd | vd | φ |
| 1 | 377.433 | 16.86 | 1.91082 | 35.25 | 102.33 |
| 2 | −237.980 | 2.98 | | | 101.38 |
| 3 | −1694.134 | 9.85 | 1.91082 | 35.25 | 96.03 |
| 4 | −202.477 | 39.72 | | | 94.47 |
| 5* | −42.627 | 1.50 | 1.58360 | 30.33 | 40.11 |
| 6* | 45.039 | 7.96 | | | 36.78 |
| 7 | 43.331 | 9.99 | 1.49700 | 81.61 | 38.73 |

-continued

Unit mm

| | | | | | |
|---|---|---|---|---|---|
| 8 | −56.813 | 17.24 | | | 38.38 |
| 9 | −361.698 | 4.32 | 1.84666 | 23.78 | 24.55 |
| 10 | −33.358 | 1.50 | 1.72047 | 34.71 | 23.80 |
| 11 | 52.546 | 1.73 | | | 21.83 |
| 12(Stop) | ∞ | −1.44 | | | 21.59 |
| 13* | 29.222 | 6.56 | 1.53366 | 55.96 | 22.69 |
| 14* | −29.001 | 0.14 | | | 23.52 |
| 15 | −35.383 | 1.50 | 1.72047 | 34.71 | 23.61 |
| 16 | 43.110 | 5.04 | 1.61800 | 63.33 | 25.95 |
| 17 | −105.508 | 3.04 | | | 27.04 |
| 18* | 46.444 | 6.28 | 1.49700 | 81.61 | 31.53 |
| 19* | −95.376 | 0.66 | | | 31.82 |
| 20 | 26.957 | 5.94 | 1.72000 | 43.69 | 32.38 |
| 21 | 74.146 | 1.26 | | | 31.17 |
| 22 | 80.705 | 1.67 | 1.58313 | 59.38 | 30.49 |
| 23 | 17.871 | 11.59 | | | 27.00 |
| 24* | −54.446 | 4.50 | 1.53366 | 55.96 | 28.06 |
| 25* | −35.275 | 10.96 | | | 30.32 |
| 26* | −23.921 | 5.00 | 1.53366 | 55.96 | 33.47 |
| 27* | 189.880 | 2.65 | | | 40.65 |
| 28 | ∞ | 0.30 | 1.51633 | 64.14 | 42.94 |
| 29 | ∞ | 0.70 | | | |
| Image plane | ∞ | | | | |

Aspherical surface data

5th surface k = −1.000
A4 = 2.75959e−06, A6 = −2.04244e−09
6th surface k = −4.080
A4 = 1.32287e−05, A6 = −1.86495e−09
13th surface k = 0.000
A4 = −5.34344e−06, A6 = 6.00899e−09
14th surface k = 0.114
A4 = 1.07687e−05, A6 = 1.85906e−09
18th surface k = −1.062
A4 = 3.56994e−06, A6 = −1.22920e−09
19th surface k = −16.180
A4 = −4.68878e−06, A6 = 1.38740e−08
24th surface k = 4.377
A4 = −2.82666e−05
25th surface k = 0.000
A4 = −1.92952e−05
26th surface k = 0.410
A4 = 9.98299e−06, A6 = 6.95543e−09
27th surface k = 0.000
A4 = −2.11662e−05, A6 = 1.18435e−08, A8 = −5.36504e−11

Various data

| | |
|---|---|
| NA | 0.09 |
| β | −0.43 |
| f | 44.32 |
| IH(mm) | 21.68 |
| fb(mm) (in air) | 3.55 |
| Lens total length(mm) (in air) | 179.90 |

EXAMPLE 3

Unit mm

Surface data

| Surface no. | r | d | nd | νd | φ |
|---|---|---|---|---|---|
| 1 | 785.203 | 17.18 | 1.73077 | 40.51 | 104.37 |
| 2 | −184.196 | 1.93 | | | 104.16 |
| 3 | −2678.237 | 12.98 | 1.62041 | 60.29 | 99.57 |
| 4 | −145.494 | 50.67 | | | 98.12 |
| 5* | −30.827 | 1.51 | 1.58360 | 30.33 | 34.31 |
| 6* | 95.512 | 7.59 | | | 32.23 |
| 7 | 53.150 | 7.49 | 1.49700 | 81.61 | 33.12 |
| 8 | −52.675 | 8.62 | | | 32.81 |
| 9 | 146.229 | 4.61 | 1.84666 | 23.78 | 25.90 |
| 10 | −47.030 | 1.50 | 1.72047 | 34.71 | 24.98 |
| 11 | 38.883 | 2.25 | | | 22.68 |
| 12(Stop) | ∞ | −1.67 | | | 22.47 |
| 13* | 27.718 | 6.80 | 1.53366 | 55.96 | 23.53 |
| 14* | −32.871 | 0.10 | | | 24.36 |
| 15 | −44.072 | 1.50 | 1.72047 | 34.71 | 24.49 |
| 16 | 33.967 | 5.20 | 1.61800 | 63.33 | 26.66 |
| 17 | −362.839 | 0.10 | | | 27.67 |
| 18* | 51.346 | 5.90 | 1.49700 | 81.61 | 29.66 |
| 19* | −80.998 | 0.90 | | | 30.04 |
| 20 | 26.330 | 5.80 | 1.72000 | 43.69 | 30.88 |
| 21 | 77.752 | 1.22 | | | 29.74 |
| 22 | 96.582 | 1.67 | 1.58313 | 59.38 | 29.20 |
| 23 | 17.842 | 12.03 | | | 26.13 |
| 24* | −100.399 | 3.80 | 1.53366 | 55.96 | 28.30 |
| 25* | −46.976 | 11.29 | | | 30.03 |
| 26* | −20.198 | 5.00 | 1.53366 | 55.96 | 33.75 |
| 27* | 2674.981 | 3.04 | | | 40.45 |
| 28 | ∞ | 0.30 | 1.51633 | 64.14 | 42.84 |
| 29 | ∞ | 0.70 | | | |
| Image plane | ∞ | | | | |

Aspherical surface data

5th surface k = −1.000
A4 = 9.85445e−06, A6 = −7.07014e−09
6th surface k = 0.991
A4 = 1.57913e−05, A6 = 1.95861e−09
13th surface k = 0.000
A4 = −1.05103e−05, A6 = 3.45440e−09
14th surface k = −0.274
A4 = 2.79279e−06, A6 = 1.46711e−09
18th surface k = −0.233
A4 = 5.27095e−06, A6 = 9.84958e−10
19th surface k = −23.478
A4 = −4.18438e−06, A6 = 1.12794e−08
24th surface k = 38.739
A4 = −1.06404e−05
25th surface k = 0.000
A4 = −5.02093e−06
26th surface k = −0.052
A4 = 2.79272e−05, A6 = 4.91374e−09

-continued

| Unit mm |
|---|

27th surface k = 0.000
A4 = −2.08432e−05, A6 = 2.73821e−08, A8 = −8.44032e−11

| Various data | |
|---|---|
| NA | 0.09 |
| β | −0.43 |
| f | 43.17 |
| IH(mm) | 21.59 |
| fb(mm) (in air) | 3.94 |
| Lens total length(mm) (in air) | 179.90 |

EXAMPLE 4

| Unit mm | | | | |
|---|---|---|---|---|
| Surface data | | | | |

| Surface no. | r | d | nd | νd | φ |
|---|---|---|---|---|---|
| 1 | 5221.748 | 16.37 | 1.73077 | 40.51 | 101.64 |
| 2 | −175.401 | 1.76 | | | 101.63 |
| 3 | −233855.651 | 13.32 | 1.62041 | 60.29 | 97.22 |
| 4 | −154.905 | 60.70 | | | 95.56 |
| 5* | −28.919 | 1.71 | 1.58360 | 30.33 | 26.77 |
| 6* | 107.810 | 7.70 | | | 25.24 |
| 7 | 59.011 | 5.45 | 1.49700 | 81.61 | 24.74 |
| 8 | −46.139 | 0.49 | | | 24.27 |
| 9 | −5647.022 | 4.32 | 1.84666 | 23.78 | 23.03 |
| 10 | −34.878 | 1.50 | 1.72047 | 34.71 | 22.26 |
| 11 | 57.168 | 2.71 | | | 20.61 |
| 12(Stop) | ∞ | 0.37 | | | 19.89 |
| 13* | 35.185 | 6.57 | 1.53366 | 55.96 | 22.09 |
| 14* | −27.032 | 0.10 | | | 23.10 |
| 15 | −34.971 | 1.53 | 1.72047 | 34.71 | 23.20 |
| 16 | 39.286 | 5.51 | 1.61800 | 63.33 | 25.43 |
| 17 | −98.149 | 0.10 | | | 26.61 |
| 18* | 73.902 | 5.84 | 1.49700 | 81.61 | 28.10 |
| 19* | −59.493 | 0.61 | | | 28.67 |
| 20 | 26.168 | 5.70 | 1.72000 | 43.69 | 29.16 |
| 21 | 79.838 | 1.20 | | | 27.92 |
| 22 | 90.083 | 1.67 | 1.58313 | 59.38 | 27.31 |
| 23 | 17.384 | 11.71 | | | 24.51 |
| 24* | −473.682 | 3.37 | 1.53366 | 55.96 | 26.70 |
| 25* | −62.504 | 11.18 | | | 27.43 |
| 26* | −25.843 | 5.00 | 1.53366 | 55.96 | 29.88 |
| 27* | 99.885 | 2.51 | | | 34.17 |
| 28 | ∞ | 0.30 | 1.51633 | 64.14 | 35.39 |
| 29 | ∞ | 0.70 | | | |
| Image plane | ∞ | | | | |

| Aspherical surface data |
|---|

5th surface k = −1.000
A4 = 1.28943e−05, A6 = −1.34791e−08
6th surface k = 0.000
A4 = 2.19446e−05, A6 = 4.90652e−09
13th surface k = 0.000
A4 = −1.04019e−05, A6 = 4.75397e−09
14th surface k = −0.578
A4 = 4.09529e−06, A6 = −3.74743e−09

-continued

| Unit mm |
|---|

18th surface k = −5.841
A4 = 3.85564e−06, A6 = 1.35308e−09
19th surface k = 0.000
A4 = −5.49975e−06, A6 = 9.32029e−09
24th surface k = 0.000
A4 = −6.28772e−06
25th surface k = 0.000
A4 = 7.74267e−06
26th surface k = 0.304
A4 = 1.88714e−05, A6 = 8.00602e−09
27th surface k = 0.000
A4 = −2.19580e−05, A6 = 9.18849e−09, A8 = −5.39544e−11

| Various data | |
|---|---|
| NA | 0.07 |
| β | −0.35 |
| f | 44.93 |
| IH(mm) | 17.88 |
| fb(mm) (in air) | 3.41 |
| Lens total length(mm) (in air) | 179.90 |

EXAMPLE 5

| Unit mm | | | | |
|---|---|---|---|---|
| Surface data | | | | |

| Surface no. | r | d | nd | νd | φ |
|---|---|---|---|---|---|
| 1 | 9187931.290 | 16.14 | 1.73077 | 40.51 | 104.36 |
| 2 | −171.745 | 1.50 | | | 104.62 |
| 3 | −577900.449 | 13.86 | 1.62041 | 60.29 | 100.38 |
| 4 | −142.408 | 55.61 | | | 99.06 |
| 5* | −30.718 | 1.50 | 1.58360 | 30.33 | 30.87 |
| 6* | 83.213 | 7.52 | | | 28.93 |
| 7 | 54.905 | 6.71 | 1.49700 | 81.61 | 29.37 |
| 8 | −47.115 | 4.78 | | | 29.02 |
| 9 | 159.227 | 4.47 | 1.84666 | 23.78 | 24.60 |
| 10 | −46.111 | 1.50 | 1.72047 | 34.71 | 23.67 |
| 11 | 42.181 | 1.98 | | | 21.63 |
| 12(Stop) | ∞ | −0.50 | | | 21.39 |
| 13* | 31.466 | 6.97 | 1.53366 | 55.96 | 23.31 |
| 14* | −30.402 | 0.10 | | | 24.37 |
| 15 | −42.088 | 1.50 | 1.72047 | 34.71 | 24.53 |
| 16 | 35.055 | 5.79 | 1.61800 | 63.33 | 26.85 |
| 17 | −162.060 | 0.10 | | | 28.05 |
| 18* | 79.437 | 6.27 | 1.49700 | 81.61 | 29.62 |
| 19* | −56.262 | 0.47 | | | 30.25 |
| 20 | 26.495 | 5.93 | 1.72000 | 43.69 | 30.91 |
| 21 | 71.583 | 1.19 | | | 29.60 |
| 22 | 79.040 | 1.67 | 1.58313 | 59.38 | 29.01 |
| 23 | 17.489 | 11.31 | | | 25.90 |
| 24* | −939.434 | 3.72 | 1.53366 | 55.96 | 28.02 |
| 25* | −78.289 | 10.98 | | | 29.21 |
| 26* | −17.724 | 5.00 | 1.53366 | 55.96 | 31.10 |
| 27* | −160.121 | 2.93 | | | 37.56 |
| 28 | ∞ | 0.30 | 1.51633 | 64.14 | 39.96 |
| 29 | ∞ | 0.70 | | | |
| Image plane | ∞ | | | | |

-continued

| Unit mm |
|---|

Aspherical surface data

5th surface k = −1.000
A4 = 1.08837e−05, A6 = −8.31696e−09

6th surface k = 0.000
A4 = 1.90152e−05, A6 = 5.92495e−09

13th surface k = 0.000
A4 = −1.15501e−05, A6 = −3.81941e−11

14th surface k = −0.638
A4 = 2.45955e−06, A6 = −3.83848e−09

18th surface k = −4.280
A4 = 4.86399e−06, A6 = 2.54101e−09

19th surface k = 0.000
A4 = −3.26843e−05, A6 = 6.66087e−09

24th surface k = 0.000
A4 = −2.13531e−05

25th surface k = 0.000
A4 = −1.70921e−05

26th surface k = −0.167
A4 = 3.02664e−05, A6 = −6.23547e−09

27th surface k = 0.000
A4 = −1.60019e−05, A6 = −1.14301e−09, A8 = −6.64954e−11

Various data

| | |
|---|---|
| NA | 0.08 |
| β | −0.40 |
| f | 44.12 |
| IH(mm) | 20.13 |
| fb(mm) (in air) | 3.83 |
| Lens total length(mm) (in air) | 179.90 |

EXAMPLE 6

| Unit mm |
|---|

Surface data

| Surface no. | r | d | nd | νd | φ |
|---|---|---|---|---|---|
| 1 | 1574.091 | 15.27 | 1.73077 | 40.51 | 98.66 |
| 2 | −188.507 | 1.50 | | | 98.30 |
| 3 | −66763.325 | 12.08 | 1.62041 | 60.29 | 94.23 |
| 4 | −154.464 | 55.50 | | | 92.70 |
| 5* | −32.334 | 1.52 | 1.58360 | 30.33 | 28.45 |
| 6* | 113.928 | 6.45 | | | 26.86 |
| 7 | 58.638 | 5.37 | 1.49700 | 81.61 | 25.95 |
| 8 | −55.039 | 11.66 | | | 25.37 |
| 9 | 96.850 | 3.32 | 1.84666 | 23.78 | 16.68 |
| 10 | −62.731 | 1.75 | 1.72047 | 34.71 | 15.65 |
| 11 | 34.937 | 1.31 | | | 14.24 |
| 12(Stop) | ∞ | 0.97 | | | 13.94 |
| 13* | 28.847 | 4.81 | 1.53366 | 55.96 | 16.27 |
| 14* | −32.529 | 0.10 | | | 17.33 |
| 15 | −57.290 | 3.42 | 1.72047 | 34.71 | 17.54 |
| 16 | 27.067 | 4.50 | 1.61800 | 63.33 | 19.57 |
| 17 | 510.324 | 0.10 | | | 20.74 |
| 18* | 83.849 | 4.32 | 1.49700 | 81.61 | 21.23 |
| 19* | −62.852 | 1.44 | | | 22.21 |
| 20 | 23.697 | 5.27 | 1.72000 | 43.69 | 24.27 |
| 21 | 113.073 | 1.19 | | | 23.50 |
| 22 | 102.126 | 1.65 | 1.58313 | 59.38 | 23.05 |
| 23 | 16.600 | 11.60 | | | 21.48 |
| 24* | −275.425 | 3.98 | 1.53366 | 55.96 | 25.39 |
| 25* | −79.530 | 11.13 | | | 26.83 |
| 26* | −20.965 | 5.00 | 1.53366 | 55.96 | 30.24 |
| 27* | −1581.442 | 3.39 | | | 36.65 |
| 28 | ∞ | 0.30 | 1.51633 | 64.14 | 39.91 |
| 29 | ∞ | 0.70 | | | |
| Image plane | ∞ | | | | |

Aspherical surface data

5th surface k = −1.000
A4 = 8.30055e−06, A6 = −5.54126e−09

6th surface k = 0.000
A4 = 1.53178e−05, A6 = 1.08291e−10

13th surface k = 0.000
A4 = −9.32884e−06, A6 = 1.18578e−09

14th surface k = −1.053
A4 = 4.08045e−06, A6 = 4.95261e−11

18th surface k = −18.602
A4 = 2.87116e−06, A6 = −4.65144e−09

19th surface k = 0.000
A4 = −9.57505e−06, A6 = 4.22772e−10

24th surface k = 0.000
A4 = −6.32628e−06

25th surface k = 0.000
A4 = 4.60539e−06

26th surface k = 0.232
A4 = 2.93882e−05, A6 = −1.18611e−08

27th surface k = 0.000
A4 = −1.96890e−05, A6 = 3.44237e−09, A8 = −7.42664e−11

Various data

| | |
|---|---|
| NA | 0.05 |
| β | −0.40 |
| f | 45.88 |
| IH(mm) | 20.18 |
| fb(mm) (in air) | 4.30 |
| Lens total length(mm) (in air) | 179.52 |

EXAMPLE 7

Unit mm

Surface data

| Surface no. | r | d | nd | vd | φ |
|---|---|---|---|---|---|
| 1 | 809.519 | 15.50 | 1.73077 | 40.51 | 97.76 |
| 2 | −211.448 | 1.75 | | | 97.13 |
| 3 | −182259.026 | 12.52 | 1.62041 | 60.29 | 93.38 |
| 4 | −155.307 | 53.42 | | | 91.66 |
| 5* | −35.463 | 1.53 | 1.58360 | 30.33 | 30.85 |
| 6* | 99.984 | 5.96 | | | 29.02 |
| 7 | 63.281 | 5.91 | 1.49700 | 81.61 | 28.47 |
| 8 | −55.037 | 15.25 | | | 27.94 |
| 9 | 87.469 | 3.37 | 1.84666 | 23.78 | 16.92 |
| 10 | −70.150 | 1.65 | 1.72047 | 34.71 | 15.86 |
| 11 | 33.296 | 1.39 | | | 14.48 |
| 12(Stop) | ∞ | 0.25 | | | 14.18 |
| 13* | 27.960 | 4.57 | 1.53366 | 55.96 | 15.64 |
| 14* | −33.555 | 0.10 | | | 16.69 |
| 15 | −66.002 | 2.53 | 1.72047 | 34.71 | 16.92 |
| 16 | 25.355 | 4.02 | 1.61800 | 63.33 | 18.53 |
| 17 | 216.000 | 0.10 | | | 19.57 |
| 18* | 96.150 | 4.11 | 1.49700 | 81.61 | 19.89 |
| 19* | −59.233 | 1.94 | | | 20.91 |
| 20 | 23.183 | 5.11 | 1.72000 | 43.69 | 23.28 |
| 21 | 125.863 | 1.18 | | | 22.60 |
| 22 | 85.260 | 1.64 | 1.58313 | 59.38 | 22.13 |
| 23 | 15.736 | 11.63 | | | 20.65 |
| 24* | −196.157 | 3.95 | 1.53366 | 55.96 | 24.97 |
| 25* | −71.846 | 11.15 | | | 26.51 |
| 26* | −19.319 | 5.00 | 1.53366 | 55.96 | 30.05 |
| 27* | −248.081 | 3.45 | | | 36.60 |
| 28 | ∞ | 0.30 | 1.51633 | 64.14 | 39.84 |
| 29 | ∞ | 0.70 | | | |
| Image plane | ∞ | | | | |

Aspherical surface data

5th surface k = −1.000
A4 = 8.13136e−06, A6 = −5.31392e−09

6th surface k = 0.000
A4 = 1.44260e−05, A6 = 2.49441e−10

13th surface k = 0.000
A4 = −1.27107e−05, A6 = −7.33241e−09

14th surface k = −0.873
A4 = 3.56248e−06, A6 = −1.73093e−09

18th surface k = −12.398
A4 = 2.87620e−06, A6 = 8.91012e−09

19th surface k = 0.000
A4 = −9.51161e−06, A6 = 2.46205e−10

24th surface k = 0.000
A4 = −5.83150e−06

25th surface k = 0.000
A4 = 2.59840e−06

26th surface k = 0.108
A4 = 3.78586e−05, A6 = −1.58747e−08

-continued

Unit mm

27th surface k = 0.000
A4 = −1.66449e−05, A6 = 1.44247e−08, A8 = −1.29860e−10

Various data

| NA | 0.05 |
|---|---|
| β | −0.40 |
| f | 46.48 |
| IH(mm) | 20.12 |
| fb(mm) (in air) | 4.35 |
| Lens total length mm) (in air) | 179.91 |

EXAMPLE 8

Unit mm

Surface data

| Surface no. | r | d | nd | vd | φ |
|---|---|---|---|---|---|
| 1 | 153.364 | 16.01 | 1.91082 | 35.25 | 102.08 |
| 2 | −977.024 | 23.48 | | | 100.17 |
| 3 | 259.518 | 7.58 | 1.91082 | 35.25 | 79.34 |
| 4 | −1370.022 | 44.07 | | | 77.22 |
| 5* | −65.913 | 1.00 | 1.58360 | 30.33 | 24.73 |
| 6* | 23.807 | 11.23 | | | 22.58 |
| 7 | 51.650 | 4.90 | 1.49700 | 81.61 | 23.46 |
| 8 | −32.981 | 5.65 | | | 23.33 |
| 9 | −77.439 | 2.63 | 1.84666 | 23.78 | 19.27 |
| 10 | −26.423 | 0.70 | 1.72047 | 34.71 | 19.01 |
| 11 | 204.574 | 0.76 | | | 18.35 |
| 12(Stop) | ∞ | −0.46 | | | 18.15 |
| 13* | 49.832 | 4.22 | 1.53366 | 55.96 | 18.52 |
| 14* | −24.204 | 0.30 | | | 19.13 |
| 15 | −25.551 | 0.70 | 1.72047 | 34.71 | 19.22 |
| 16 | 95.296 | 3.75 | 1.61800 | 63.33 | 20.67 |
| 17 | −33.299 | 0.10 | | | 21.40 |
| 18* | 68.048 | 4.50 | 1.49700 | 81.61 | 22.33 |
| 19* | −67.440 | 1.89 | | | 23.07 |
| 20 | 24.298 | 4.50 | 1.78590 | 44.20 | 23.53 |
| 21 | 38.831 | 1.40 | | | 22.20 |
| 22 | 32.697 | 2.01 | 1.59551 | 39.24 | 21.69 |
| 23 | 15.131 | 8.33 | | | 19.92 |
| 24* | −24.252 | 3.77 | 1.53366 | 55.96 | 20.67 |
| 25* | −30.000 | 8.68 | | | 22.57 |
| 26* | −294.255 | 5.00 | 1.53366 | 55.96 | 26.72 |
| 27* | 40.862 | 3.00 | | | 30.95 |
| 28 | ∞ | 0.30 | 1.51633 | 64.14 | 32.86 |
| 29 | ∞ | 0.70 | | | |
| Image plane | ∞ | | | | |

Aspherical surface data

5th surface k = −1.000
A4 = −1.92165e−05, A6 = 1.09278e−08

6th surface k = −1.074
A4 = 2.02385e−05, A6 = 2.59222e−08

13th surface k = 0.000
A4 = −1.16004e−06, A6 = −2.51732e−08

14th surface k = 0.216
A4 = −1.64308e−05, A6 = 3.04689e−08

-continued

| Unit mm |
|---|

18th surface k = −8.723
A4 = −2.47687e−05, A6 = −3.20757e−08
19th surface k = 0.000
A4 = −2.25112e−05, A6 = −4.19122e−08
24th surface k = 0.000
A4 = 2.37416e−05
25th surface k = 0.000
A4 = 4.15526e−05
26th surface k = 0.000
A4 = −6.91467e−05, A6 = 9.28415e−08
27th surface k = 0.000
A4 = −7.18720e−05, A6 = 4.49954e−08, A8 = 1.59780e−13

| Various data | |
|---|---|
| NA | 0.07 |
| β | −0.33 |
| f | 57.11 |
| IH(mm) | 16.67 |
| fb(mm) (in air) | 3.90 |
| Lens total length (mm) (in air) | 170.60 |

EXAMPLE 9

| Unit mm | | | | | |
|---|---|---|---|---|---|
| Surface data | | | | | |
| Surface no. | r | d | nd | νd | φ |
| 1 | 40.667 | 12.54 | 1.74400 | 44.78 | 51.23 |
| 2 | 110.182 | 0.70 | | | 47.40 |
| 3 | 56.524 | 7.98 | 1.85400 | 40.39 | 45.17 |
| 4 | 340.596 | 19.31 | | | 41.85 |
| 5* | −15.539 | 1.50 | 1.58360 | 30.33 | 15.04 |
| 6* | 15.144 | 5.22 | | | 13.14 |
| 7 | 20.286 | 4.70 | 1.49700 | 81.61 | 14.18 |
| 8 | −15.190 | 1.55 | | | 14.00 |
| 9 | −43.387 | 2.25 | 1.84666 | 23.78 | 11.71 |
| 10 | −15.214 | 0.70 | 1.72047 | 34.71 | 11.29 |
| 11 | 103.583 | 0.65 | | | 10.60 |
| 12(Stop) | ∞ | −0.35 | | | 10.32 |
| 13* | 18.240 | 3.36 | 1.53366 | 55.96 | 10.65 |
| 14* | −15.418 | 0.30 | | | 11.25 |
| 15 | −16.568 | 0.70 | 1.72047 | 34.71 | 11.32 |
| 16 | 47.648 | 2.98 | 1.61800 | 63.33 | 12.16 |
| 17 | −21.174 | 0.10 | | | 12.88 |
| 18* | 25.501 | 2.68 | 1.49700 | 81.61 | 13.53 |
| 19* | 95.345 | 0.25 | | | 13.64 |
| 20 | 21.865 | 2.78 | 1.78590 | 44.20 | 13.59 |
| 21 | 16.804 | 2.01 | | | 12.70 |
| 22 | 19.595 | 2.27 | 1.59551 | 39.24 | 12.88 |
| 23 | 21.012 | 5.10 | | | 12.45 |
| 24* | −73.182 | 1.78 | 1.53366 | 55.96 | 12.59 |
| 25* | −15.000 | 1.15 | | | 13.98 |
| 26* | −14.873 | 2.50 | 1.53366 | 55.96 | 14.85 |
| 27* | 17.238 | 3.00 | | | 17.53 |
| 28 | ∞ | 0.30 | 1.51633 | 64.14 | 19.46 |
| 29 | ∞ | 0.70 | | | |
| Image plane | ∞ | | | | |

-continued

| Unit mm |
|---|

Aspherical surface data

5th surface k = −1.000
A4 = 4.75413e−05, A6 = −1.37198e−07
6th surface k = −0.789
A4 = 1.96241e−04, A6 = 6.37208e−07
13th surface k = 0.000
A4 = −1.03779e−04, A6 = −5.55608e−07
14th surface k = −0.251
A4 = 1.73339e−06, A6 = 3.53019e−07
18th surface k = 0.000
A4 = −1.09187e−04, A6 = 1.15659e−06
19th surface k = 0.000
A4 = −2.12928e−04, A6 = 8.43884e−07
24th surface k = 0.000
A4 = −7.02693e−04
25th surface k = 0.000
A4 = 4.70862e−04
26th surface k = 0.000
A4 = 6.07403e−04, A6 = −4.82564e−06
27th surface k = 0.000
A4 = −5.72039e−04, A6 = 3.62103e−06, A8 = −2.75557e−08

| Various data | |
|---|---|
| NA | 0.08 |
| β | −0.40 |
| f | 29.30 |
| IH(mm) | 9.99 |
| fb(mm) (in air) | 3.90 |
| Lens total length(mm) (in air) | 88.60 |

EXAMPLE 10

| Unit mm | | | | | |
|---|---|---|---|---|---|
| Surface data | | | | | |
| Surface no. | r | d | nd | νd | φ |
| 1 | 1000.000 | 12.02 | 1.74400 | 44.78 | 54.31 |
| 2 | −75.500 | 15.36 | | | 54.79 |
| 3 | 150.000 | 6.54 | 1.74400 | 44.78 | 43.98 |
| 4 | −120.513 | 13.67 | | | 42.77 |
| 5 | 29.997 | 3.40 | 1.65844 | 50.88 | 22.29 |
| 6 | 21.508 | 7.64 | | | 18.85 |
| 7* | −16.766 | 1.51 | 1.68893 | 31.08 | 15.06 |
| 8* | 23.675 | 4.33 | | | 14.72 |
| 9 | 78.561 | 4.88 | 1.49700 | 81.61 | 16.22 |
| 10 | −17.774 | 0.31 | | | 16.22 |
| 11 | 144.084 | 4.14 | 1.84666 | 23.78 | 15.45 |
| 12 | −20.335 | 2.18 | 1.72047 | 34.71 | 14.91 |
| 13 | 48.592 | 1.09 | | | 13.69 |

-continued

Unit mm

| | | | | | |
|---|---|---|---|---|---|
| 14(Stop) | ∞ | −0.54 | | | 13.51 |
| 15* | 22.360 | 4.08 | 1.53366 | 55.96 | 14.05 |
| 16* | −51.095 | 0.30 | | | 14.74 |
| 17 | −91.654 | 1.50 | 1.72047 | 34.71 | 14.88 |
| 18 | 16.117 | 5.91 | 1.61800 | 63.33 | 15.89 |
| 19 | −27.784 | 0.10 | | | 16.80 |
| 20 | ∞ | 21.00 | 1.84666 | 23.78 | 17.07 |
| 21 | ∞ | 0.10 | | | 19.26 |
| 22* | 22.867 | 5.99 | 1.49700 | 81.61 | 19.72 |
| 23* | −29.539 | 0.30 | | | 19.20 |
| 24 | 39.218 | 2.45 | 1.70154 | 41.24 | 17.96 |
| 25 | 12.794 | 5.51 | | | 15.93 |
| 26* | −100.547 | 4.50 | 1.53366 | 55.96 | 16.33 |
| 27* | −15.000 | 1.73 | | | 17.70 |
| 28* | −13.523 | 1.00 | 1.53366 | 55.96 | 17.69 |
| 29* | 34.257 | 3.00 | | | 19.12 |
| 30 | ∞ | 0.30 | 1.51633 | 64.14 | 19.97 |
| 31 | ∞ | 0.70 | | | |
| Image plane | ∞ | | | | |

Aspherical surface data

7th surface k = −1.000
A4 = −3.70912e−05, A6 = 1.59394e−07
8th surface k = −0.553
A4 = −2.17940e−06
15th surface k = 0.000
A4 = 1.98953e−06
16th surface k = 6.562
A4 = 4.04195e−05
22th surface k = 0.000
A4 = 8.15542e−06
23th surface k = 0.000
A4 = 5.13863e−05
26th surface k = 0.000
A4 = −1.94239e−04
27th surface k = 0.000
A4 = −1.89042e−05
28th surface k = 0.000
A4 = 8.97798e−05
29th surface k = 0.000
A4 = −2.09862e−04, A6 = 1.99502e−07

Various data

| | |
|---|---|
| NA | 0.08 |
| β | −0.40 |
| f | 36.39 |
| IH(mm) | 10.10 |
| fb(mm) (in air) | 3.90 |
| Lens total length(mm) (in air) | 134.90 |

EXAMPLE 11

Unit mm

Surface data

| Surface no. | r | d | nd | vd | φ |
|---|---|---|---|---|---|
| 1 | 1300.000 | 7.57 | 1.74400 | 44.78 | 55.42 |
| 2 | −92.940 | 8.95 | | | 55.65 |
| 3 | 450.433 | 6.90 | 1.74400 | 44.78 | 50.78 |
| 4 | −100.000 | 29.57 | | | 50.03 |
| 5 | 30.062 | 1.50 | 1.65844 | 50.88 | 17.63 |
| 6 | 19.983 | 4.85 | | | 16.11 |
| 7* | −17.168 | 1.54 | 1.68893 | 31.08 | 14.99 |
| 8* | 29.120 | 3.97 | | | 14.93 |
| 9 | 138.714 | 4.77 | 1.49700 | 81.61 | 16.15 |
| 10 | −17.755 | 0.30 | | | 16.67 |
| 11 | 688.712 | 4.30 | 1.84666 | 23.78 | 16.15 |
| 12 | −18.404 | 1.65 | 1.72047 | 34.71 | 15.84 |
| 13 | 49.667 | 1.16 | | | 14.99 |
| 14(Stop) | ∞ | −0.88 | | | 14.91 |
| 15* | 20.588 | 4.47 | 1.53366 | 55.96 | 15.49 |
| 16* | −51.733 | 0.30 | | | 16.10 |
| 17 | −130.239 | 1.50 | 1.72047 | 34.71 | 16.25 |
| 18 | 17.267 | 6.23 | 1.61800 | 63.33 | 17.12 |
| 19 | −27.784 | 0.10 | | | 17.89 |
| 20 | ∞ | 21.00 | 1.84666 | 23.78 | 18.03 |
| 21 | ∞ | 0.10 | | | 19.05 |
| 22* | 18.930 | 6.15 | 1.49700 | 81.61 | 19.30 |
| 23* | −30.795 | 0.30 | | | 18.45 |
| 24 | 37.509 | 2.51 | 1.70154 | 41.24 | 17.00 |
| 25 | 10.194 | 4.61 | | | 14.41 |
| 26* | 65.474 | 4.47 | 1.53366 | 55.96 | 14.99 |
| 27* | −15.000 | 1.61 | | | 15.93 |
| 28* | −14.191 | 1.50 | 1.53366 | 55.96 | 15.98 |
| 29* | 26.505 | 3.00 | | | 16.71 |
| 30 | ∞ | 0.30 | 1.51633 | 64.14 | 16.62 |
| 31 | ∞ | 0.70 | | | |
| Image plane | ∞ | | | | |

Aspherical surface data

7th surface k = −1.000
A4 = −3.03636e−05, A6 = 2.24632e−07
8th surface k = −6.356
A4 = 3.47543e−05
15th surface k = 0.000
A4 = −5.56700e−06
16th surface k = 0.794
A4 = 3.35442e−05
22th surface k = 0.000
A4 = 6.04102e−06
23th surface k = 0.000
A4 = 6.35238e−05
26th surface k = 0.000
A4 = −1.76668e−04
27th surface k = 0.000
A4 = 4.88289e−05
28th surface k = 0.000
A4 = 1.83935e−04

-continued

Unit mm

29th surface k = 0.000
A4 = −2.64475e−04, A6 = −3.11887e−07

Various data

| | |
|---|---|
| NA | 0.08 |
| β | −0.33 |
| f | 40.83 |
| IH(mm) | 8.31 |
| fb(mm) (in air) | 3.90 |
| Lens total length(mm) (in air) | 134.90 |

EXAMPLE 12

Unit mm

Surface data

| Surface no. | r | d | nd | vd | φ |
|---|---|---|---|---|---|
| 1 | 1300.000 | 7.10 | 1.74400 | 44.78 | 56.05 |
| 2 | −105.419 | 0.30 | | | 56.19 |
| 3 | 140.388 | 7.39 | 1.74400 | 44.78 | 53.84 |
| 4 | −194.275 | 30.91 | | | 52.75 |
| 5 | 30.039 | 4.14 | 1.65844 | 50.88 | 20.21 |
| 6 | 28.128 | 4.56 | | | 17.05 |
| 7* | −15.258 | 1.50 | 1.68893 | 31.08 | 15.58 |
| 8* | 18.328 | 3.61 | | | 14.83 |
| 9 | 31.151 | 5.16 | 1.49700 | 81.61 | 16.13 |
| 10 | −21.226 | 1.47 | | | 16.35 |
| 11 | −145.250 | 4.18 | 1.84666 | 23.78 | 15.52 |
| 12 | −16.098 | 1.50 | 1.72047 | 34.71 | 15.27 |
| 13 | 80.466 | 0.92 | | | 14.53 |
| 14(Stop) | ∞ | −0.82 | | | 14.40 |
| 15* | 18.401 | 4.16 | 1.53366 | 55.96 | 15.04 |
| 16* | −87.438 | 0.30 | | | 15.52 |
| 17 | −154.898 | 1.50 | 1.72047 | 34.71 | 15.61 |
| 18 | 16.958 | 5.83 | 1.61800 | 63.33 | 16.42 |
| 19 | −27.784 | 0.10 | | | 17.14 |
| 20 | ∞ | 21.00 | 1.84666 | 23.78 | 17.28 |
| 21 | ∞ | 0.10 | | | 18.40 |
| 22* | 23.425 | 4.91 | 1.49700 | 81.61 | 18.64 |
| 23* | −57.533 | 0.31 | | | 17.88 |
| 24 | 17.089 | 2.69 | 1.70154 | 41.24 | 16.80 |
| 25 | 9.610 | 5.10 | | | 14.29 |
| 26* | 114.912 | 4.56 | 1.53366 | 55.96 | 14.81 |
| 27* | −15.000 | 0.61 | | | 15.51 |
| 28* | −14.365 | 1.50 | 1.53366 | 55.96 | 15.36 |
| 29* | 30.245 | 3.00 | | | 16.24 |
| 30 | ∞ | 0.30 | 1.51633 | 64.14 | 16.16 |
| 31 | ∞ | 0.70 | | | |
| Image plane | ∞ | | | | |

Aspherical surface data

7th surface k = −1.000
A4 = 6.26501e−05, A6 = −5.35850e−08

8th surface k = −2.840
A4 = 7.35168e−05

15th surface k = 0.000
A4 = −2.09235e−05

16th surface k = −86.400
A4 = 2.94789e−05

-continued

Unit mm

22th surface k = 0.000
A4 = 4.47741e−05

23th surface k = 0.000
A4 = 7.95877e−05

26th surface k = 0.000
A4 = −1.25123e−04

27th surface k = 0.000
A4 = −1.31313e−05

28th surface k = 0.000
A4 = 2.51968e−05

29th surface k = 0.000
A4 = −2.66681e−04, A6 = −4.98113e−07

Various data

| | |
|---|---|
| NA | 0.07 |
| β | −0.32 |
| f | 44.61 |
| IH(mm) | 8.07 |
| fb(mm) (in air) | 3.90 |
| Lens total length(mm) (in air) | 128.49 |

EXAMPLE 13

Unit mm

Surface data

| Surface no. | r | d | nd | vd | φ |
|---|---|---|---|---|---|
| 1 | 201.293 | 18.93 | 1.91082 | 35.25 | 101.37 |
| 2 | −279.220 | 0.50 | | | 99.44 |
| 3 | 60.002 | 20.00 | 1.91082 | 35.25 | 80.91 |
| 4 | 70.444 | 35.53 | | | 64.99 |
| 5 | 78.452 | 4.50 | 1.70154 | 41.24 | 20.61 |
| 6 | 10.629 | 10.47 | | | 14.44 |
| 7* | 46.386 | 3.00 | 1.53366 | 55.96 | 11.29 |
| 8* | −68.282 | 0.10 | | | 10.46 |
| 9 | 11.418 | 1.50 | 1.72047 | 34.71 | 9.64 |
| 10 | 8.425 | 3.57 | | | 8.48 |
| 11(Stop) | ∞ | 1.08 | | | 7.37 |
| 12* | −29.889 | 3.13 | 1.53366 | 55.96 | 8.25 |
| 13* | −13.747 | 0.40 | | | 10.24 |
| 14 | −16.912 | 1.00 | 1.72047 | 34.71 | 10.63 |
| 15 | 95.296 | 5.15 | 1.61800 | 63.33 | 12.23 |
| 16 | −11.340 | 0.10 | | | 14.29 |
| 17* | 19.476 | 5.04 | 1.49700 | 81.61 | 16.13 |
| 18* | −50.350 | 4.47 | | | 16.23 |
| 19 | 67.721 | 2.11 | 1.59551 | 39.24 | 14.42 |
| 20 | 19.044 | 3.03 | | | 13.61 |
| 21* | −51.602 | 2.82 | 1.53366 | 55.96 | 13.63 |
| 22* | −30.000 | 5.20 | | | 14.31 |
| 23* | 64.480 | 5.00 | 1.53366 | 55.96 | 14.27 |
| 24* | 42.674 | 3.07 | | | 15.55 |
| 25 | ∞ | 0.30 | 1.51633 | 64.14 | 15.92 |
| 26 | ∞ | 0.70 | | | |
| Image plane | ∞ | | | | |

-continued

| Unit mm |
|---|

| Aspherical surface data |
|---|

7th surface k = 0.000
A4 = −2.00996e−05
8th surface k = 0.000
A4 = 1.73466e−05
12th surface k = 0.000
A4 = 9.05171e−12, A6 = 2.95906e−08
13th surface k = −2.626
A4 = −1.95247e−05, A6 = 7.51228e−07
17th surface k = 0.000
A4 = −4.30248e−05, A6 = −5.77162e−08
18th surface k = 0.000
A4 = −1.04660e−04, A6 = 1.38884e−07
21th surface k = 0.000
A4 = −1.97625e−04
22th surface k = 0.000
A4 = −1.56973e−04, A6 = 6.09484e−07
23th surface k = 0.000
A4 = −2.57765e−04, A6 = −8.40124e−07
24th surface k = 0.000
A4 = −1.35545e−04, A6 = −1.83247e−06, A8 = 1.06712e−08

| Various data | |
|---|---|
| NA | 0.03 |
| β | −0.16 |
| f | 69.72 |
| IH(mm) | 8.01 |
| fb(mm) (in air) | 3.98 |
| Lens total length(mm) (in air) | 140.61 |

EXAMPLE 14

| Unit mm | | | | | |
|---|---|---|---|---|---|
| Surface data | | | | | |
| Surface no. | r | d | nd | vd | φ |
| 1 | ∞ | 15.35 | 1.91082 | 35.25 | 101.01 |
| 2 | −177.355 | 0.50 | | | 101.00 |
| 3 | 60.000 | 20.00 | 1.91082 | 35.25 | 85.65 |
| 4 | 81.611 | 47.01 | | | 72.93 |
| 5 | 42.059 | 4.50 | 1.70154 | 41.24 | 17.96 |
| 6 | 7.944 | 5.86 | | | 12.01 |
| 7* | −12.458 | 4.50 | 1.53366 | 55.96 | 11.59 |
| 8* | −11.677 | 4.41 | | | 11.68 |
| 9 | 81.074 | 4.44 | 1.72047 | 34.71 | 10.45 |
| 10 | 30.000 | 1.15 | | | 9.61 |
| 11(Stop) | ∞ | 0.97 | | | 9.55 |
| 12* | −69.825 | 2.38 | 1.53366 | 55.96 | 10.39 |
| 13* | −11.548 | 0.40 | | | 11.19 |
| 14 | −21.780 | 1.00 | 1.72047 | 34.71 | 11.72 |
| 15 | 95.296 | 4.35 | 1.61800 | 63.33 | 12.77 |
| 16 | −15.778 | 0.10 | | | 14.16 |
| 17* | 11.402 | 6.11 | 1.49700 | 81.61 | 15.41 |

-continued

| Unit mm | | | | | |
|---|---|---|---|---|---|
| 18* | −26.716 | 1.68 | | | 15.20 |
| 19 | 730.497 | 1.52 | 1.59551 | 39.24 | 12.79 |
| 20 | 10.040 | 2.20 | | | 11.31 |
| 21* | 44.121 | 3.16 | 1.53366 | 55.96 | 11.35 |
| 22* | −30.000 | 0.10 | | | 11.39 |
| 23* | 15.668 | 5.00 | 1.53366 | 55.96 | 11.26 |
| 24* | 15.355 | 3.00 | | | 9.53 |
| 25 | ∞ | 0.30 | 1.51633 | 64.14 | 9.06 |
| 26 | ∞ | 0.70 | | | |
| Image plane | ∞ | | | | |

| Aspherical surface data |
|---|

7th surface k = 0.000
A4 = 4.02938e−04
8th surface k = 0.000
A4 = 4.37562e−04
12th surface k = 0.000
A4 = 2.09449e−04, A6 = −6.92868e−06
13th surface k = 1.107
A4 = 1.51973e−04, A6 = −1.58258e−06
17th surface k = 0.000
A4 = −1.72712e−04, A6 = −1.05905e−06
18th surface k = 0.000
A4 = −1.49408e−04, A6 = 3.17757e−07
21th surface k = 0.000
A4 = −1.41009e−04
22th surface k = 0.000
A4 = 2.64220e−05, A6 = 2.10643e−06
23th surface k = 0.000
A4 = 2.35045e−05, A6 = 2.12734e−06
24th surface k = 0.000
A4 = 5.61865e−05, A6 = −1.25386e−06, A8 = 2.32822e−08

| Various data | |
|---|---|
| NA | 0.03 |
| β | −0.09 |
| f | 49.78 |
| IH(mm) | 4.44 |
| fb(mm) (in air) | 3.90 |
| Lens total length(mm) (in air) | 140.60 |

EXAMPLE 15

| Unit mm | | | | | |
|---|---|---|---|---|---|
| Surface data | | | | | |
| Surface no. | r | d | nd | vd | φ |
| 1 | 233.107 | 17.36 | 1.91082 | 35.25 | 104.43 |
| 2 | −211.459 | 29.43 | | | 103.59 |
| 3 | 77.946 | 11.83 | 1.91082 | 35.25 | 64.60 |
| 4 | 164.873 | 21.87 | | | 57.88 |

-continued

| Unit mm | | | | | |
|---|---|---|---|---|---|
| 5* | 52.979 | 4.27 | 1.53366 | 55.96 | 25.29 |
| 6 | 12.181 | 5.28 | | | 18.01 |
| 7* | −101.652 | 4.45 | 1.53366 | 55.96 | 17.50 |
| 8* | −48.773 | 2.58 | | | 16.32 |
| 9 | 18.213 | 1.50 | 1.71520 | 29.53 | 13.38 |
| 10 | 10.655 | 7.55 | | | 11.92 |
| 11(Stop) | ∞ | −0.03 | | | 10.23 |
| 12* | 44.133 | 3.17 | 1.53366 | 55.96 | 10.58 |
| 13* | −13.343 | 0.40 | | | 11.53 |
| 14 | −15.701 | 1.50 | 1.72066 | 34.42 | 11.78 |
| 15 | 95.296 | 3.31 | 1.61800 | 63.33 | 13.49 |
| 16 | −17.999 | 2.90 | | | 14.50 |
| 17* | 24.221 | 4.38 | 1.49700 | 81.61 | 17.74 |
| 18* | 259.803 | 4.14 | | | 17.71 |
| 19 | 16.111 | 3.02 | 1.59551 | 39.24 | 17.73 |
| 20 | 24.765 | 3.70 | | | 16.87 |
| 21* | −28.270 | 3.66 | 1.53366 | 55.96 | 16.54 |
| 22* | −30.000 | 5.42 | | | 16.51 |
| 23* | 27.481 | 5.00 | 1.53366 | 55.96 | 17.19 |
| 24* | 12.238 | 3.00 | | | 18.72 |
| 25 | ∞ | 0.30 | 1.51633 | 64.14 | 19.31 |
| 26 | ∞ | 1.00 | | | |
| Image plane | ∞ | | | | |

Aspherical surface data

5th surface k = 0.000
A4 = −1.31309e−05
7th surface k = 0.000
A4 = 1.48050e−06
8th surface k = 0.000
A4 = 4.25733e−06
12th surface k = 0.000
A4 = −9.21321e−07, A6 = 3.53938e−08
13th surface k = −0.493
A4 = −3.79073e−06, A6 = −3.10354e−07
17th surface k = 0.000
A4 = 4.16918e−05, A6 = −6.83531e−08
18th surface k = 0.000
A4 = 2.16273e−06, A6 = −4.89360e−08
21th surface k = 0.000
A4 = 1.14810e−05
22th surface k = 0.000
A4 = 1.28351e−04, A6 = 4.95827e−07
23th surface k = 0.000
A4 = −2.65185e−04, A6 = 4.28039e−07
24th surface k = 0.000
A4 = −3.82953e−04, A6 = 1.01724e−06, A8 = −5.17604e−09

Various data

| NA | 0.04 |
|---|---|
| β | −0.20 |
| f | 55.37 |
| IH(mm) | 9.95 |

-continued

| Unit mm | |
|---|---|
| fb(mm) (in air) | 4.21 |
| Lens total length(mm) (in air) | 150.90 |

EXAMPLE 16

| Unit mm | | | | | |
|---|---|---|---|---|---|
| Surface data | | | | | |
| Surface no. | r | d | nd | νd | φ |
| 1 | 200.000 | 4.44 | 1.78069 | 28.19 | 16.52 |
| 2* | −16.891 | 2.71 | | | 16.78 |
| 3* | −16.322 | 3.30 | 1.64216 | 38.89 | 14.93 |
| 4* | 22.199 | 2.69 | | | 15.35 |
| 5* | 24.152 | 4.50 | 1.49700 | 81.61 | 17.00 |
| 6 | −21.050 | 0.10 | | | 17.33 |
| 7 | 19.474 | 4.83 | 1.49700 | 81.61 | 17.00 |
| 8* | −21.043 | 0.10 | | | 16.52 |
| 9 | 8.264 | 3.16 | 1.61770 | 60.46 | 11.80 |
| 10 | 31.355 | 0.70 | 1.72047 | 34.71 | 10.21 |
| 11 | 5.948 | 1.85 | | | 7.87 |
| 12(Stop) | ∞ | 0.70 | | | 7.50 |
| 13 | −18.538 | 0.70 | 1.72047 | 34.71 | 7.59 |
| 14 | 8.011 | 1.71 | 1.61800 | 63.33 | 8.37 |
| 15 | 19.989 | 0.79 | | | 8.85 |
| 16* | 14.320 | 3.99 | 1.49700 | 81.61 | 10.43 |
| 17* | −16.644 | 0.10 | | | 11.26 |
| 18* | 15.000 | 2.47 | 1.49700 | 81.61 | 11.87 |
| 19* | 19.201 | 3.20 | | | 11.60 |
| 20* | 12.099 | 3.93 | 1.63490 | 23.88 | 12.08 |
| 21* | −38.092 | 1.78 | | | 11.40 |
| 22* | −19.577 | 0.70 | 1.53368 | 55.90 | 10.07 |
| 23* | 105.748 | 1.78 | | | 9.62 |
| 24* | −11.682 | 1.00 | 1.53368 | 55.90 | 9.31 |
| 25* | 32.477 | 1.04 | | | 9.40 |
| 26 | ∞ | 0.38 | 1.51640 | 65.06 | 9.56 |
| 27 | ∞ | 1.00 | | | |
| Image plane | ∞ | | | | |

Aspherical surface data

2nd surface k = −1.232
3rd surface k = 0.000
A4 = 3.85355e−06
4th surface k = 0.000
A4 = −5.02295e−06
5th surface k = −3.224
A4 = −2.82481e−05
8th surface k = −1.801
A4 = 7.66872e−07
16th surface k = −0.579
A4 = 1.13991e−06
17th surface k = 0.000
A4 = 2.37246e−06
18th surface k = 0.000
A4 = 1.24827e−05

| Unit mm |
|---|

19th surface k = 0.000
A4 = −8.25200e−06

20th surface k = −2.866
A4 = 1.79188e−04

21th surface k = 0.000
A4 = 5.51534e−06

22th surface k = 0.000
A4 = 3.73931e−06

23th surface k = 0.000
A4 = −1.36482e−06

24th surface k = 0.000
A4 = 5.28357e−06

25th surface k = 0.000
A4 = −3.99482e−06

| Various data | |
|---|---|
| NA | 0.21 |
| β | −0.85 |
| f | 11.70 |
| IH(mm) | 4.92 |
| fb(mm) (in air) | 2.30 |
| Lens total length(mm) (in air) | 53.53 |

EXAMPLE 17

| Unit mm | | | | | |
|---|---|---|---|---|---|
| Surface data | | | | | |
| Surface no. | r | d | nd | νd | φ |
| 1 | 70.496 | 5.00 | 1.75520 | 27.51 | 18.67 |
| 2 | −48.147 | 0.11 | | | 18.67 |
| 3 | −411.922 | 2.98 | 1.75520 | 27.51 | 18.39 |
| 4 | −53.420 | 9.20 | | | 18.04 |
| 5 | −15.584 | 6.21 | 1.63980 | 34.46 | 13.27 |
| 6 | 88.788 | 0.29 | | | 13.76 |
| 7 | 17.754 | 3.67 | 1.49700 | 81.61 | 14.05 |
| 8* | −20.595 | 0.57 | | | 13.88 |
| 9 | 15.281 | 2.40 | 1.71700 | 47.92 | 12.18 |
| 10 | −922.547 | 0.70 | 1.69895 | 30.13 | 11.41 |
| 11 | 41.748 | 0.77 | | | 10.66 |
| 12(Stop) | ∞ | 0.68 | | | 10.21 |
| 13 | −49.176 | 0.70 | 1.68893 | 31.07 | 10.18 |
| 14* | 10.388 | 0.12 | | | 10.31 |
| 15* | 10.130 | 3.32 | 1.49700 | 81.54 | 10.64 |
| 16* | −23.138 | 0.10 | | | 10.90 |
| 17 | ∞ | 14.46 | 1.84666 | 23.78 | 11.00 |
| 18 | ∞ | 0.11 | | | 12.06 |
| 19* | 14.073 | 3.02 | 1.76182 | 26.52 | 12.25 |
| 20* | −25.604 | 0.82 | | | 11.99 |
| 21* | −301.832 | 0.76 | 1.53368 | 55.90 | 10.52 |
| 22* | 10.732 | 4.00 | | | 9.30 |
| 23* | −6.048 | 0.70 | 1.53368 | 55.90 | 8.59 |
| 24* | 280.562 | 1.00 | | | 9.13 |
| 25 | ∞ | 0.30 | 1.51640 | 65.06 | 9.49 |
| 26 | ∞ | 1.00 | | | |
| Image plane | ∞ | | | | |

| Unit mm |
|---|

Aspherical surface data

8th surface k = −2.427
A4 = 6.55778e−06

14th surface k = 0.000
A4 = 7.74428e−05

15th surface k = −0.579
A4 = 1.14210e−04

16th surface k = 0.000
A4 = 8.06412e−05

19th surface k = 0.000
A4 = −2.70276e−06, A6 = −2.05877e−06

20th surface k = 0.000
A4 = 2.62769e−06, A6 = 3.82714e−07

21th surface k = 0.000
A4 = −2.37650e−07, A6 = 7.47463e−06, A8 = 1.06625e−07

22th surface k = 0.000
A4 = 2.84086e−07, A6 = −6.58956e−06, A8 = 2.26599e−07

23th surface k = 0.000
A4 = −1.11575e−03, A6 = 4.22639e−05, A8 = 6.32025e−07

24th surface k = 0.000
A4 = −1.75257e−03, A6 = 4.53363e−05, A8 = 4.97358e−08

| Various data | |
|---|---|
| NA | 0.18 |
| β | −0.70 |
| f | 11.77 |
| IH(mm) | 4.92 |
| fb(mm) (in air) | 2.20 |
| Lens total length(mm) (in air) | 62.90 |

EXAMPLE 18

| Unit mm | | | | | |
|---|---|---|---|---|---|
| Surface data | | | | | |
| Surface no. | r | d | nd | νd | φ |
| 1 | 30.415 | 3.82 | 1.75520 | 27.51 | 20.58 |
| 2 | 2027.159 | 7.82 | | | 20.18 |
| 3 | 77.031 | 4.29 | 1.75520 | 27.51 | 17.39 |
| 4 | −284.348 | 2.68 | | | 16.33 |
| 5 | −20.023 | 1.45 | 1.63980 | 34.46 | 15.64 |
| 6 | 56.991 | 0.10 | | | 15.71 |
| 7 | 17.913 | 4.70 | 1.49700 | 81.61 | 16.01 |
| 8* | −21.946 | 1.70 | | | 15.73 |
| 9 | 14.738 | 2.69 | 1.71700 | 47.92 | 12.77 |
| 10 | −281.995 | 0.73 | 1.69895 | 30.13 | 11.85 |
| 11 | 36.280 | 0.82 | | | 10.90 |
| 12(Stop) | ∞ | 0.80 | | | 10.40 |
| 13 | −34.654 | 0.70 | 1.68893 | 31.07 | 10.34 |
| 14* | 10.551 | 0.10 | | | 10.44 |
| 15* | 9.913 | 4.39 | 1.49700 | 81.54 | 10.75 |
| 16* | −23.929 | 0.10 | | | 11.15 |
| 17 | ∞ | 15.00 | 1.84666 | 23.78 | 11.21 |

-continued

Unit mm

| | | | | | |
|---|---|---|---|---|---|
| 18 | ∞ | 0.13 | | | 11.82 |
| 19* | 13.672 | 3.04 | 1.76182 | 26.52 | 11.93 |
| 20* | −24.009 | 0.44 | | | 11.57 |
| 21* | −49.111 | 0.76 | 1.53368 | 55.90 | 10.56 |
| 22* | 10.855 | 3.72 | | | 9.25 |
| 23* | −7.526 | 0.71 | 1.53368 | 55.90 | 8.70 |
| 24* | 53.957 | 1.01 | | | 9.17 |
| 25 | ∞ | 0.30 | 1.51640 | 65.06 | 9.50 |
| 26 | ∞ | 1.00 | | | |
| Image plane | ∞ | | | | |

Aspherical surface data

8th surface k = −3.192
A4 = 7.13920e−07
14th surface k = 0.000
A4 = 3.25419e−05
15th surface k = −0.579
A4 = 5.93467e−05
16th surfae k = 0.000
A4 = 6.72038e−05
19th surface k = 0.000
A4 = 1.76259e−08, A6 = −4.17456e−07
20th surface k = 0.000
A4 = 1.01402e−08, A6 = 1.04686e−06
21th surface k = 0.000
A4 = 8.27455e−08, A6 = 3.38041e−06, A8 = 8.33125e−09
22th surface k = 0.000
A4 = 1.41816e−08, A6 = −1.86899e−06, A8 = 1.06510e−07
23th surface k = 0.000
A4 = −2.06017e−03, A6 = 1.13032e−04, A8 = −1.71376e−06
24th surface k = 0.000
A4 = −2.17095e−03, A6 = 8.98014e−05, A8 = −1.15360e−06

Various data

| | |
|---|---|
| NA | 0.18 |
| β | −0.70 |
| f | 12.64 |
| IH (mm) | 4.92 |
| fb(mm) (in air) | 2.22 |
| Lens total length(mm) (in air) | 62.90 |

EXAMPLE 19

Unit mm

Surface data

| Surface no. | r | d | nd | vd | φ |
|---|---|---|---|---|---|
| 1 | 26.174 | 2.53 | 1.75520 | 27.51 | 19.24 |
| 2 | 181.093 | 4.69 | | | 19.03 |
| 3 | 80.000 | 2.74 | 1.75520 | 27.51 | 17.55 |
| 4 | −222.051 | 5.36 | | | 16.99 |
| 5 | −19.728 | 1.01 | 1.63980 | 34.46 | 14.76 |

-continued

Unit mm

| | | | | | |
|---|---|---|---|---|---|
| 6 | 55.506 | 0.10 | | | 14.80 |
| 7 | 18.713 | 4.22 | 1.49700 | 81.61 | 15.03 |
| 8* | −20.481 | 1.82 | | | 14.81 |
| 9 | 14.895 | 2.67 | 1.71700 | 47.92 | 12.08 |
| 10 | −170.914 | 0.71 | 1.69895 | 30.13 | 11.12 |
| 11 | 37.736 | 0.80 | | | 10.27 |
| 12(Stop) | ∞ | 0.78 | | | 9.77 |
| 13 | −32.704 | 0.70 | 1.68893 | 31.07 | 9.71 |
| 14* | 10.611 | 0.10 | | | 9.81 |
| 15* | 9.944 | 7.91 | 1.49700 | 81.54 | 10.08 |
| 16* | −23.726 | 0.30 | | | 11.11 |
| 17 | ∞ | 15.00 | 1.84666 | 23.78 | 11.16 |
| 18 | ∞ | 0.34 | | | 11.69 |
| 19* | 14.537 | 3.07 | 1.76182 | 26.52 | 11.79 |
| 20* | −22.336 | 0.43 | | | 11.41 |
| 21* | −39.900 | 0.76 | 1.53368 | 55.90 | 10.52 |
| 22* | 10.795 | 3.75 | | | 9.26 |
| 23* | −8.659 | 0.86 | 1.53368 | 55.90 | 8.73 |
| 24* | 34.534 | 1.04 | | | 9.15 |
| 25 | ∞ | 0.30 | 1.51640 | 65.06 | 9.46 |
| 26 | ∞ | 1.00 | | | |
| Image plane | ∞ | | | | |

Aspherical surface data

8th surface k = −2.501
A4 = 3.96328e−07
14th surface k = 0.000
A4 = 7.37862e−05
15th surface k = −0.579
A4 = 9.90599e−05
16th surface k = 0.000
A4 = 6.45169e−05
19th surface k = 0.000
A4 = −1.65312e−07, A6 = −3.31238e−08
20th surface k = 0.000
A4 = 6.33148e−08, A6 = 1.47372e−06
21th surface k = 0.000
A4 = 2.52692e−08, A6 = 1.69426e−06, A8 = 2.53564e−08
22th surface k = 0.000
A4 = 9.53833e−09, A6 = −7.46227e−07, A8 = 1.01372e−07
23th surface k = 0.000
A4 = −1.69115e−03, A6 = 9.17126e−05, A8 = −1.39048e−06
24th surface k = 0.000
A4 = −1.71866e−03, A6 = 6.91391e−05, A8 = −8.66396e−07

Various data

| | |
|---|---|
| NA | 0.18 |
| β | −0.80 |
| f | 12.21 |
| IH(mm) | 4.92 |
| fb(mm) (in air) | 2.24 |
| Lens total length(mm) (in air) | 62.90 |

EXAMPLE 20

Unit mm

Surface data

| Surface no. | r | d | nd | νd | φ |
|---|---|---|---|---|---|
| 1 | −54.261 | 3.17 | 1.59522 | 67.74 | 19.61 |
| 2 | −18.186 | 1.00 | | | 19.99 |
| 3 | 18.851 | 4.02 | 1.75520 | 27.51 | 18.66 |
| 4 | −91.514 | 2.75 | | | 18.00 |
| 5 | −25.396 | 0.70 | 1.67270 | 32.10 | 15.04 |
| 6 | 10.785 | 4.88 | | | 13.39 |
| 7* | 53.315 | 3.04 | 1.69100 | 54.82 | 14.62 |
| 8 | −54.764 | 0.10 | | | 14.91 |
| 9 | 22.477 | 4.41 | 1.49700 | 81.61 | 15.00 |
| 10* | −16.111 | 0.10 | | | 14.78 |
| 11 | 10.609 | 2.67 | 1.65412 | 39.68 | 11.29 |
| 12 | −439.195 | 0.70 | 1.72047 | 34.71 | 10.24 |
| 13 | 7.839 | 1.47 | | | 8.33 |
| 14(Stop) | ∞ | 1.02 | | | 8.11 |
| 15 | −11.743 | 0.70 | 1.72047 | 34.71 | 10.00 |
| 16 | 8.055 | 4.41 | 1.61800 | 63.33 | 9.00 |
| 17 | −15.206 | 0.30 | | | 10.64 |
| 18* | −38.253 | 4.50 | 1.49700 | 81.61 | 11.24 |
| 19* | −13.427 | 2.98 | | | 13.61 |
| 20* | −48.786 | 4.50 | 1.49700 | 81.61 | 15.95 |
| 21* | −11.803 | 1.24 | | | 16.85 |
| 22* | 27.742 | 4.50 | 1.75520 | 27.51 | 16.11 |
| 23* | −66.985 | 0.10 | | | 15.08 |
| 24* | 25.387 | 2.92 | 1.53368 | 55.90 | 13.73 |
| 25* | 9.988 | 4.49 | | | 10.90 |
| 26* | −11.541 | 0.70 | 1.53368 | 55.90 | 9.97 |
| 27* | 31.354 | 0.93 | | | 9.92 |
| 28 | ∞ | 0.40 | 1.51640 | 65.06 | 9.89 |
| 29 | ∞ | 1.00 | | | |
| Image plane | ∞ | | | | |

Aspherical surface data

7th surface k = 0.000
A4 = −1.43540e−05

10th surface k = −0.973
A4 = −4.39795e−05

18th surface k = −0.579
A4 = −1.20369e−04

19th surface k = 0.000
A4 = 9.76785e−05

20th surface k = 0.000
A4 = −3.96436e−07

21th surface k = 0.000
A4 = 3.32030e−05

22th surface k = −4.000
A4 = 3.54179e−05

23th surface k = 0.000
A4 = 2.28057e−05

24th surface k = 0.000
A4 = 1.39991e−04

25th surface k = 0.000
A4 = 1.19101e−04

26th surface k = 0.000
A4 = 9.75033e−05

27th surface k = 0.000
A4 = −3.51511e−04

Various data

| | |
|---|---|
| NA | 0.20 |
| β | −0.70 |
| f | 17.14 |
| IH(mm) | 4.92 |
| fb(mm) (in air) | 2.20 |
| Lens total length(mm) (in air) | 63.55 |

EXAMPLE 21

Unit mm

Surface data

| Surface no. | r | d | nd | νd | φ |
|---|---|---|---|---|---|
| 1 | 30.335 | 1.00 | 1.72503 | 46.41 | 15.77 |
| 2 | 14.070 | 3.48 | 1.67117 | 39.75 | 15.50 |
| 3 | 99.957 | 2.44 | | | 15.39 |
| 4 | 40.804 | 3.54 | 1.49700 | 81.61 | 15.31 |
| 5* | −18.956 | 9.61 | | | 15.10 |
| 6 | 11.976 | 3.07 | 1.61800 | 63.33 | 8.12 |
| 7 | −12.669 | 0.70 | 1.71736 | 29.52 | 6.91 |
| 8 | 15.989 | 0.77 | | | 6.08 |
| 9(Stop) | ∞ | 3.12 | | | 5.75 |
| 10 | −13.213 | 2.00 | 1.61743 | 36.63 | 7.33 |
| 11 | 20.439 | 3.50 | 1.65472 | 41.91 | 9.14 |
| 12 | −20.352 | 0.91 | | | 10.45 |
| 13* | 15.684 | 4.50 | 1.49700 | 81.61 | 12.04 |
| 14* | −19.173 | 0.50 | | | 12.37 |
| 15 | 18.461 | 4.48 | 1.86400 | 40.58 | 12.19 |
| 16 | −35.815 | 0.86 | | | 11.11 |
| 17 | −47.078 | 0.72 | 1.55923 | 64.00 | 9.98 |
| 18 | 16.643 | 2.37 | | | 9.08 |
| 19* | −8.191 | 0.70 | 1.53368 | 55.90 | 8.71 |
| 20* | 14.018 | 3.00 | | | 8.67 |
| 21 | ∞ | 0.30 | 1.51640 | 65.06 | 9.43 |
| 22 | ∞ | 1.00 | | | |
| Image plane | ∞ | | | | |

Aspherical surface data

5th surface k = 0.000
A4 = 6.00125e−05

13th surface k = −0.579
A4 = −5.74141e−05

14th surface k = 0.000
A4 = 7.19502e−05

19th surface k = 0.000
A4 = 5.80084e−04

| Unit mm | |
|---|---|
| 20th surface | |
| k = 0.000 | |
| A4 = 1.02743e−05, A6 = −9.27668e−07 | |

| Various data | |
|---|---|
| NA | 0.15 |
| β | −0.80 |
| f | 13.26 |
| IH(mm) | 4.92 |
| fb(mm) (in air) | 4.21 |
| Lens total length(mm) (in air) | 52.48 |

EXAMPLE 22

| Unit mm | | | | | |
|---|---|---|---|---|---|
| Surface data | | | | | |
| Surface no. | r | d | nd | vd | φ |
| 1 | 52.075 | 4.41 | 1.80860 | 40.42 | 17.25 |
| 2 | −41.203 | 0.74 | | | 17.24 |
| 3 | 93.850 | 2.85 | 1.49700 | 81.61 | 16.50 |
| 4* | −27.831 | 5.97 | | | 16.06 |
| 5 | 11.037 | 3.94 | 1.61800 | 63.33 | 10.06 |
| 6 | −17.959 | 1.01 | 1.71736 | 29.52 | 8.16 |
| 7 | 9.255 | 1.71 | | | 6.60 |
| 8(Stop) | ∞ | 1.13 | | | 5.81 |
| 9 | −7.786 | 1.50 | 1.62588 | 35.70 | 6.24 |
| 10 | 14.384 | 3.50 | 1.67790 | 55.34 | 8.76 |
| 11 | −14.292 | 0.10 | | | 10.29 |
| 12* | 11.464 | 4.37 | 1.49700 | 81.61 | 12.78 |
| 13* | −15.725 | 2.08 | | | 12.88 |
| 14 | 20.070 | 4.27 | 1.76182 | 26.52 | 12.10 |
| 15 | −66.782 | 0.88 | | | 10.93 |
| 16 | −32.952 | 1.53 | 1.53368 | 55.90 | 10.33 |
| 17* | −30.112 | 1.68 | | | 9.72 |
| 18* | −7.257 | 0.70 | 1.53368 | 55.90 | 9.12 |
| 19* | 15.178 | 3.00 | | | 9.02 |
| 20 | ∞ | 0.30 | 1.51640 | 65.06 | 9.56 |
| 21 | ∞ | 1.00 | | | |
| Image plane | ∞ | | | | |

| Unit mm | |
|---|---|
| Aspherical surface data | |
| 4th surface | |
| k = 0.000 | |
| A4 = 4.08312e−05, A6 = −1.88966e−08 | |
| 12th surface | |
| k = −0.579 | |
| A4 = −2.47611e−05, A6 = 2.78355e−07 | |
| 13th surface | |
| k = 0.000 | |
| A4 = 1.52112e−04, A6 = −1.20062e−07 | |
| 17th surface | |
| k = 0.000 | |
| A4 = −1.03934e−04, A6 = 2.50226e−06 | |
| 18th surface | |
| k = 0.000 | |
| A4 = 3.08242e−04, A6 = 7.28592e−06 | |
| 19th surface | |
| k = 0.000 | |
| A4 = −2.23467e−04, A6 = 2.73800e−06 | |

| Various data | |
|---|---|
| NA | 0.18 |
| β | −0.81 |
| f | 13.10 |
| IH(mm) | 4.92 |
| fb(mm) (in air) | 4.21 |
| Lens total length(mm) (in air) | 46.58 |

Values of conditional expressions (1) to (15) in each example are enumerated below. '-' (hyphen) indicates that there is no corresponding arrangement or the conditional expression is not satisfied. Moreover, in regard to the conditional expressions (10) and (13), lenses which satisfy the conditional expression are indicated. Further, since value of the conditional expression (1) exceeds 3250 in each example, value is not indicated.

Here, "L1-L2" of the conditional expression (10) indicates that lens L1 and Lens L2 satisfy the conditional expression (10). Moreover, "L3-L6" of the conditional expression (13) indicates that lens L3 to Lens L6 satisfy the conditional expression (13).

| | Conditional expression |
|---|---|
| (1) | $2Y/p$ |
| (2) | $\beta$ |
| (3) | $CRA_{obj}$ |
| (4) | $L_L/\sqrt{Y \times Y_{obj}}$ |
| (5) | $L_{TL}/D_{oi}$ |
| (6) | $D_{G1G2}/\varphi_s$ |
| (7) | $D_{max}/L_L$ |
| (8) | $D_{G2max}/Y$ |
| (9) | $f/f_{G2}$ |
| (10) | $\varphi_{G1o} \times |\beta|/Y$ |
| (11) | $\beta_{G1o}$ |
| (12) | $f_{G1o}/f$ |
| (13) | $\varphi_{G1i} \times |\beta|/Y$ |
| (14) | $(WD \times \tan(\sin^{-1}NA) - \varphi_s/2)/L_{G1s}$ |
| (15), (15-1) | $\varphi_s/(2 \times WD \times \tan(\sin^{-1}NA))$ |
| (16), (16-1) | $(Y_{obj} - WD \times \tan CRA_{obj})/L_{G1s}$ |
| (17) | $f_{G1pn}/f_{G1}$ |
| (18) | $D_{os}/D_{oi}$ |
| (19) | $BF/L_L$ |
| (20) | $D_{os}/L_{G1}$ |
| (21) | $1/vd_{min} - 1/vd_{max}$ |

-continued

| | | |
|---|---|---|
| (22) | | $CRA_{img}/CRA_{obj}$ |
| (23) | | $L_{G1}/L_{G2}$ |
| (24) | | $D_{sBS}/D_{BSi}$ |

| | Example1 | Example2 | Example3 | Example4 | Example5 |
|---|---|---|---|---|---|
| (1) | | | | | |
| (2) | −0.43 | −0.43 | −0.43 | −0.35 | −0.40 |
| (3) | 5.1 | 5.1 | 5.1 | 5.0 | 5.1 |
| (4) | 5.34 | 5.33 | 5.33 | 5.88 | 5.52 |
| (5) | 0.75 | 0.75 | 0.75 | 0.75 | 0.75 |
| (6) | 0.017 | 0.013 | 0.026 | 0.155 | 0.069 |
| (7) | 0.23 | 0.23 | 0.29 | 0.34 | 0.32 |
| (8) | 0.53 | 0.53 | 0.56 | 0.66 | 0.56 |
| (9) | 2.05 | 2.04 | 1.91 | 1.90 | 1.83 |
| (10) | L1-L2 | L1-L2 | L1-L2 | L1-L2 | L1-L2 |
| (11) | 3.22 | 3.30 | 2.80 | 2.54 | 2.71 |
| (12) | 2.23 | 2.28 | 2.66 | 2.73 | 2.68 |
| (13) | L3-L6 | L3-L6 | L3-L6 | L3-L6 | L3-L6 |
| (14) | −0.05 | −0.05 | −0.05 | −0.05 | −0.05 |
| (15) | 1.97 | 1.99 | 2.07 | 2.36 | 2.22 |
| (15-1) | 2.07 | 2.09 | 2.18 | 2.34 | 2.23 |
| (16) | 0.40 | 0.40 | 0.39 | 0.39 | 0.39 |
| (16-1) | 0.40 | 0.40 | 0.39 | 0.39 | 0.39 |
| (17) | −0.11 | −0.10 | −0.12 | −0.11 | −0.15 |
| (18) | 0.72 | 0.72 | 0.73 | 0.73 | 0.73 |
| (19) | 0.02 | 0.02 | 0.02 | 0.02 | 0.02 |
| (20) | 1.56 | 1.55 | 1.55 | 1.55 | 1.55 |
| (21) | 0.030 | 0.030 | 0.030 | 0.030 | 0.030 |
| (22) | 4.71 | 4.71 | 4.74 | 4.68 | 4.44 |
| (23) | 1.66 | 1.74 | 1.86 | 1.89 | 1.86 |
| (24) | — | — | — | — | — |

| | Example6 | Example7 | Example8 | Example9 | Example10 |
|---|---|---|---|---|---|
| (1) | | | | | |
| (2) | −0.40 | −0.40 | −0.33 | −0.40 | −0.40 |
| (3) | 5.1 | 5.1 | 2.6 | 2.6 | 2.1 |
| (4) | 5.49 | 5.51 | 5.75 | 5.33 | 8.20 |
| (5) | 0.72 | 0.70 | 0.85 | 0.80 | 0.86 |
| (6) | 0.164 | 0.116 | 0.017 | 0.029 | 0.040 |
| (7) | 0.32 | 0.30 | 0.26 | 0.23 | 0.16 |
| (8) | 0.57 | 0.58 | 0.52 | 0.51 | 2.10 |
| (9) | 2.00 | 2.04 | 2.33 | 1.96 | 2.16 |
| (10) | L1-L2 | L1-L2 | L1-L2 | L1-L2 | L1-L2 |
| (11) | 3.11 | 3.63 | 1.81 | 2.28 | 4.08 |
| (12) | 2.66 | 2.63 | 1.72 | 1.44 | 1.40 |
| (13) | L3-L6 | L3-L6 | L3-L6 | L3-L6 | L3-L7 |
| (14) | −0.03 | −0.03 | −0.06 | −0.06 | −0.06 |
| (15) | 1.99 | 1.86 | 4.31 | 2.92 | 3.83 |
| (15-1) | 1.91 | 1.80 | 4.57 | 2.95 | 3.83 |
| (16) | 0.38 | 0.37 | 0.42 | 0.42 | 0.32 |
| (16-1) | 0.38 | 0.37 | 0.42 | 0.42 | 0.32 |
| (17) | −0.12 | −0.12 | −0.40 | −0.65 | −0.20 |
| (18) | 0.74 | 0.76 | 0.74 | 0.71 | 0.63 |
| (19) | 0.03 | 0.03 | 0.02 | 0.05 | 0.03 |
| (20) | 1.62 | 1.66 | 1.26 | 1.40 | 1.30 |
| (21) | 0.030 | 0.030 | 0.030 | 0.030 | 0.030 |
| (22) | 4.46 | 4.51 | 9.59 | 9.47 | 8.47 |
| (23) | 1.96 | 2.05 | 2.38 | 2.02 | 1.39 |
| (24) | — | — | — | — | 0.44 |

| | Example11 | Example12 | Example13 | Example14 | Example15 |
|---|---|---|---|---|---|
| (1) | | | | | |
| (2) | −0.33 | −0.32 | −0.16 | −0.09 | −0.20 |
| (3) | 1.9 | 2.0 | 2.1 | 2.1 | 2.1 |
| (4) | 9.04 | 8.73 | 6.79 | 9.13 | 6.55 |
| (5) | 0.82 | 0.72 | 0.82 | 0.82 | 0.83 |
| (6) | 0.018 | 0.007 | 0.630 | 0.222 | 0.733 |
| (7) | 0.23 | 0.25 | 0.26 | 0.34 | 0.20 |
| (8) | 2.55 | 2.63 | 0.65 | 0.50 | 0.54 |
| (9) | 2.66 | 2.73 | 4.83 | 4.40 | 4.28 |
| (10) | L1-L2 | L1-L2 | L1-L2 | L1-L2 | L1-L2 |
| (11) | 3.15 | 11.51 | 1.50 | 4.62 | 1.39 |
| (12) | 1.47 | 1.35 | 1.11 | 1.74 | 1.37 |
| (13) | L3-L7 | L3-L7 | L3-L5 | L3-L5 | L3-L5 |
| (14) | −0.07 | −0.05 | −0.03 | −0.04 | −0.04 |
| (15) | 3.10 | 2.05 | 4.09 | 5.30 | 4.26 |

-continued

| | | | | | |
|---|---|---|---|---|---|
| (15-1) | 3.27 | 1.96 | 4.30 | — | — |
| (16) | 0.31 | 0.32 | 0.50 | 0.46 | 0.47 |
| (16-1) | 0.31 | 0.32 | 0.50 | — | — |
| (17) | −0.07 | −0.11 | −0.02 | 0.03 | 0.02 |
| (18) | 0.65 | 0.69 | 0.75 | 0.81 | 0.75 |
| (19) | 0.03 | 0.03 | 0.03 | 0.03 | 0.03 |
| (20) | 1.41 | 1.71 | 1.36 | 1.29 | 1.38 |
| (21) | 0.030 | 0.030 | 0.017 | 0.017 | 0.022 |
| (22) | 6.64 | 6.09 | 5.43 | 4.67 | 10.70 |
| (23) | 1.38 | 1.36 | 2.52 | 3.81 | 2.43 |
| (24) | 0.46 | 0.47 | — | — | — |

| | Example16 | Example17 | Example18 | Example19 | Example20 |
|---|---|---|---|---|---|
| (1) | | | | | |
| (2) | −0.85 | −0.70 | −0.70 | −0.80 | −0.70 |
| (3) | 4.1 | 4.1 | 3.9 | 3.8 | 2.2 |
| (4) | 9.61 | 10.33 | 10.33 | 11.07 | 10.44 |
| (5) | 0.75 | 0.74 | 0.68 | 0.68 | 0.79 |
| (6) | 0.339 | 0.141 | 0.155 | 0.161 | 0.306 |
| (7) | 0.06 | 0.24 | 0.25 | 0.26 | 0.08 |
| (8) | 0.65 | 2.98 | 3.10 | 3.18 | 0.91 |
| (9) | 0.08 | −0.40 | −0.59 | −0.61 | 0.84 |
| (10) | — | — | — | — | — |
| (11) | — | — | — | — | — |
| (12) | — | — | — | — | — |
| (13) | — | — | — | — | — |
| (14) | 0.00 | −0.04 | 0.01 | 0.02 | −0.02 |
| (15) | 0.96 | 1.27 | 0.94 | 0.89 | 1.15 |
| (15-1) | 0.97 | 1.28 | 0.95 | 0.89 | 1.15 |
| (16) | 0.16 | 0.17 | 0.16 | 0.15 | 0.22 |
| (16-1) | 0.16 | 0.17 | 0.16 | 0.15 | 0.22 |
| (17) | — | — | — | — | — |
| (18) | 0.65 | 0.63 | 0.65 | 0.61 | 0.57 |
| (19) | 0.05 | 0.04 | 0.04 | 0.04 | 0.04 |
| (20) | 1.75 | 1.73 | 2.03 | 2.19 | 1.68 |
| (21) | 0.030 | 0.025 | 0.025 | 0.025 | 0.024 |
| (22) | 5.42 | 5.66 | 5.79 | 5.75 | 6.67 |
| (23) | 1.20 | 1.11 | 1.03 | 0.78 | 0.88 |
| (24) | — | 0.42 | 0.55 | 0.85 | — |

| | Example21 | Example22 |
|---|---|---|
| (1) | | |
| (2) | −0.80 | −0.81 |
| (3) | 3.0 | 2.6 |
| (4) | 8.80 | 7.74 |
| (5) | 0.75 | 0.72 |
| (6) | 0.675 | 0.488 |
| (7) | 0.20 | 0.14 |
| (8) | 0.48 | 0.42 |
| (9) | 0.73 | 1.09 |
| (10) | — | — |
| (11) | — | — |
| (12) | — | — |
| (13) | — | — |
| (14) | −0.01 | 0.02 |
| (15) | 1.09 | 0.89 |
| (15-1) | 1.09 | 0.89 |
| (16) | 0.21 | 0.26 |
| (16-1) | 0.21 | 0.26 |
| (17) | — | — |
| (18) | 0.60 | 0.60 |
| (19) | 0.09 | 0.10 |
| (20) | 1.76 | 2.04 |
| (21) | 0.022 | 0.025 |
| (22) | 6.92 | 8.08 |
| (23) | 1.16 | 0.92 |
| (24) | — | — |

Moreover, values of variables are enumerated below. Here, $f_{L1}$ denotes a focal length of a first lens L1, $f_{LR1}$ denotes a focal length of a lens before the rearmost lens, and $f_{LR}$ denotes a focal length of the rearmost lens.

|  | Example1 | Example2 | Example3 | Example4 |
| --- | --- | --- | --- | --- |
| $D_{oi}$ | 240.0 | 240.0 | 240.0 | 240.0 |
| $Y_{obj}$ | 50.5 | 50.5 | 50.5 | 50.5 |
| $Y$ | 21.7 | 21.7 | 21.6 | 17.9 |
| $L_{TL}$ | 180.0 | 180.0 | 180.0 | 180.0 |
| $L_L$ | 176.5 | 176.4 | 176.0 | 176.5 |
| WD | 60.0 | 60.0 | 60.0 | 60.0 |
| BF | 3.5 | 3.7 | 4.0 | 3.5 |
| NA | 0.09 | 0.09 | 0.09 | 0.07 |
| $\beta$ | −0.43 | −0.43 | −0.43 | −0.35 |
| $f$ | 44.8 | 44.3 | 43.2 | 44.9 |
| $\varphi_s$ | 21.4 | 21.6 | 22.5 | 19.9 |
| $D_{os}$ | 171.6 | 173.6 | 176.3 | 176.0 |
| $D_{G1G2}$ | 0.4 | 0.3 | 0.6 | 3.1 |
| $L_{G1}$ | 110.0 | 111.9 | 114.1 | 113.3 |
| $L_{G2}$ | 66.2 | 64.1 | 61.3 | 60.1 |
| $CRA_{obj}$ | 5.1 | 5.1 | 5.1 | 5.0 |
| $CRA_{img}$ | 24.0 | 24.0 | 24.0 | 23.4 |
| $D_{max}$ | 41.1 | 39.7 | 50.7 | 60.7 |
| $D_{G2max}$ | 11.5 | 11.6 | 12.0 | 11.7 |
| $vd_{max}$ | 81.6 | 81.6 | 81.6 | 81.6 |
| $vd_{min}$ | 23.8 | 23.8 | 23.8 | 23.8 |
| $f_{G1}$ | 503.5 | 566.5 | 581.5 | 685.7 |
| $f_{G2}$ | 21.9 | 21.7 | 22.6 | 23.6 |
| $f_{L1}$ | 160.5 | 162.4 | 205.7 | 232.5 |
| $f_{LR1}$ | 167.0 | 173.5 | 161.4 | 134.5 |
| $f_{LR}$ | −39.6 | −39.5 | −37.5 | −37.9 |

|  | Example5 | Example6 | Example7 | Example8 |
| --- | --- | --- | --- | --- |
| $D_{oi}$ | 240.0 | 249.6 | 256.0 | 200.7 |
| $Y_{obj}$ | 50.5 | 50.5 | 50.5 | 50.5 |
| $Y$ | 20.1 | 20.2 | 20.1 | 16.7 |
| $L_{TL}$ | 180.0 | 179.6 | 180.0 | 170.7 |
| $L_L$ | 176.1 | 175.2 | 175.6 | 166.7 |
| WD | 60.0 | 70.0 | 76.0 | 30.0 |
| BF | 3.9 | 4.4 | 4.5 | 4.0 |
| NA | 0.08 | 0.05 | 0.05 | 0.07 |
| $\beta$ | −0.40 | −0.40 | −0.40 | −0.33 |
| $f$ | 44.1 | 45.9 | 46.5 | 57.1 |
| $\varphi_s$ | 21.4 | 13.9 | 14.2 | 18.1 |
| $D_{os}$ | 175.6 | 185.7 | 194.3 | 148.0 |
| $D_{G1G2}$ | 1.5 | 2.3 | 1.6 | 0.3 |
| $L_{G1}$ | 113.6 | 114.4 | 116.9 | 117.2 |
| $L_{G2}$ | 61.0 | 58.5 | 57.0 | 49.2 |
| $CRA_{obj}$ | 5.1 | 5.1 | 5.1 | 2.6 |
| $CRA_{img}$ | 22.5 | 22.6 | 22.8 | 25.0 |
| $D_{max}$ | 55.6 | 55.5 | 53.4 | 44.1 |
| $D_{G2max}$ | 11.3 | 11.6 | 11.6 | 8.7 |
| $vd_{max}$ | 81.6 | 81.6 | 81.6 | 81.6 |
| $vd_{min}$ | 23.8 | 23.8 | 23.8 | 23.8 |
| $f_{G1}$ | 521.3 | 586.4 | 595.2 | 205.7 |
| $f_{G2}$ | 24.1 | 23.0 | 22.8 | 24.5 |
| $f_{L1}$ | 235.0 | 231.2 | 230.9 | 146.5 |
| $f_{LR1}$ | 159.8 | 208.1 | 210.1 | −307.4 |
| $f_{LR}$ | −37.8 | −39.9 | −39.6 | −66.9 |

|  | Example9 | Example10 | Example11 | Example12 |
| --- | --- | --- | --- | --- |
| $D_{oi}$ | 110.7 | 157.0 | 165.0 | 178.6 |
| $Y_{obj}$ | 25.2 | 25.2 | 25.2 | 25.2 |
| $Y$ | 10.0 | 10.1 | 8.3 | 8.1 |
| $L_{TL}$ | 88.7 | 135.0 | 135.0 | 128.6 |
| $L_L$ | 84.7 | 131.0 | 131.0 | 124.6 |
| WD | 22.0 | 22.0 | 30.0 | 50.0 |
| BF | 4.0 | 4.0 | 4.0 | 4.0 |
| NA | 0.08 | 0.08 | 0.08 | 0.07 |
| $\beta$ | −0.40 | −0.40 | −0.33 | −0.32 |
| $f$ | 29.3 | 36.4 | 40.8 | 44.6 |
| $\varphi_s$ | 10.3 | 13.5 | 14.9 | 14.4 |
| $D_{os}$ | 79.1 | 99.1 | 107.0 | 122.7 |
| $D_{G1G2}$ | 0.3 | 0.5 | 0.3 | 0.1 |
| $L_{G1}$ | 56.5 | 76.0 | 75.9 | 71.8 |
| $L_{G2}$ | 27.9 | 54.5 | 54.9 | 52.7 |
| $CRA_{obj}$ | 2.6 | 2.1 | 1.9 | 2.0 |
| $CRA_{img}$ | 25.0 | 17.4 | 12.6 | 12.2 |
| $D_{max}$ | 19.3 | 21.2 | 29.6 | 30.9 |
| $D_{G2max}$ | 5.1 | 21.2 | 21.2 | 21.2 |
| $vd_{max}$ | 81.6 | 81.6 | 81.6 | 81.6 |
| $vd_{min}$ | 23.8 | 23.8 | 23.8 | 23.8 |

-continued

|  |  |  |  |  |
| --- | --- | --- | --- | --- |
| $f_{G1}$ | 80.8 | 166.7 | 393.2 | 258.3 |
| $f_{G2}$ | 15.0 | 16.8 | 15.4 | 16.3 |
| $f_{L1}$ | 80.4 | 94.8 | 116.9 | 131.3 |
| $f_{LR1}$ | 35.0 | 32.4 | 23.3 | 25.2 |
| $f_{LR}$ | −14.6 | −18.0 | −17.1 | −18.0 |

|  | Example13 | Example14 | Example15 | Example16 |
| --- | --- | --- | --- | --- |
| $D_{oi}$ | 170.7 | 170.7 | 181.0 | 71.8 |
| $Y_{obj}$ | 50.5 | 50.5 | 50.5 | 5.8 |
| $Y$ | 8.0 | 4.4 | 9.9 | 4.9 |
| $L_{TL}$ | 140.7 | 140.7 | 151.0 | 53.7 |
| $L_L$ | 136.6 | 136.7 | 146.7 | 51.2 |
| WD | 30.0 | 30.0 | 30.0 | 18.1 |
| BF | 4.1 | 4.0 | 4.3 | 2.4 |
| NA | 0.03 | 0.03 | 0.04 | 0.21 |
| $\beta$ | −0.16 | −0.09 | −0.20 | −0.85 |
| $f$ | 69.7 | 49.8 | 55.4 | 11.7 |
| $\varphi_s$ | 7.4 | 9.6 | 10.2 | 7.5 |
| $D_{os}$ | 128.1 | 137.7 | 136.1 | 46.5 |
| $D_{G1G2}$ | 4.6 | 2.1 | 7.5 | 2.6 |
| $L_{G1}$ | 94.5 | 106.6 | 98.6 | 26.5 |
| $L_{G2}$ | 37.4 | 28.0 | 40.6 | 22.1 |
| $CRA_{obj}$ | 2.1 | 2.1 | 2.1 | 4.1 |
| $CRA_{img}$ | 11.6 | 9.9 | 22.1 | 21.9 |
| $D_{max}$ | 35.5 | 47.0 | 29.4 | 3.2 |
| $D_{G2max}$ | 5.2 | 2.2 | 5.4 | 3.2 |
| $vd_{max}$ | 81.6 | 81.6 | 81.6 | 81.6 |
| $vd_{min}$ | 34.7 | 34.7 | 29.5 | 23.9 |
| $f_{G1}$ | 1034.1 | −262.1 | −1054.0 | 14.5 |
| $f_{G2}$ | 14.4 | 11.3 | 12.9 | 152.0 |
| $f_{L1}$ | 130.9 | 194.7 | 124.0 | 20.1 |
| $f_{LR1}$ | 128.5 | 34.0 | −3489.1 | −30.9 |
| $f_{LR}$ | −257.0 | 316.1 | −46.7 | −16.0 |

|  | Example17 | Example18 | Example19 | Example20 |
| --- | --- | --- | --- | --- |
| $D_{oi}$ | 84.9 | 93.1 | 93.1 | 81.0 |
| $Y_{obj}$ | 7.0 | 7.0 | 6.1 | 7.0 |
| $Y$ | 4.9 | 4.9 | 4.9 | 4.9 |
| $L_{TL}$ | 63.0 | 63.0 | 63.0 | 63.7 |
| $L_L$ | 60.7 | 60.7 | 60.7 | 61.3 |
| WD | 21.9 | 30.1 | 30.1 | 17.3 |
| BF | 2.3 | 2.3 | 2.3 | 2.3 |
| NA | 0.18 | 0.18 | 0.18 | 0.20 |
| $\beta$ | −0.70 | −0.70 | −0.80 | −0.70 |
| $f$ | 11.8 | 12.6 | 12.2 | 17.1 |
| $\varphi_s$ | 10.3 | 10.5 | 9.8 | 8.1 |
| $D_{os}$ | 53.8 | 60.9 | 56.8 | 46.3 |
| $D_{G1G2}$ | 1.4 | 1.6 | 1.6 | 2.5 |
| $L_{G1}$ | 31.1 | 30.0 | 25.9 | 27.5 |
| $L_{G2}$ | 28.1 | 29.1 | 33.2 | 31.3 |
| $CRA_{obj}$ | 4.1 | 3.9 | 3.8 | 2.2 |
| $CRA_{img}$ | 23.0 | 22.8 | 21.6 | 14.6 |
| $D_{max}$ | 14.7 | 15.2 | 15.6 | 4.9 |
| $D_{G2max}$ | 14.7 | 15.2 | 15.6 | 4.5 |
| $vd_{max}$ | 81.6 | 81.6 | 81.6 | 81.6 |
| $vd_{min}$ | 26.5 | 26.5 | 26.5 | 27.5 |
| $f_{G1}$ | 19.6 | 19.8 | 18.9 | 18.7 |
| $f_{G2}$ | −29.2 | −21.6 | −19.9 | 20.4 |
| $f_{L1}$ | 38.6 | 40.9 | 40.2 | 44.5 |
| $f_{LR1}$ | −19.4 | −16.6 | −15.8 | −33.0 |
| $f_{LR}$ | −11.1 | −12.3 | −12.9 | −15.7 |

|  | Example21 | Example22 |
| --- | --- | --- |
| $D_{oi}$ | 70.0 | 64.6 |
| $Y_{obj}$ | 6.1 | 6.1 |
| $Y$ | 4.9 | 4.9 |
| $L_{TL}$ | 52.6 | 46.7 |
| $L_L$ | 48.3 | 42.4 |
| WD | 17.4 | 17.9 |
| BF | 4.3 | 4.3 |
| NA | 0.15 | 0.18 |
| $\beta$ | −0.80 | −0.81 |
| $f$ | 13.3 | 13.1 |
| $\varphi_s$ | 5.8 | 5.8 |
| $D_{os}$ | 42.0 | 38.6 |
| $D_{G1G2}$ | 3.9 | 2.8 |

-continued

| | | |
|---|---|---|
| $L_{G1}$ | 23.8 | 18.9 |
| $L_{G2}$ | 20.5 | 20.6 |
| $CRA_{obj}$ | 3.0 | 2.6 |
| $CRA_{img}$ | 21.1 | 20.7 |
| $D_{max}$ | 9.6 | 6.0 |
| $D_{G2max}$ | 2.4 | 2.1 |
| $vd_{max}$ | 81.6 | 81.6 |
| $vd_{min}$ | 29.5 | 26.5 |
| $f_{G1}$ | 18.3 | 16.3 |
| $f_{G2}$ | 18.1 | 12.0 |
| $f_{L1}$ | −37.2 | 29.1 |
| $f_{LR1}$ | −21.9 | 551.4 |
| $f_{LR}$ | −9.6 | −9.1 |

Moreover, values of $\phi_{G1o}$ and $\phi_{G1i}$ are enumerated below. Values in an upper stage indicate the maximum values, and values in a lower stage indicate the minimum values. L1 to L7 denote lenses from a first lens to a seventh lens, "o" denotes a lens surface on the object side and "i" denotes a lens surface on the image side. For example, L1-*o* denotes a surface on the object side of the first lens, and L3-*i* denotes a surface on the image side of the third lens.

| | Example1 | Example2 | Example3 | Example4 |
|---|---|---|---|---|
| $\phi_{G1o}$ | L1-o 101.49 | L1-o 102.33 | L1-o 104.37 | L1-o 101.64 |
| | L2-i 94.52 | L2-i 94.47 | L2-i 98.12 | L2-i 95.56 |
| $\phi_{G1i}$ | L3-o 38.74 | L3-o 40.11 | L3-o 34.31 | L3-o 26.77 |
| | L6-i 21.65 | L6-i 21.83 | L6-i 22.68 | L6-i 20.61 |

| | Example5 | Example6 | Example7 | Example8 |
|---|---|---|---|---|
| $\phi_{G1o}$ | L1-i 104.62 | L1-o 98.66 | L1-o 97.76 | L1-o 102.08 |
| | L2-i 99.06 | L2-i 92.7 | L2-i 91.66 | L2-i 77.22 |
| $\phi_{G1i}$ | L3-o 30.87 | L3-o 28.45 | L3-o 30.85 | L3-o 24.73 |
| | L6-i 21.65 | L6-i 14.24 | L6-i 14.48 | L6-i 18.35 |

| | Example9 | Example10 | Example11 | Example12 |
|---|---|---|---|---|
| $\phi_{G1o}$ | L1-o 51.23 | L1-i 54.79 | L1-i 55.65 | L1-i 56.19 |
| | L2-i 41.85 | L2-i 42.77 | L2-i 50.03 | L2-i 52.75 |
| $\phi_{G1i}$ | L3-o 15.04 | L3-o 22.29 | L3-o 17.63 | L3-o 20.21 |
| | L6-i 10.6 | L7-i 13.69 | L7-i 14.99 | L7-i 14.53 |

| | Example13 | Example14 | Example15 |
|---|---|---|---|
| $\phi_{G1o}$ | L1-o 101.37 | L1-o 01.01 | L1-o 104.43 |
| | L2-i 64.99 | L2-i 72.93 | L2-i 57.88 |
| $\phi_{G1i}$ | L3-o 20.61 | L3-o 17.96 | L3-o 25.29 |
| | L5-i 8.48 | L5-i 9.61 | L5-i 11.92 |

Moreover, as variations of each example, pixel pitch p of each example can be let to have values shown below. For each modified example, a plurality of values of pixel pitch p is shown.

MODIFIED EXAMPLE OF EXAMPLE 1 approximately 13.3 μm, approximately 5 μm, approximately 3 μm, approximately 1 μm.

MODIFIED EXAMPLE OF EXAMPLE 2 approximately 13.3 μm, approximately 5 μm, approximately 3 μm, approximately 1 μm.

MODIFIED EXAMPLE OF EXAMPLE 3 approximately 13.2 μm, approximately 5 μm, approximately 3 μm, approximately 1 μm.

MODIFIED EXAMPLE OF EXAMPLE 4 approximately 11.0 μm, approximately 5 μm, approximately 3 μm, approximately 1 μm.

MODIFIED EXAMPLE OF EXAMPLE 5 approximately 12.3 μm, approximately 5 μm, approximately 3 μm, approximately 1 μm.

MODIFIED EXAMPLE OF EXAMPLE 6 approximately 12.4 μm, approximately 5 μm, approximately 3 μm, approximately 1 μm.

MODIFIED EXAMPLE OF EXAMPLE 7 approximately 12.3 μm, approximately 5 μm, approximately 3 μm, approximately 1 μm.

MODIFIED EXAMPLE OF EXAMPLE 8 approximately 10.2 μm, approximately 5 μm, approximately 3 μm, approximately 1 μm.

MODIFIED EXAMPLE OF EXAMPLE 9 approximately 6.1 μm, approximately 3 μm, approximately 1 μm.

MODIFIED EXAMPLE OF EXAMPLE 10 approximately 6.2 μm, approximately 3 μm, approximately 1 μm.

MODIFIED EXAMPLE OF EXAMPLE 11 approximately 5.1 μm, approximately 3 μm, approximately 1 μm.

MODIFIED EXAMPLE OF EXAMPLE 12 approximately 4.9 μm, approximately 3 μm, approximately 1 μm.

MODIFIED EXAMPLE OF EXAMPLE 13 approximately 4.9 μm, approximately 3 μm, approximately 1 μm

MODIFIED EXAMPLE OF EXAMPLE 14 approximately 2.7 μm, approximately 1 μm.

MODIFIED EXAMPLE OF EXAMPLE 15 approximately 6.1 μm, approximately 3 μm, approximately 1 μm.

MODIFIED EXAMPLE OF EXAMPLE 16 approximately 3.0 μm, approximately 1 μm.

MODIFIED EXAMPLE OF EXAMPLE 17 approximately 3.0 μm, approximately 1 μm.

MODIFIED EXAMPLE OF EXAMPLE 18 approximately 3.0 µm, approximately 1 µm.

MODIFIED EXAMPLE OF EXAMPLE 19 approximately 3.0 µm, approximately 1 µm.

MODIFIED EXAMPLE OF EXAMPLE 20 approximately 3.0 µm, approximately 1 µm.

MODIFIED EXAMPLE OF EXAMPLE 21 approximately 3.0 µm, approximately 1 µm.

MODIFIED EXAMPLE OF EXAMPLE 22 approximately 3.0 µm, approximately 1 µm.

Figure 23:
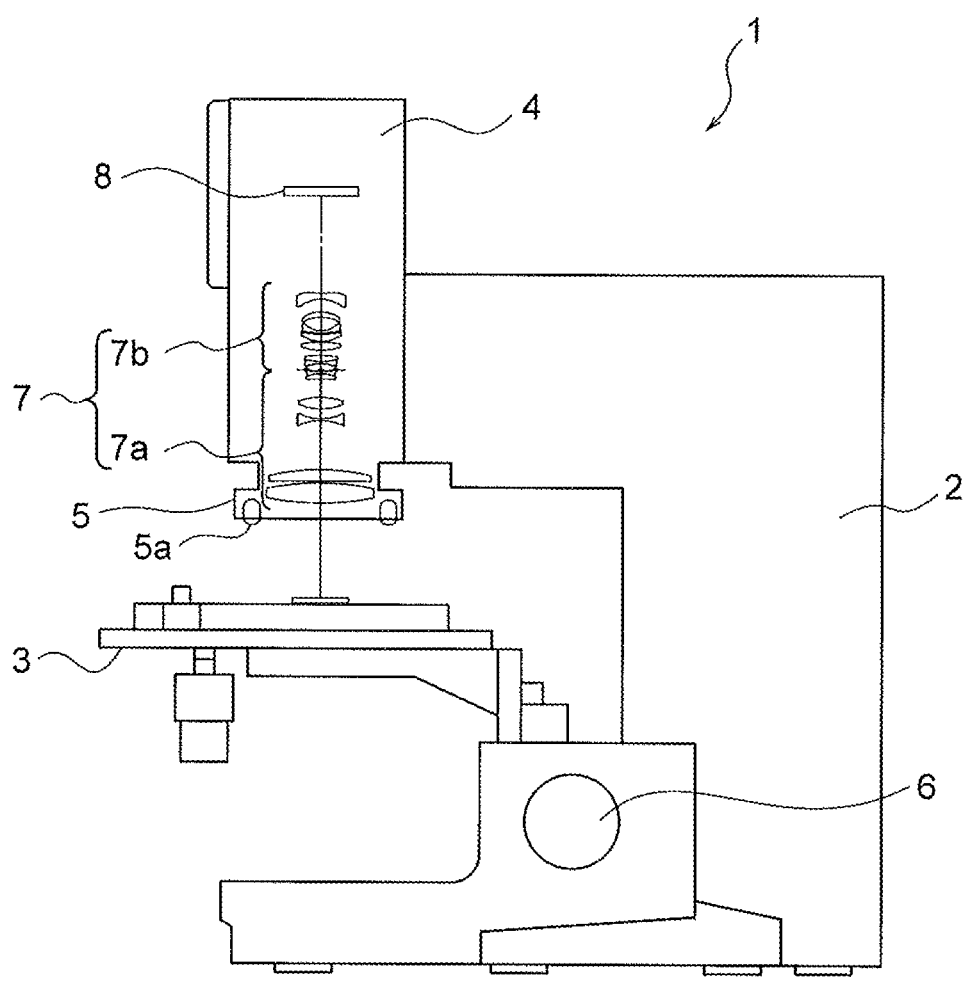
FIG. 23 is a diagram showing an arrangement of an image pickup apparatus and an image pickup system.

FIG. 23 is a diagram showing a microscope which is an optical instrument of the present embodiment. A microscope 1 is a microscope of an upright type. As shown in FIG. 23, the microscope 1 includes a main body 2, a stage 3, an image pickup unit 4, an illumination unit 5, an aiming knob 6, an optical system 7, and an image pickup element 8.

The main body 2 is provided with the stage 3, the image pickup unit 4, and the aiming knob 6. A sample is to be mounted on the stage 3. The stage 3 is moved in an optical axial direction by the aiming knob 6. The stage 3 is moved by an operation (rotation) of the aiming knob 6, and accordingly, it is possible to adjust the focus on the sample. For this, a moving mechanism (not shown in the diagram) is provided between the main body 2 and the stage 3.

The image pickup unit 4 is provided with the illumination unit 5. The image pickup unit 4 and the illumination unit 5 are positioned above the stage 3. The illumination unit 5 includes illumination elements 5a disposed in annular shape. An LED (light emitting diode) is an example of the illumination element 5a.

The optical system 7 and the image pickup element 8 are disposed at an interior of the image pickup unit 4. The optical system according to the example 1 for instance is used for the optical system 7. The optical system 7 includes a first lens unit 7a and a second lens unit 7b. A front end of the first lens unit 7a is positioned at a central portion of the illumination unit 5.

From the illumination unit 5, illumination light is irradiated to a sample. In this case, the illumination is epi-illumination. Fluorescent light or reflected light from the sample passes through the optical system 7 and is incident on the image pickup element 8. A sample image (an optical image) is formed on an image pickup surface of the image pickup element 8. The sample image is subjected to photoelectric conversion by the image pickup element 8, and accordingly, an image of the sample is acquired. The image of the sample is displayed on a display unit (not shown in the diagram). In such manner, an observer is able to observe the image of the sample.

Here, the microscope 1 includes the optical system 7 (optical system according to the present embodiment). The optical system 7, while being an optical system having a short overall length, has a wide capturing area, a high resolution, and a capability of correcting aberrations favorably. Therefore, in the microscope 1, various aberrations are corrected favorably over a wide area, and a bright and sharp sample image is acquired.

In the abovementioned example, the optical system was disposed in the image pickup unit. However, an arrangement is not restricted to such an arrangement. For example, in an objective lens with a parfocal distance of 75 mm, the image pickup element and the optical system according to the present embodiment can be disposed in a frame member which holds the lens. In this case, similarly as the existing objective lens, the optical system according to the present embodiment can be installed on a revolver. When such an arrangement is made, the existing objective lens and the optical system of the present embodiment can be used by switching.

The description was made by using an example of a microscope as an optical instrument using the abovementioned optical system. However, the optical system according to the present invention is not restricted to a microscope, and is applicable to an electronic image pickup apparatus (such as a lens unit for a portable camera, a laptop computer, and a portable information terminal) as an optical instrument.

Since the image pickup unit 4 includes the optical system 7 and the image pickup element 8, the image pickup unit 4 can be deemed as an image pickup apparatus. In this case, since the microscope 1 includes the image pickup unit 4, the stage 3, and the illumination unit 5 (illumination apparatus), it can be called as an image pickup system. In FIG. 23, the stage 23 is joined to the main body 2 via an aiming mechanism (the aiming knob 6). However, the stage 3 may be installed directly on the main body 3 and not via the moving mechanism. By making such arrangement, it is possible to integrate the image pickup unit 4 and the stage 3 via the main body 2.

Figure 24:
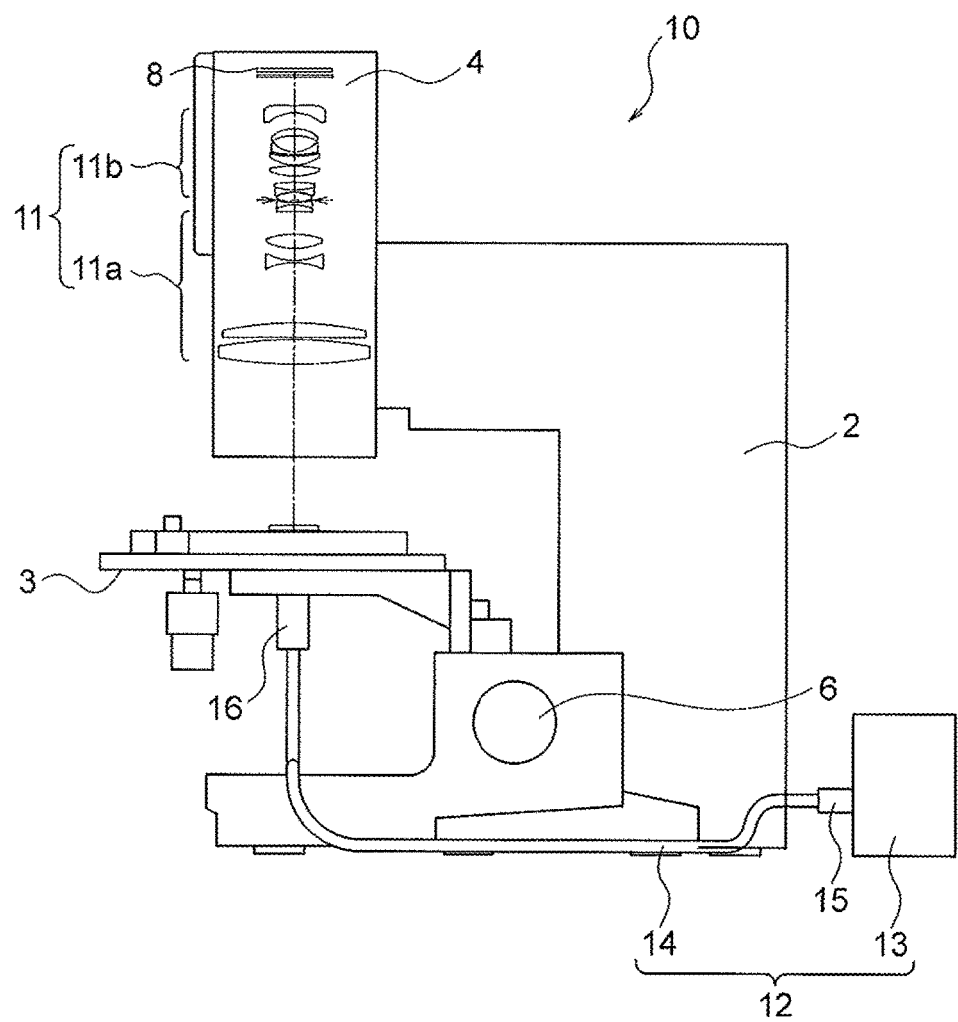
FIG. 24 is a diagram showing an arrangement of another image pickup apparatus and image pickup system.

FIG. 24 is a diagram showing a microscope which is an optical instrument according to the present embodiment. A microscope 10 is a microscope of an upright type. Same reference numerals are assigned to components which are same as in the microscope 1 (FIG. 23), and description thereof is omitted.

An optical system 11 and the image pickup element 8 are disposed at the interior of the image pickup unit 4. The optical system according to the example 1 is used for the optical system 11. The optical system 11 includes a first lens unit 11a and a second lens unit 11b.

The microscope 1 was provided with the illumination unit 5 at the optical system 7 side. Whereas, the microscope 10 is provided with the optical system 11 which is facing a illumination unit 12 thereby sandwiching the stage 3 between the optical system 11 and the illumination unit 12. Accordingly, transmitted illumination is used in the microscope 10. The illumination unit 12 includes a light source unit 13 and a light guiding fiber 14.

The light source unit 13 includes a light source such as a halogen lamp, a mercury lamp, a xenon lamp, an LED, and a laser. The light source unit 13 includes a lens. Illumination light emitted from the light source passes through the lens and is incident on an incident-end 15 of the light guiding fiber 14. The illumination light incident on the light guiding fiber 14 is transmitted through the light guiding fiber 14 and emerges from an exit-end 16.

The exit-end 16 of the light guiding fiber 14 is connected to the stage 3 by a holding mechanism (not shown in the diagram). Here, the exit-end 16 of the light guiding fiber 14 is positioned on a lower surface of the stage 3. Therefore, the illumination light emerged from the exit-end 16 is directed toward the optical system 11 from a lower side of the stage 3 and is irradiated to a sample. In such manner, transmitted illumination is carried out in the microscope 10.

The light guiding fiber 14 is held by the stage 3. However, the light guiding fiber 14 may be held by a means other than the stage 3. Moreover, the exit-end 16 of the light guiding fiber 14 may be positioned on an upper surface (the optical system 7 side) of the stage 3. By making such arrangement, it is possible to carry out epi-illumination in the microscope 10 similarly as in the microscope 1.

Transmitted light or fluorescent light from the sample passes through the optical system 11 and is incident on the image pickup element 8. A sample image (an optical image) is formed on an image pickup surface of the image pickup element 8. The sample image is subjected to photoelectric conversion by the image pickup element 8, and accordingly, an image of the sample is acquired. The image of the sample is displayed on a display unit (not shown in the diagram). In such manner, the observer is able to observe the image of the sample.

Even the microscope 10 includes the optical system 11 (optical system according to the present embodiment). The optical system 11, while being an optical system having a short overall length, has a wide capturing area, a high resolution, and a capability of correcting aberrations favorably. Therefore, in the microscope 10, various aberrations are corrected favorably over a wide area, and a bright and sharp sample image is acquired. The microscope 10 may have epi-illumination. Moreover, it is possible to make appropriate design variations in an arrangement of members in the microscope 10.

Figure 25:
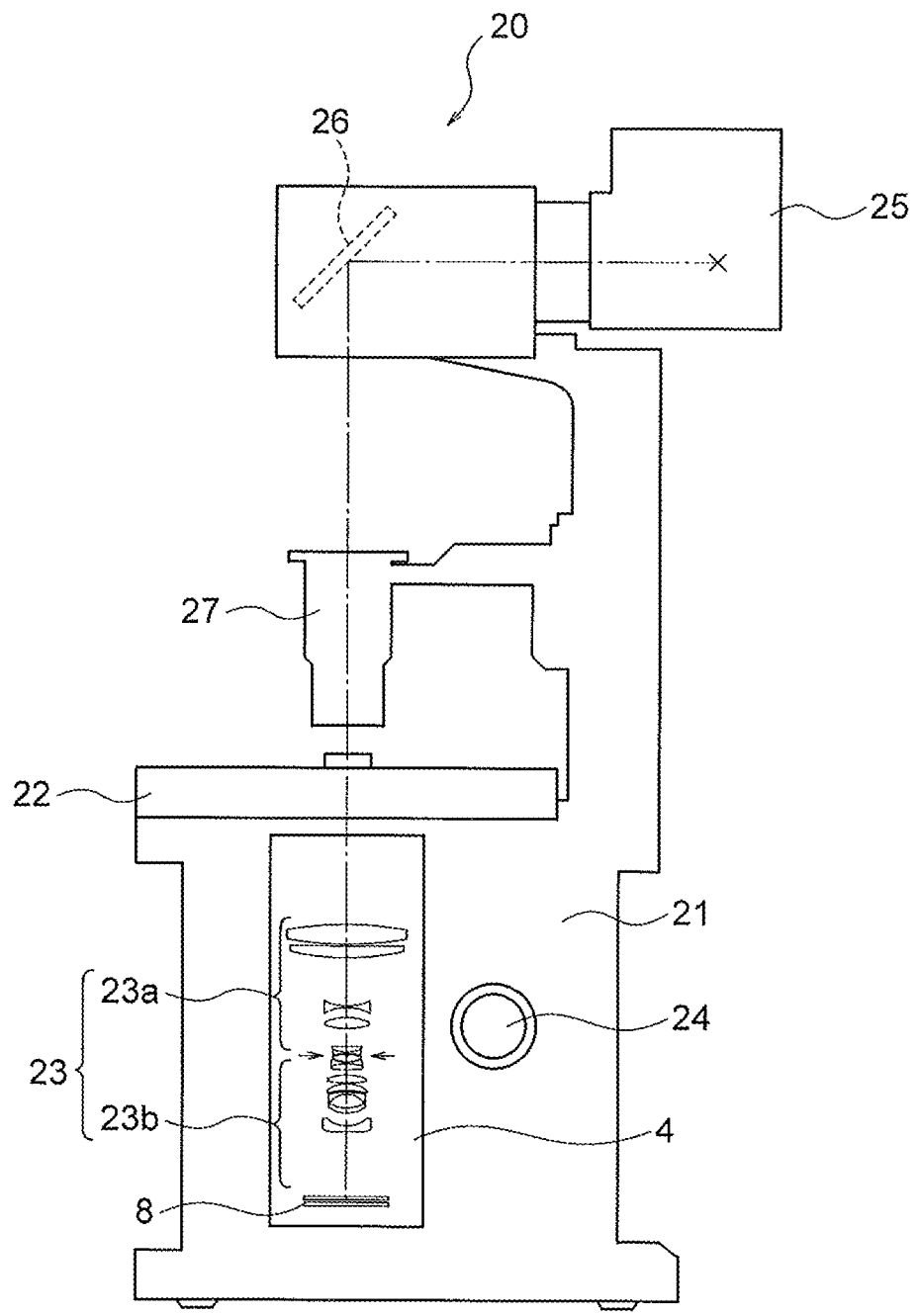
FIG. 25 is a diagram showing an arrangement of still another image pickup apparatus and image pickup system.

FIG. 25 is a diagram showing a microscope which is an optical instrument according to the present embodiment. A microscope 20 is a microscope of inverted type. The microscope 20 includes a main body 21, a stage 22, the image pickup unit 4, an optical system 23, the image pickup element 8, an aiming knob 24, transmitted-illumination light source 25, a reflecting mirror 26, and a condenser lens 27.

Here, the optical system 23 and the image pickup element 8 are disposed at the interior of the image pickup unit 4. The optical system according to the example 1 is used for the optical system 23. The optical system 23 includes a first lens unit 23a and a second lens unit 23b.

The main body 21 is provided with the stage 22, the image pickup unit 4, and the aiming knob 24. A sample is to be placed on the stage 22. The image pickup unit 4 is to be moved in the optical axial direction by the aiming knob 24. The image pickup unit 4 is moved by an operation (rotation) of the aiming knob 24, and accordingly, it is possible to adjust the focus on the sample. For this, a moving mechanism (not shown in the diagram) is provided inside the main body 21, and the image pickup unit 4 is held by the moving mechanism.

Moreover, the main body 21 is provided with the transmitted-illumination light source 25, the reflecting mirror 26, and the condenser lens 27. The transmitted-illumination light source 25, the reflecting mirror 26, and the condenser lens 27 are disposed above the stage 22. Illumination light emitted from the transmitted-illumination light source 25 is reflected at the reflecting mirror 26, and is incident on the condenser lens 27. The condenser lens 27 is disposed on an upper surface of the stage 22. Therefore, the illumination light emerged from the condenser lens 27 travels from an upper side of the stage 22 toward the optical system 23 and is irradiated to the sample. In such manner, transmitted-illumination is carried out in the microscope 20.

Even the microscope 20 includes the optical system 23 (optical system according to the present embodiment). The optical system 23, while being an optical system having a short overall length, has a wide capturing area, a high resolution, and a capability of correcting aberrations favorably. Therefore, in the microscope 20, various aberrations are corrected favorably over a wide area, and a bright and sharp sample image is acquired. It is possible to make appropriate design variations in an arrangement of members in the microscope 20.

Figure 26A:
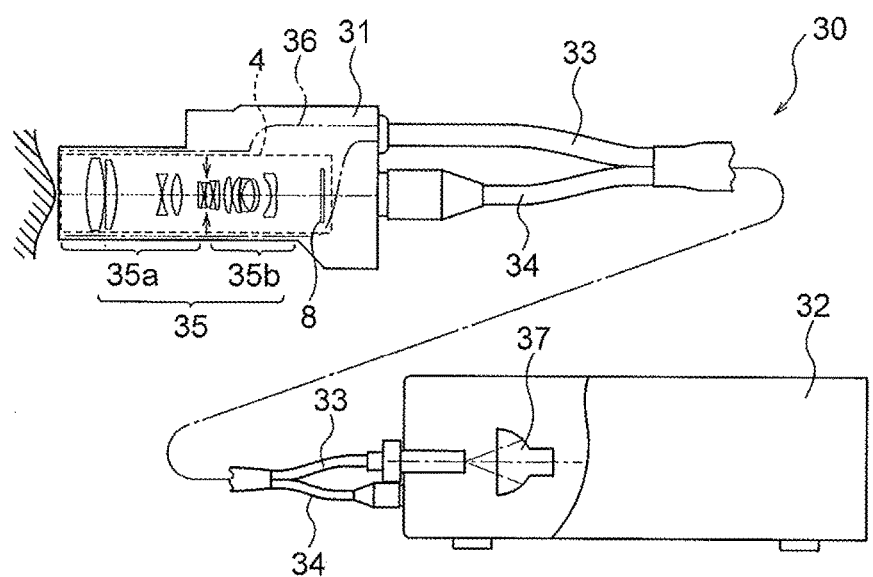
FIG. 26A and FIG. 26B are diagrams showing an arrangement of still another image pickup apparatus and image pickup system.
Figure 26B:
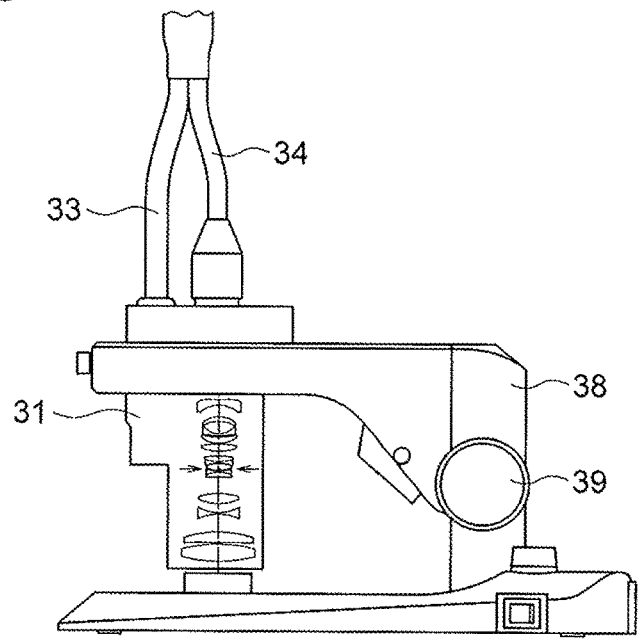

FIG. 26A and FIG. 26B are diagrams showing a microscope which is an optical instrument according to the present embodiment. FIG. 26A is a diagram showing an overall arrangement of the microscope and FIG. 26B is a diagram showing a microscope 30 in a fixed state.

The microscope 30 is a microscope of a portable type. The microscope 30 includes a probe unit 31, a control box 32, a light guiding fiber 33, a cable 34, the image pickup unit 4, an optical system 35, the image pickup element 8, a light guiding body for illumination 36, and a light source 37.

The optical system 35 and the image pickup element 8 are disposed at the interior of the image pickup unit 4. The optical system according to the example 1 is used for the optical system 35. The optical system 35 includes a first lens unit 35a and a second lens unit 35b.

The probe unit 31 and the control box 32 are connected by the light guiding fiber 33 and the cable 34. The control box 32 includes the light source 37 and a processing unit (not shown in the diagram). The processing unit performs processing of an image signal from the probe unit.

The probe unit 31 has a size that enables the user to hold in a hand. The probe unit 31 includes the image pickup unit 4 and the light guiding body for illumination 36. The light guiding body for illumination 36 is disposed at an outer peripheral side of the image pickup unit 4. The light guiding body for illumination 36 is optically connected to the light guiding fiber 33. Illumination light emitted from the light source 37 is transmitted through the light guiding fiber 33, and is incident on the light guiding body for illumination 36. The illumination light is transmitted through the light guiding body for illumination 36 and emerges from the probe unit 31. In such manner, epi-illumination is carried in the microscope 30.

Reflected light or fluorescent light from a sample passes through the optical system 35 and is incident on the image pickup element 8. A sample image (an optical image) is formed on the image pickup surface of the image pickup element. The sample image is subjected to photoelectric conversion by the image pickup element 8, and an image of the sample is acquired. The image of the sample is displayed on a display unit (not shown in the diagram). In such manner, the observer is able to observe the image of the sample.

The probe unit 31 is connected to the control box 32 by the light guiding fiber 33 and the cable 34. Therefore, it is possible to set freely a position and a direction of the probe unit 31. In this case, the posture (position and direction) of the probe unit 31 is to be fixed by the observer. However, sometimes, no sufficient stability is achieved by fixing by the observer.

For stabilizing the posture (position and direction) of the probe unit 31, the probe unit 31 may be held by a mount 38 as shown in FIG. 26B. By making such arrangement, it is possible to stabilize the posture (position and direction) of the probe unit 31.

The mount 38 is provided with an aiming knob 39. The probe unit 31 (image pickup unit 4) is to be moved in the optical axial direction by the aiming knob 39. The probe unit 31 is moved by an operation (rotation) of the aiming knob 39, and accordingly, it is possible to adjust the focus on the sample. For this, a moving mechanism (not shown in the diagram) is provided inside the mount 38.

Even the microscope 30 includes the optical system 35 (optical system according to the present embodiment). The optical system 35, while being an optical system having a short overall length, has a wide capturing area, a high resolution, and a capability of correcting aberrations favorably. Therefore, in the microscope 30, various aberrations are corrected favorably over a wide area, and a bright and sharp sample image is acquired. It is possible to make appropriate design variations in an arrangement of members in the microscope 30.

Figure 27:
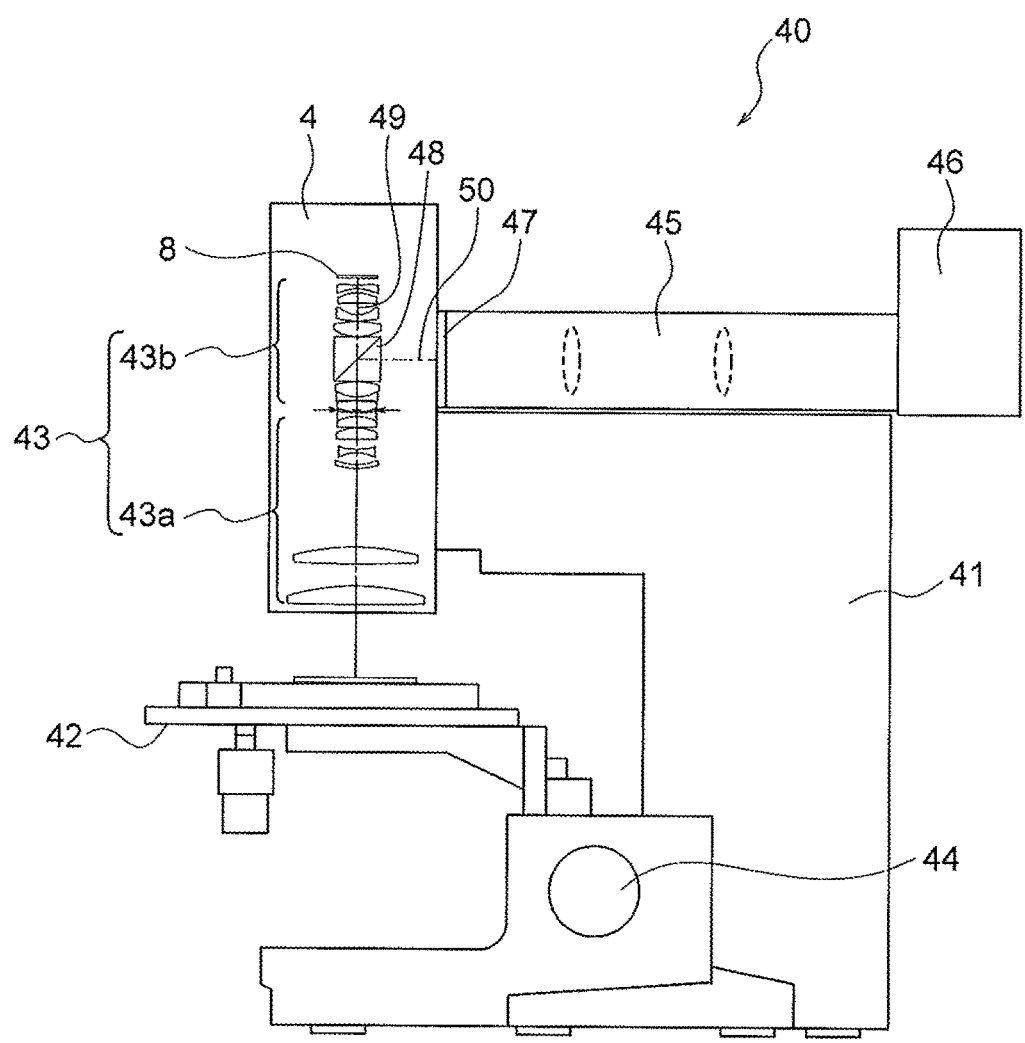
FIG. 27 is a diagram showing an arrangement of still another image pickup apparatus and image pickup system.

FIG. 27 is a diagram showing a microscope which is an optical instrument according to the present embodiment. A microscope 40 is a microscope of upright type. As shown in FIG. 27, the microscope 40 includes a main body 41, a stage 42, the image pickup unit 4, an optical system 43, the image pickup element 8, an aiming knob 44, an illumination unit 45, and a light source unit 46.

The main body 41 is provided with the stage 42, the image pickup unit 4 and the aiming knob 44. A sample is placed on the stage 42. The stage 42 is to be moved in the optical axial direction by the aiming knob 44. The stage 42 is moved by an operation (rotation) of the aiming knob 44, and accordingly, it is possible to adjust the focus on the sample. For this, a moving mechanism (not shown in the diagram) is provided between the main body 41 and the stage 42.

The image pickup unit 4 is provided with a connecting portion 47. One end of the illumination unit 45 is connected to the connecting portion 47. Moreover, the light source unit 46 is connected to the other end of the illumination unit 45. The illumination unit 45 includes a plurality of lens and stops, and is capable of illuminating by Koehler illumination and critical illumination. Moreover, the illumination unit 45 may have an optical filter. The light source unit 46 includes a light source such as a halogen lamp, a mercury lamp, a xenon lamp, an LED, and a laser.

The optical system 43 and the image pickup element 8 are disposed at the interior of the image pickup unit 4. The optical system according to the example 11 is used for the optical system 43. The optical system 43 includes a first lens unit 43a and a second lens unit 43b.

A beam splitter 48 is disposed in the second lens unit 43b. The beam splitter 48 is an optical path splitting element. A first optical path 49 and a second optical path 50 are formed by the beam splitter 48.

An optical path on the object side (sample side) of the beam splitter 48 is a common optical path. The first lens unit 43a and a part of the second lens unit 43b are disposed in the common optical path. The first optical path 49 and the second optical path 50 are formed on the image pickup element 8 side of the beam splitter 48. The first optical path 49 is formed on an extended line of the common optical path. The image pickup element 8 and some of the lenses in the second lens unit 43b are disposed in the first optical path 49.

On the other hand, the second optical path 50 is formed in a direction orthogonal to the common optical path. Moreover, the connecting portion 47 is provided at a position at which, an extended line of the second optical path 50 intersects with an outer peripheral surface of the image pickup unit 4. The illumination unit 45 is connected to the connecting portion 47.

Illumination light is irradiated to a sample from the illumination unit 45. In this case, the illumination is by epi-illumination. Reflected light or fluorescent light from the sample passes through the optical system 43 and is incident on the image pickup element 8. A sample image (an optical image) is formed on the image pickup surface of the image pickup element 8. The sample image is subjected to photo-electric conversion by the image pickup element 8, and an image of the sample is achieved. The image of the sample is displayed on a display unit (not shown in the diagram). In such manner, the observer is able to observe the image of the sample.

Here, the microscope 40 includes the optical system 43 (optical system according to the present embodiment). The optical system. 43, while being an optical system having a short overall length, has a wide capturing range, a high resolution, and a capability of correcting aberrations favorably. Therefore, in the microscope 40, various aberrations are corrected favorably over a wide range, and a bright and sharp sample image is achieved.

Any optical system from among the optical systems according to the examples 1 to 22 can be used in each of the microscope 1, the microscope 10, the microscope 20, the microscope 30, and the microscope 40.

According to the present embodiment of the present invention, it is possible to provide an image pickup apparatus and an image pickup system which include an optical system having a short overall length while having a high resolution, in which, aberrations are corrected favorably while securing a wide capturing range.

In such manner, the present invention can have various modified examples without departing from the scope of the invention. Moreover, shapes and number of components is not necessarily limited to those described in each example. A lens which is not shown in the diagrams of the examples described heretofore, and which practically does not have a refractive power may be disposed in any of the lens units or outside any of the lens units.

Moreover, the following invention other than the above-mentioned invention is also included in the present invention.

[Appended Mode 1]

An image pickup apparatus comprising:
an image pickup element; and
an optical system, wherein
the image pickup element includes a plurality of pixels which converts light intensity to an electric signal, and the plurality of pixels is arranged in rows two-dimensionally, and
an optical image is formed on the image pickup element by the optical system, and
the optical system includes in order from an object side,
a first lens unit which includes a plurality of lenses,
a stop, and
a second lens unit which includes a plurality of lenses, and
the first lens unit includes a first object-side lens which is disposed nearest to an object, and
the second lens unit includes a second image-side lens which is disposed nearest to an image, and
the following conditional expressions (1), (2), (3), (4), and (5) are satisfied:

$$3250 < 2Y/p \tag{1}$$

$$-1.0 < \beta \tag{2}$$

$$CRA_{obj} < 10 \text{ deg} \tag{3}$$

$$2.0 < L_L/\sqrt{(Y \times Y_{obj})} < 15.0 \tag{4}$$

and $$0.5 < L_{TL}/D_{oi} < 0.95 \tag{5}$$

where,

Y denotes a maximum image height in the overall optical system, p denotes a pixel pitch in the image pickup element, β denotes an imaging magnification of the optical system, $CRA_{obj}$ denotes a maximum angle from among angles made by a plurality of principal rays incident on the first object-side lens, with an optical axis, $L_L$ denotes a distance on the optical axis from an object-side surface of the first object-side lens up to an image-side surface of the second image-side lens, $Y_{obj}$ denotes a maximum object height, $L_{TL}$ denotes a distance on the optical axis from the object-side surface of the first object-side lens up to the image, and $D_{oi}$ denotes a distance on the optical axis from the object up to the image, and regarding the sign of the angle, the angle is let to be negative when measured in a clockwise direction from the optical axis, and the angle is let to be positive when measured in a counterclockwise direction from the optical axis.

[Appended Mode 2]

The image pickup apparatus according to Appended mode 1, wherein the first lens unit includes a first image-side lens which is disposed nearest to the image, and the second lens unit includes a second object-side lens which is disposed nearest to the object, and the following conditional expression (6) is satisfied:

$$D_{G1G2}/\phi_s < 2.0 \qquad (6),$$

where, $D_{G1G2}$ denotes a distance on the optical axis from an image-side surface of the first image-side lens up to an object-side surface of the second object-side lens, and $\phi_s$ denotes a diameter of the stop.

[Appended Mode 3]

The image pickup apparatus according to Appended mode 1, wherein the following conditional expression (7) is satisfied:

$$0.03 < D_{max}/L_L < 0.5 \qquad (7),$$

where, $D_{max}$ denotes a maximum distance form among distances on the optical axis between the adjacent lenses in the optical system, and $L_L$ denotes the distance on the optical axis from the object-side surface of the first object-side lens up to the image-side surface of the second image-side lens.

[Appended Mode 4]

The image pickup apparatus according to Appended mode 1, wherein the following conditional expression (8) is satisfied:

$$0.1 < D_{G2max}/Y < 1.5 \qquad (8),$$

where, $D_{G2max}$ denotes a maximum distance form among distances on the optical axis between the adjacent lenses in the second lens unit, and Y denotes the maximum image height in the overall optical system.

[Appended Mode 5]

The image pickup apparatus according to Appended mode 1, wherein the following conditional expression (9) is satisfied:

$$-1.5 < f/f_{G2} < 10.0 \qquad (9),$$

where, f denotes a focal length of the overall optical system, and $f_{G2}$ denotes a focal length of the second lens unit.

[Appended Mode 5-1]

The image pickup apparatus according to Appended mode 1, wherein at least one cemented lens is disposed on the object side of the stop or on the image side of the stop.

[Appended Mode 5-2]

The image pickup apparatus according to Appended mode 1, wherein the second lens unit includes a predetermined lens unit nearest to the image, and the predetermined lens unit has a negative refractive power as a whole, and includes a single lens having a negative refractive power or two lenses, and the two lenses include a lens having a negative refractive power and a lens having either a positive refractive power or a negative refractive power, in order from the object side.

[Appended Mode 6]

The image pickup apparatus according to Appended mode 1, wherein the first lens unit includes an object-side lens unit which is disposed nearest to the object, and the object-side lens unit has a positive refractive power as a whole, and includes a lens which satisfies the following conditional expression (10), and the following conditional expression (11) is satisfied:

$$0.6 < \phi_{G1o} \times |\beta|/Y \qquad (10), \text{ and}$$

$$0.0 < \beta_{G1o} \qquad (11)$$

where, $\phi_{G1o}$ denotes an effective aperture of all lenses in the object-side lens unit, β denotes the imaging magnification of the optical system, Y denotes the maximum image height in the overall optical system, and $\beta_{G1o}$ denotes an imaging magnification of the object-side lens unit.

[Appended Mode 6-1]

The image pickup apparatus according to Appended mode 6, wherein the first lens unit includes in order from the object side, the object-side lens unit and the image-side lens unit.

[Appended Mode 6-2]

The image pickup apparatus according to Appended mode 6, wherein the object-side lens unit includes at least two positive lenses, and at least one negative lens is disposed between the object-side lens unit and the stop.

[Appended Mode 6-3]

The image pickup apparatus according to Appended mode 6, wherein the following conditional expression (12) is satisfied:

$$0.3 < f_{G1o}/f < 12.0 \qquad (12),$$

where, $f_{G1o}$ denotes a focal length of the object-side lens unit, and f denotes the focal length of the overall optical system.

[Appended Mode 7]

The image pickup apparatus according to Appended mode 1, wherein the following conditional expression (14) is satisfied:

$$-0.50 < (WD \times \tan(\sin^{-1}NA) - \phi_s/2)/L_{G1s} < 0.10 \qquad (14),$$

where,

WD denotes a distance on the optical axis from the object up to the object-side surface of the first object-side lens, NA denotes a numerical aperture on the object side of the optical system, $\phi_s$ denotes the diameter of the stop, and $L_{G1s}$ denotes a distance on the optical axis from the object-side surface of the first object-side lens up to the stop.

[Appended Mode 7-1]

The image pickup apparatus according to Appended mode 1, wherein the first lens unit includes in order from the object side, a lens unit having a positive refractive power and a lens unit having either a positive refractive power or a negative refractive power, and the following conditional expression (14) is satisfied:

$$-0.50 < (WD \times \tan(\sin^{-1} NA) - \phi_s/2)/L_{G1s} < 0.10 \quad (14),$$

where,

WD denotes a distance on the optical axis from the object up to the object-side surface of the first object-side lens, NA denotes a numerical aperture on the object side of the optical system, $\phi_s$ denotes the diameter of the stop, and $L_{G1s}$ denotes a distance on the optical axis from the object-side surface of the first object-side lens up to the stop.

[Appended Mode 8]

The image pickup apparatus according to Appended mode 1, wherein the following conditional expression (15) is satisfied:

$$0.60 < \phi_s/(2 \times WD \times \tan(\sin^{-1} NA)) < 12.0 \quad (15),$$

where, $\phi_s$ denotes the diameter of the stop,

WD denotes a distance on the optical axis from the object up to the object-side surface of the first object-side lens, and NA denotes a numerical aperture on the object side of the optical system.

[Appended Mode 8-1]

The image pickup apparatus according to Appended mode 1, wherein the first lens unit includes in order from the object side, a lens unit having a positive refractive power, and a lens unit having either a negative refractive power or a positive refractive power, and the following conditional expression (15-1) is satisfied:

$$0.6 < \phi_s/(2 \times WD \times \tan(\sin^{-1} NA)) < 12.0 \quad (15\text{-}1),$$

where, $\phi_s$ denotes the diameter of the stop,

WD denotes the distance on the optical axis from the object up to the object-side surface of the first object-side lens, and NA denotes the numerical aperture on the object side of the optical system.

[Appended Mode 9]

The image pickup apparatus according to Appended mode 1, wherein the following conditional expression (16) is satisfied:

$$0.03 < (Y_{obj} - WD \times \tan CRA_{obj})/L_{G1s} < 1.0 \quad (16),$$

where, $Y_{obj}$ denotes the maximum object height,

WD denotes a distance on the optical axis from the object up to the object-side surface of the first object-side lens, $CRA_{obj}$ denotes the maximum angle from among angles made by a plurality of principal rays incident on the first object-side lens, with an optical axis, $L_{G1s}$ denotes a distance on the optical axis from the object-side surface of the first object-side lens up to the stop, and regarding the sign of the angle, the angle is let to be negative when measured in the clockwise direction from the optical axis, and the angle is let to be positive when measured in the counterclockwise direction from the optical axis.

[Appended Mode 9-1]

The image pickup apparatus according to Appended mode 1, wherein the first lens unit includes in order from the object side, a lens unit having a positive refractive power, and a lens unit having either a negative refractive power or a positive refractive power, and the following conditional expression (16-1) is satisfied:

$$0.03 < (Y_{obj} - WD \times \tan CRA_{obj})/L_{G1s} < 1.0 \quad (16\text{-}1),$$

where, $Y_{obj}$ denotes the maximum object height,

WD denotes a distance on the optical axis from the object up to the object-side surface of the first object-side lens, $CRA_{obj}$ denotes the maximum angle from among angles made by a plurality of principal rays incident on the first object-side lens, with an optical axis, $L_{G1s}$ denotes a distance on the optical axis from the object-side surface of the first object-side lens up to the stop, and regarding the sign of the angle, the angle is let to be negative when measured in the clockwise direction from the optical axis, and the angle is let to be positive when measured in the counterclockwise direction from the optical axis.

[Appended Mode 10]

The image pickup apparatus according to Appended mode 9, wherein the first lens unit includes an object-side lens unit which is disposed nearest to the object, and the object-side lens unit has a positive refractive power as a whole, and the object-side lens unit includes at least two positive lenses.

[Appended Mode 11]

The image pickup apparatus according to Appended mode 9, wherein the first lens unit includes an image-side lens unit which is disposed nearest to the image, and the image-side lens unit includes one or more than one positive lens and one or more than one negative lens.

[Appended Mode 12]

The image pickup apparatus according to Appended mode 9, wherein the first lens unit includes an image-side lens unit which is disposed nearest to the image, and the following conditional expression (17) is satisfied:

$$-1.5 < f_{G1pn}/f_{G1} < 0.5 \quad (17),$$

where, $f_{G1pn}$ denotes a focal length of the image-side lens unit, and $f_{G1}$ denotes a focal length of the first lens unit.

[Appended Mode 12-1]

The image pickup apparatus according to Appended mode 1, wherein a positive lens is included on the image side of the stop.

[Appended Mode 12-2]
The image pickup apparatus according to Appended mode 1, wherein a lens having a negative refractive power is disposed nearest to the image in the second lens unit.

[Appended Mode 13]
The image pickup apparatus according to Appended mode 1, wherein the following conditional expression (18) is satisfied:

$$0.40 < D_{os}/D_{oi} < 0.90 \quad (18),$$

where,
$D_{os}$ denotes a distance on the optical axis from the object up to the stop, and
$D_{oi}$ denotes the distance on the optical axis from the object up to the image.

[Appended Mode 14]
The image pickup apparatus according to Appended mode 1, wherein the following conditional expression (19) is satisfied:

$$0.005 < BF/L_L < 0.4 \quad (19),$$

where,
BF denotes a distance on the optical axis from the image-side surface of the second image-side lens up to the image, and
$L_L$ denotes the distance on the optical axis from the object-side surface of the first object-side lens up to the image-side surface of the second image-side lens.

[Appended Mode 15]
The image pickup apparatus according to Appended mode 1, wherein the following conditional expression (20) is satisfied:

$$0.5 < D_{os}/L_{G1} < 4.0 \quad (20),$$

where,
$D_{os}$ denotes a distance on the optical axis from the object up to the stop, and
$L_{G1}$ denotes a distance on the optical axis from the object-side surface of the first object-side lens up to the image-side surface of the first image-side lens.

[Appended Mode 15-1]
The image pickup apparatus according to Appended mode 15, wherein
the first lens unit includes a lens having a positive refractive power and a lens having a negative refractive power, and
the lens having a positive refractive power is disposed nearest to the object, and
the lens having a negative refractive power is disposed at a position adjacent to the lens having a positive refractive power.

[Appended Mode 16]
An image pickup apparatus comprising:
an image pickup element; and
an optical system, wherein
the image pickup element includes a plurality of pixels which converts light intensity to an electric signal, and the plurality of pixels is arranged in rows two-dimensionally, and
an optical image is formed on the image pickup element by the optical system, and
the optical system includes in order from an object side,
a first lens unit which includes a plurality of lenses,
a stop, and
a second lens unit which includes a plurality of lenses, and
the first lens unit includes a first object-side lens which is disposed nearest to an object, and
the second lens unit includes a second image-side lens which is disposed nearest to an image, and
the first lens unit includes an object-side lens unit having a positive refractive power as a whole, which is disposed nearest to the object, and
the object-side lens unit includes a lens which satisfies the following conditional expression (10), and
the following conditional expressions (1), (2), (4), and (11) are satisfied:

$$3250 < 2Y/p \quad (1),$$

$$-1.0 < \beta \quad (2),$$

$$2.0 < L_L/\sqrt{(Y \times Y_{obj})} < 15.0 \quad (4),$$

$$0.6 < \phi_{G1o} \times |\beta|/Y \quad (10),$$

and $$0.0 < \beta_{G1o} \quad (11),$$

where,
Y denotes a maximum image height in the overall optical system,
p denotes a pixel pitch in the image pickup element,
β denotes an imaging magnification of the optical system,
$L_L$ denotes a distance on the optical axis from an object-side surface of the first object-side lens up to an image-side surface of the second image-side lens,
$Y_{obj}$ denotes the maximum object height,
$\phi_{G1o}$ denotes an effective aperture of all lenses in the object-side lens unit, and
$\beta_{G1o}$ denotes an imaging magnification of the object-side lens unit.

[Appended Mode 16-1]
The image pickup apparatus according to Appended mode 16, wherein the first lens unit includes in order from an object side an object-side lens unit and an image-side lens unit.

[Appended Mode 17]
The image pickup apparatus according to Appended mode 1 or 16, wherein the following conditional expression (21) is satisfied:

$$0.015 < 1/vd_{min} - 1/vd_{max} \quad (21),$$

where,
$vd_{min}$ denotes a minimum Abbe number form among Abbe numbers for lenses in the optical system, and
$vd_{max}$ denotes a maximum Abbe number form among Abbe numbers for lenses in the optical system.

[Appended Mode 18]
18. The image pickup apparatus according to Appended mode 1 or 16, wherein the following conditional expression (22) is satisfied:

$$3.0 < CRA_{img}/CRA_{obj} < 50.0 \quad (22),$$

$CRA_{img}$ denotes a minimum angle from among angles made by a plurality of principal rays incident on an image plane, with an optical axis, and
$CRA_{obj}$ denotes the maximum angle from among angles made by a plurality of principal rays incident on the first object-side lens with the optical axis, and
regarding the sign of the angle, the angle is let to be negative when measured in a clockwise direction from the optical axis, and the angle is let to be positive when measured in a counterclockwise direction from the optical axis.

[Appended Mode 19]

The image pickup apparatus according to Appended mode 1 or 16, wherein
the first lens unit includes a first image-side lens which is disposed nearest to the image, and
the second lens unit includes a second object-side lens which is disposed nearest to the object, and
the following conditional expression (23) is satisfied:

$$0.65 < L_{G1}/L_{G2} < 5.00 \quad (23),$$

where,
$L_{G1}$ denotes a distance on the optical axis from the object-side surface of the first object-side lens up to an image-side surface of the first image-side lens, and
$L_{G2}$ denotes a distance on the optical axis from an object-side surface of the second object-side lens up to an image-side surface of the second image-side lens.

[Appended Mode 20]

The image pickup apparatus according to Appended mode 1 or 16, wherein
an optical path splitting element is disposed in an optical path of the optical system, and
a first optical path and a second optical path are formed by the optical path splitting element, and
a part of the optical system is disposed in the first optical path, and
a connecting portion is disposed on a side of the second optical path that has been split, and
an illumination optical system that illuminates the object is connected to the connecting portion.

[Appended Mode 21]

The image pickup apparatus according to Appended mode 1 or 16, wherein
an optical path splitting element is disposed in an optical path of the optical system, and
the optical path splitting element is disposed in the second lens unit.

[Appended Mode 22]

The image pickup element according to Appended mode 21, wherein the following conditional expression (24) is satisfied:

$$0.1 < D_{sBS}/D_{BSi} < 0.95 \quad (24),$$

where,
$D_{sBS}$ denotes a distance on the optical axis from the stop up to the optical path splitting element, and
$D_{BSi}$ denotes a distance on the optical axis from the optical path splitting element up to an image pickup surface of the image pickup element.

[Appended Mode 23]

The image pickup apparatus according to Appended mode 21, wherein at least one positive lens is disposed between the stop and the optical path splitting element.

[Appended Mode 23-1]

The image pickup apparatus according to any one of Appended modes 1, 16, and 23, wherein at least one of the positive lenses is cemented to the negative lens.

[Appended Mode 23-2]

The image pickup apparatus according to any one of Appended modes 1, 16, and 23, wherein a positive lens is disposed on the image side of the optical path splitting element, and
at least one negative lens is disposed on the image side of the positive lens.

[Appended Mode 24]

The image pickup apparatus according to Appended mode 16, wherein the following conditional expression (3) is satisfied;

$$CRA_{obj} < 10 \text{ deg} \quad (3),$$

where,
$CRA_{obj}$ denotes a maximum angle from among angles made by a plurality of principal rays incident on the first object-side lens, with an optical axis, and
regarding the sign of the angle, the angle is let to be negative when measured in a clockwise direction from the optical axis, and the angle is let to be positive when measured in a counterclockwise direction from the optical axis.

[Appended Mode 25]

An image pickup system comprising:
an image pickup apparatus according to any one of Appended modes 1 to 24;
a stage which holds an object; and
a illumination apparatus which illuminates the object.

[Appended Mode 25-1]

The image pickup system according to Appended mode 25, wherein the image pickup apparatus and the stage are integrated.

As heretofore mentioned, the present invention is suitable for an image pickup apparatus and an image pickup system which include an optical system having a short overall length while having a high resolution, in which, aberrations are corrected favorably while securing a wide capturing range.

What is claimed is:

1. An image pickup apparatus comprising:
an image pickup element; and
an optical system, wherein
the image pickup element includes a plurality of pixels which converts light intensity to an electric signal, and the plurality of pixels is arranged in rows two-dimensionally, and
an optical image is formed on the image pickup element by the optical system, and
the optical system includes in order from an object side, a first lens unit which includes a plurality of first lenses, a stop, and
a second lens unit which includes a plurality of second lenses, and
the first lens unit includes a first object-side lens which is disposed nearest to an object, and
the second lens unit includes a second image-side lens which is disposed nearest to an image, and
the following conditional expressions (1), (2), (3), (4), and (5) are satisfied:

$$3250 < 2Y/p \quad (1),$$

$$-1.0 < \beta \quad (2),$$

$$CRA_{obj} < 10 \text{ deg} \quad (3),$$

$$2.0 < L_L / \sqrt{(Y \times Y_{obj})} < 15.0 \quad (4), \text{ and}$$

$$0.5 < L_{TL}/D_{oi} < 0.95 \quad (5),$$

where,
Y denotes a maximum image height in the overall optical system,
p denotes a pixel pitch in the image pickup element,
β denotes an imaging magnification of the optical system, CRA$_{obj}$ denotes a maximum angle from among angles made by a plurality of principal rays incident on the first object-side lens, with an optical axis, L$_L$ denotes a distance on the optical axis from an object-side surface of the first object-side lens up to an image-side surface of the second image-side lens, Y$_{obj}$ denotes a maximum object height, L$_{TL}$ denotes a distance on the optical axis from the object-side surface of the first object-side lens up to the image, and D$_{oi}$ denotes a distance on the optical axis from the object up to the image, and regarding the sign of the angle, the angle is let to be negative when measured in a clockwise direction from the optical axis, and the angle is let to be positive when measured in a counterclockwise direction from the optical axis.

2. The image pickup apparatus according to claim 1, wherein the first lens unit includes a first image-side lens which is disposed nearest to the image, and the second lens unit includes a second object-side lens which is disposed nearest to the object, and the following conditional expression (6) is satisfied:

$$D_{G1G2} / \phi_s < 2.0 \qquad (6),$$

where,

D$_{G1G2}$ denotes a distance on the optical axis from an image-side surface of the first image-side lens up to an object-side surface of the second object-side lens, and $\phi_s$ denotes a diameter of the stop.

3. The image pickup apparatus according to claim 1, wherein the following conditional expression (7) is satisfied:

$$0.03 < D_{max} / L_L < 0.5 \qquad (7),$$

where,

D$_{max}$ denotes a maximum distance form among distances on the optical axis between the adjacent lenses in the optical system, and L$_L$ denotes the distance on the optical axis from the object-side surface of the first object-side lens up to the image-side surface of the second image-side lens.

4. The image pickup apparatus according to claim 1, wherein the following conditional expression (8) is satisfied:

$$0.1 < D_{G2max} / Y < 1.5 \qquad (8),$$

where,

D$_{G2max}$ denotes a maximum distance form among distances on the optical axis between the adjacent lenses in the second lens unit, and Y denotes the maximum image height in the overall optical system.

5. The image pickup apparatus according to claim 1, wherein the following conditional expression (9) is satisfied:

$$-1.5 < f / f_{G2} < 10.0 \qquad (9),$$

where, f denotes a focal length of the overall optical system, and f$_{G2}$ denotes a focal length of the second lens unit.

6. The image pickup apparatus according to claim 1, wherein the first lens unit includes an object-side lens unit which is disposed nearest to the object, the object-side lens unit including a plurality of lenses, and the object-side lens unit has a positive refractive power as a whole, and includes a lens which satisfies the following conditional expression (10), and the following conditional expression (11) is satisfied:

$$0.6 < \phi_{G1o} |\beta| / Y \qquad (10), \text{ and}$$

$$0.0 < \beta_{G1o} \qquad (11),$$

where, $\phi_{G1o}$ denotes an effective aperture of all lenses in the object-side lens unit, $\beta$ denotes the imaging magnification of the optical system, Y denotes the maximum image height in the overall optical system, and $\beta_{G1o}$ denotes an imaging magnification of the object-side lens unit.

7. The image pickup apparatus according to claim 1, wherein the following conditional expression (14) is satisfied:

$$-0.50 < (WD \times tan\,(sin^{-1} NA) - \phi_s / 2) / L_{G1s} < 0.10 \qquad (14),$$

where,

WD denotes a distance on the optical axis from the object up to the object-side surface of the first object-side lens, NA denotes a numerical aperture on the object side of the optical system, $\phi_s$ denotes the diameter of the stop, and L$_{G1s}$ denotes a distance on the optical axis from the object-side surface of the first object-side lens up to the stop.

8. The image pickup apparatus according to claim 1, wherein the following conditional expression (15) is satisfied:

$$0.60 < \phi_s / (2 \times WD \times tan\,(sin^{-1} NA)) < 12.0 \qquad (15),$$

where, $_s$ denotes the diameter of the stop,

WD denotes a distance on the optical axis from the object up to the object-side surface of the first object-side lens, and NA denotes a numerical aperture on the object side of the optical system.

9. The image pickup apparatus according to claim 1, wherein the following conditional expression (16) is satisfied:

$$0.03 < (Y_{obj} - WD \times tan\,CRA_{obj}) / L_{G1s} < 1.0 \qquad (16),$$

where,

Y$_{obj}$ denotes the maximum object height,

WD denotes a distance on the optical axis from the object up to the object-side surface of the first object-side lens, CRA$_{obj}$ denotes the maximum angle from among angles made by a plurality of principal rays incident on the first object-side lens, with an optical axis, L$_{G1s}$ denotes a distance on the optical axis from the object-side surface of the first object-side lens up to the stop, and regarding the sign of the angle, the angle is let to be negative when measured in the clockwise direction from the optical axis, and the angle is let to be positive when measured in the counterclockwise direction from the optical axis.

10. The image pickup apparatus according to claim 9, wherein the first lens unit includes an object-side lens unit which is disposed nearest to the object, the object-side lens unit including a plurality of lenses, and the object-side lens unit has a positive refractive power as a whole, and the object-side lens unit includes at least two positive lenses.

11. The image pickup apparatus according to claim 9, wherein
the first lens unit includes an image-side lens unit which is disposed nearest to the image, and
the image-side lens unit includes one or more than one positive lens and one or more than one negative lens.

12. The image pickup apparatus according to claim 9, wherein
the first lens unit includes an image-side lens unit which is disposed nearest to the image, and
the following conditional expression (17) is satisfied:

$$-1.5 < f_{G1pn} / f_{G1} < 0.5 \tag{17},$$

where,
$f_{G1pn}$ denotes a focal length of the image-side lens unit, and
$f_{G1}$ denotes a focal length of the first lens unit.

13. The image pickup apparatus according to claim 1, wherein the following conditional expression (18) is satisfied:

$$0.40 < D_{os} / D_{oi} < 0.90 \tag{18},$$

where,
$D_{os}$ denotes a distance on the optical axis from the object up to the stop, and
$D_{oi}$ denotes the distance on the optical axis from the object up to the image.

14. The image pickup apparatus according to claim 1, wherein the following conditional expression (19) is satisfied:

$$0.005 < BF / L_L < 0.4 \tag{19},$$

where,
BF denotes a distance on the optical axis from the image-side surface of the second image-side lens up to the image, and
$L_L$ denotes the distance on the optical axis from the object-side surface of the first object-side lens up to the image-side surface of the second image-side lens.

15. The image pickup apparatus according to claim 1, wherein
the first lens unit includes a first image-side lens which is disposed nearest to the image, and
the following conditional expression (20) is satisfied:

$$0.5 < D_{os} / L_{G1} < 4.0 \tag{20},$$

where,
$D_{os}$ denotes a distance on the optical axis from the object up to the stop, and
$L_{G1}$ denotes a distance on the optical axis from the object-side surface of the first object-side lens up to the image-side surface of the first image-side lens.

16. An image pickup apparatus comprising:
an image pickup element; and
an optical system, wherein
the image pickup element includes a plurality of pixels which converts light intensity to an electric signal, and the plurality of pixels is arranged in rows two-dimensionally, and
an optical image is formed on the image pickup element by the optical system, and
the optical system includes in order from an object side, a first lens unit which includes a plurality of first lenses, a stop, and
a second lens unit which includes a plurality of second lenses, and the first lens unit includes a first object-side lens which is disposed nearest to an object, and
the second lens unit includes a second image-side lens which is disposed nearest to an image, and
the first lens unit includes an object-side lens unit having a positive refractive power as a whole, the object-side lens unit being disposed nearest to the object, the object-side lens unit including a plurality of lenses, and
the object-side lens unit includes a lens which satisfies the following conditional expression (10), and
the following conditional expressions (1), (2), (4), and (11) are satisfied:

$$3250 < 2Y/p \tag{1},$$

$$-1.0 < \beta tm \tag{2},$$

$$2.0 < L_L / \sqrt{(Y \times Y_{obj})} < 15.0 \tag{4},$$

$$0.6 < \phi_{G1o} \times |\beta| / Y \tag{10, and}$$

$$0.0 < \beta_{G1o} \tag{11},$$

where,
Y denotes a maximum image height in the overall optical system,
p denotes a pixel pitch in the image pickup element,
β denotes an imaging magnification of the optical system,
$L_L$ denotes a distance on the optical axis from an object-side surface of the first object-side lens up to an image-side surface of the second image-side lens,
$Y_{obj}$ denotes a maximum object height,
$\phi_{G1o}$ denotes an effective aperture of all lenses in the object-side lens unit, and
βG1o denotes an imaging magnification of the object-side lens unit.

17. The image pickup apparatus according to claim 1, wherein the following conditional expression (21) is satisfied:

$$0.015 < 1 / vd_{min} - 1 / vd_{max} \tag{21},$$

where,
$vd_{min}$ denotes a minimum Abbe number form among Abbe numbers for lenses in the optical system, and
$vd_{max}$ denotes a maximum Abbe number form among Abbe numbers for lenses in the optical system.

18. The image pickup apparatus according to claim 1, wherein the following conditional expression (22) is satisfied:

$$3.0 < CRA_{img} / CRA_{obj} < 50.0 \tag{22},$$

$CRA_{img}$ denotes a maximum angle from among angles made by a plurality of principal rays incident on an image plane, with an optical axis, and
$CRA_{obj}$ denotes the maximum angle from among angles made by a plurality of principal rays incident on the first object-side lens with the optical axis, and
regarding the sign of the angle, the angle is let to be negative when measured in a clockwise direction from the optical axis, and the angle is let to be positive when measured in a counterclockwise direction from the optical axis.

19. The image pickup apparatus according to claim 1, wherein
the first lens unit includes a first image-side lens which is disposed nearest to the image, and
the second lens unit includes a second object-side lens which is disposed nearest to the object, and the following conditional expression (23) is satisfied:

$$0.65 < L_{G1} / L_{G2} < 5.00 \qquad (23),$$

where, $L_{G1}$ denotes a distance on the optical axis from the object-side surface of the first object-side lens up to an image-side surface of the first image-side lens, and $L_{G2}$ denotes a distance on the optical axis from an object-side surface of the second object-side lens up to an image-side surface of the second image-side lens.

20. The image pickup apparatus according to claim 1, wherein
   an optical path splitting element is disposed in an optical path of the second lens unit, and
   a first optical path and a second optical path are formed by the optical path splitting element, and
   a part of the second lens unit is disposed in the first optical path, and
   a connecting portion is disposed on a side of the second optical path, the side is opposed to the optical path splitting element, and
   an illumination optical system that illuminates the object is connected to the connecting portion.

21. The image pickup apparatus according to claim 1, wherein
   an optical path splitting element is disposed in an optical path of the optical system, and
   the optical path splitting element is disposed in the second lens unit.

22. The image pickup element according to claim 21, wherein the following conditional expression (24) is satisfied:

$$0.1 < D_{sBS} / D_{BSi} < 0.95 \qquad (24),$$

where, $D_{sBS}$ denotes a distance on the optical axis from the stop up to the optical path splitting element, and $D_{BSi}$ denotes a distance on the optical axis from the optical path splitting element up to an image pickup surface of the image pickup element.

23. The image pickup apparatus according to claim 21, wherein at least one positive lens is disposed between the stop and the optical path splitting element.

24. The image pickup apparatus according to claim 16, wherein the following conditional expression (3) is satisfied;

$$CRA_{obj} < 10 \text{ deg} \qquad (3),$$

where, $CRA_{obj}$ denotes a maximum angle from among angles made by a plurality of principal rays incident on the first object-side lens, with an optical axis, and regarding the sign of the angle, the angle is let to be negative when measured in a clockwise direction from the optical axis, and the angle is let to be positive when measured in a counterclockwise direction from the optical axis.

25. An image pickup system comprising:
   an image pickup apparatus according to claim 1;
   a stage which holds an object; and
   a illumination apparatus which illuminates the object.

26. The image pickup apparatus according to claim 16, wherein the following conditional expression (21) is satisfied:

$$0.015 < 1 / \nu d_{min} - 1 / \nu d_{max} \qquad (21),$$

where, $\nu d_{min}$ denotes a minimum Abbe number form among Abbe numbers for lenses in the optical system, and $\nu d_{max}$ denotes a maximum Abbe number form among Abbe numbers for lenses in the optical system.

27. The image pickup apparatus according to claim 16, wherein the following conditional expression (22) is satisfied:

$$3.0 < CRA_{img} / CRA_{obj} < 50.0 \qquad (22),$$

$CRA_{img}$ denotes a maximum angle from among angles made by a plurality of principal rays incident on an image plane, with an optical axis, and $CRA_{obj}$ denotes the maximum angle from among angles made by a plurality of principal rays incident on the first object-side lens with the optical axis, and regarding the sign of the angle, the angle is let to be negative when measured in a clockwise direction from the optical axis, and the angle is let to be positive when measured in a counterclockwise direction from the optical axis.

28. The image pickup apparatus according to claim 16, wherein
   the first lens unit includes a first image-side lens which is disposed nearest to the image, and
   the second lens unit includes a second object-side lens which is disposed nearest to the object, and
   the following conditional expression (23) is satisfied:

$$0.65 < L_{G1} / L_{G2} < 5.00 \qquad (23),$$

where, $L_{G1}$ denotes a distance on the optical axis from the object-side surface of the first object-side lens up to an image-side surface of the first image-side lens, and $L_{G2}$ denotes a distance on the optical axis from an object-side surface of the second object-side lens up to an image-side surface of the second image-side lens.

29. The image pickup apparatus according to claim 16, wherein
   an optical path splitting element is disposed in an optical path of the second lens unit, and
   a first optical path and a second optical path are formed by the optical path splitting element, and
   a part of the second lens unit is disposed in the first optical path, and
   a connecting portion is disposed on a side of the second optical path, the side is opposed to the optical path splitting element, and
   an illumination optical system that illuminates the object is connected to the connecting portion.

30. The image pickup apparatus according to claim 1, wherein
   an optical path splitting element is disposed in an optical path of the optical system, and
   the optical path splitting element is disposed in the second lens unit.

31. The image pickup element according to claim 30, wherein the following conditional expression (24) is satisfied:

$$0.1 < D_{sBS} / D_{BSi} < 0.95 \qquad (24),$$

where, $D_{sBS}$ denotes a distance on the optical axis from the stop up to the optical path splitting element, and $D_{BSi}$ denotes a distance on the optical axis from the optical path splitting element up to an image pickup surface of the image pickup element.

32. The image pickup apparatus according to claim 30, wherein at least one positive lens is disposed between the stop and the optical path splitting element.

33. An image pickup system comprising:
an image pickup apparatus according to claim 16;
a stage which holds an object; and
a illumination apparatus which illuminates the object.

* * * * *